United States Patent [19]

Mori et al.

[11] Patent Number: 5,262,083

[45] Date of Patent: Nov. 16, 1993

[54] LIQUID CRYSTAL COMPOSITION, LIQUID CRYSTAL DEVICE, DISPLAY APPARATUS AND DISPLAY METHOD

[75] Inventors: Shosei Mori, Atsugi; Masataka Yamashita, Hiratsuka; Kazuharu Katagiri, Tama; Kenji Shinjo; Masahiro Terada, both of Atsugi, all of Japan

[73] Assignee: Canon Kabushiki Kaisha, Tokyo, Japan

[21] Appl. No.: 833,156

[22] Filed: Feb. 10, 1992

[30] Foreign Application Priority Data

Feb. 13, 1991 [JP] Japan .................. 3-19943

[51] Int. Cl.$^5$ .................. C09K 19/34; C09K 19/32; G02F 1/13

[52] U.S. Cl. .................. 252/299.61; 252/299.62; 359/104

[58] Field of Search .................. 252/299.61, 299.62; 359/104

[56] References Cited

U.S. PATENT DOCUMENTS

| | | | |
|---|---|---|---|
| 4,367,924 | 1/1983 | Clark et al. .................. | 350/334 |
| 4,880,560 | 11/1989 | Yoshinaga et al. .................. | 252/299.01 |
| 5,034,151 | 7/1991 | Shinjo et al. .................. | 252/299.61 |
| 5,075,030 | 12/1991 | Togano et al. .................. | 252/299.61 |
| 5,076,961 | 12/1991 | Nakamura et al. .................. | 252/299.61 |
| 5,091,109 | 2/1992 | Takiguchi et al. .................. | 252/299.61 |
| 5,190,690 | 3/1993 | Takiguchi et al. .................. | 252/299.61 |
| 5,194,177 | 3/1993 | Nohira et al. .................. | 252/299.61 |

FOREIGN PATENT DOCUMENTS

| | | |
|---|---|---|
| 0393613 | 10/1990 | European Pat. Off. . |
| 0439170 | 7/1991 | European Pat. Off. . |
| 0440061 | 8/1991 | European Pat. Off. . |
| 107216 | 8/1981 | Japan . |
| 193426 | 11/1984 | Japan . |
| 193427 | 11/1984 | Japan . |
| 156046 | 8/1985 | Japan . |
| 156047 | 8/1985 | Japan . |
| 22042 | 1/1988 | Japan . |
| 122651 | 5/1988 | Japan . |
| 08019 | 10/1988 | PCT Int'l Appl. . |

OTHER PUBLICATIONS

Berichte der Deutschen Chemischen Gesellschaft (1911) 1542:52.
Bulletin of the Chemical Society of Japan, vol. 60, No. 3 (1987) 1159:60.

*Primary Examiner*—Robert L. Stoll
*Assistant Examiner*—C. Harris
*Attorney, Agent, or Firm*—Fitzpatrick, Cella, Harper & Scinto

[57] ABSTRACT

A liquid crystal composition, comprising: at least one mesomorphic compound represented by the following formula (I):

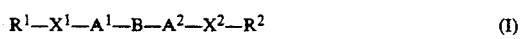

$$R^1—X^1—A^1—B—A^2—X^2—R^2 \quad (I)$$

and at least one mesomorphic compound represented by the following formula (II):

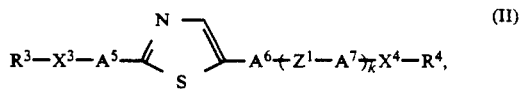

The liquid crystal composition is easily aligned by a simple rubbing method to provide a uniform monodomain and further provides wider driving voltage and temperature margins effective for providing a practical ferroelectric liquid crystal device.

32 Claims, 8 Drawing Sheets

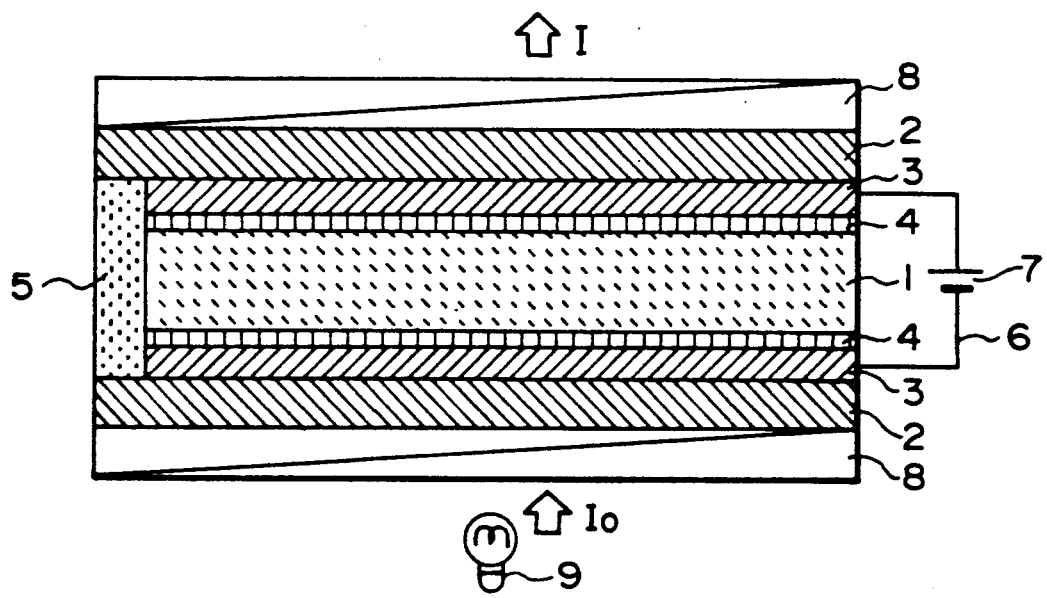
F I G. 1

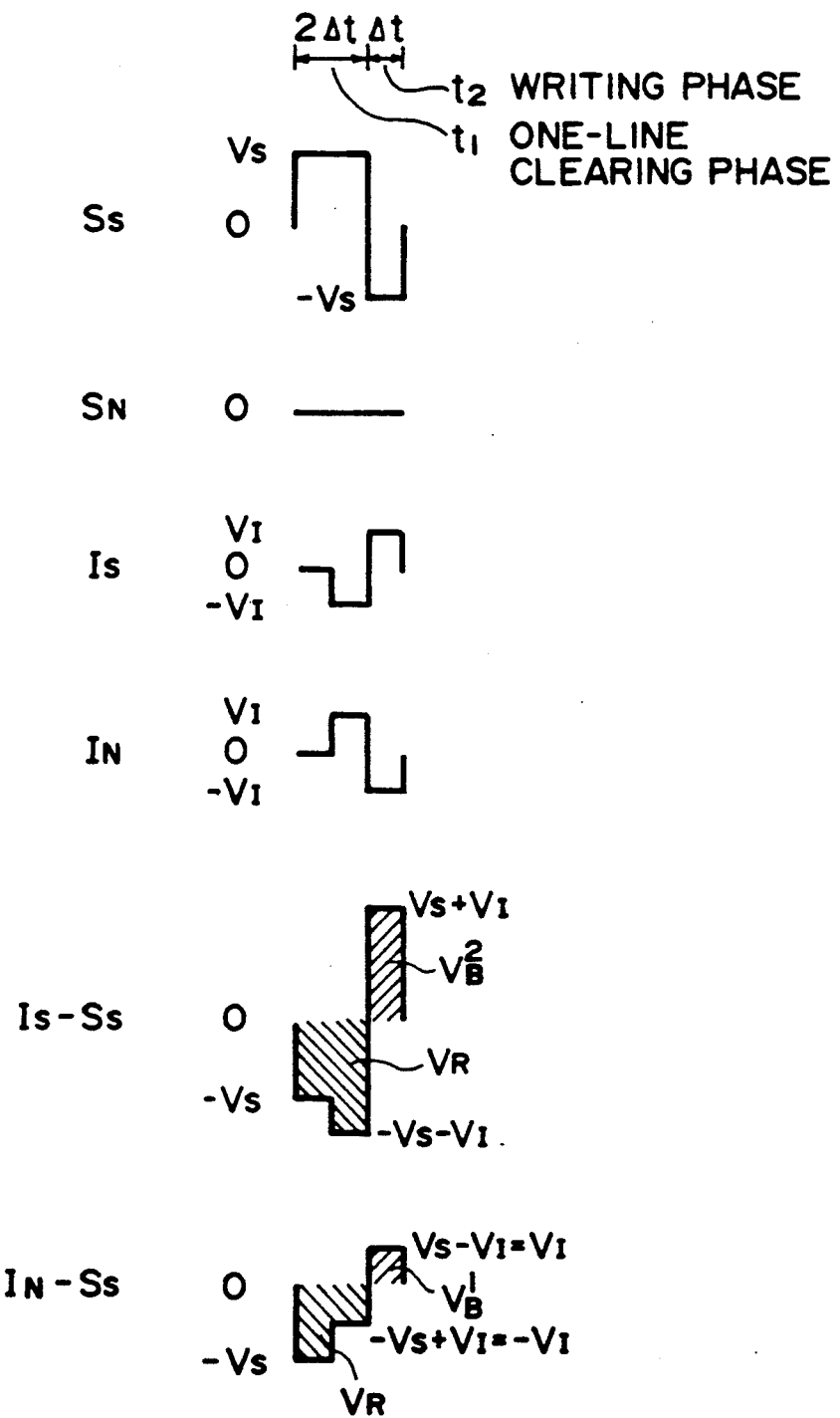
F I G. 4

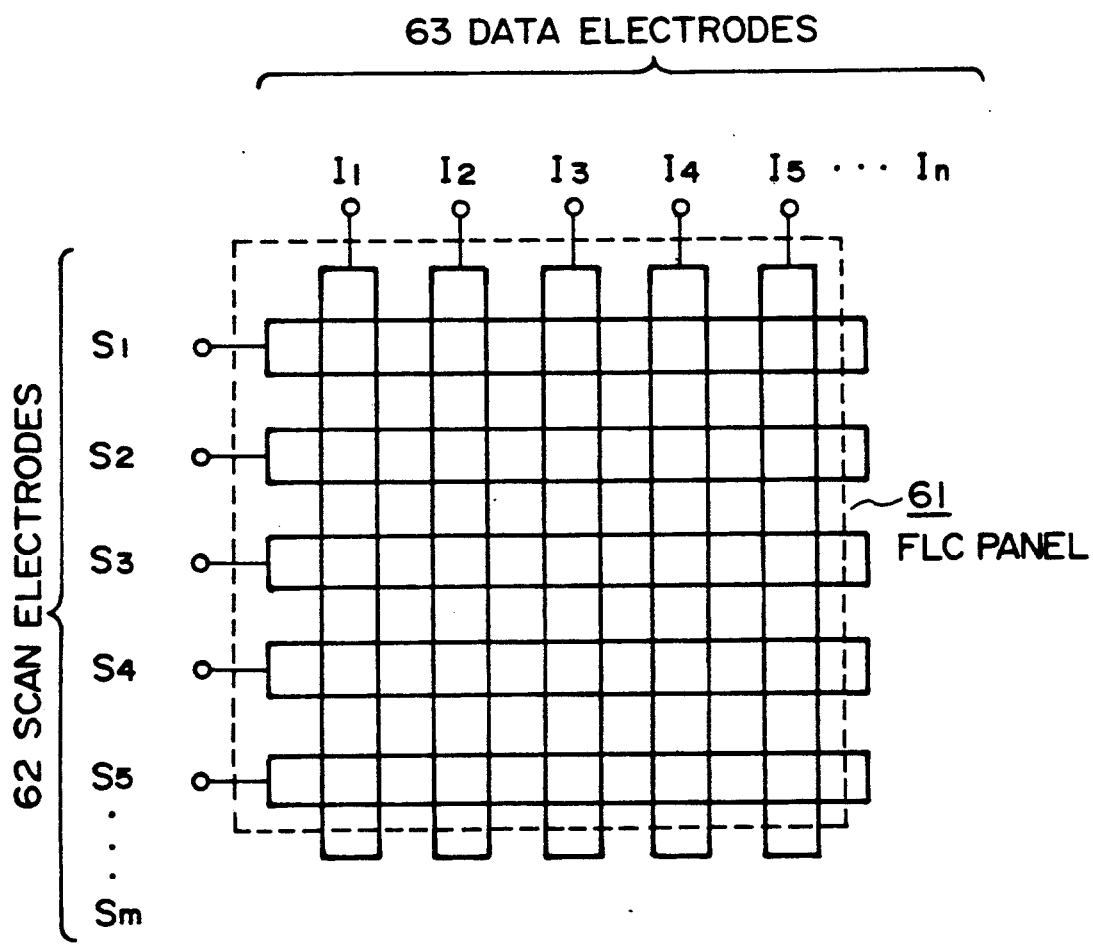
F I G. 6

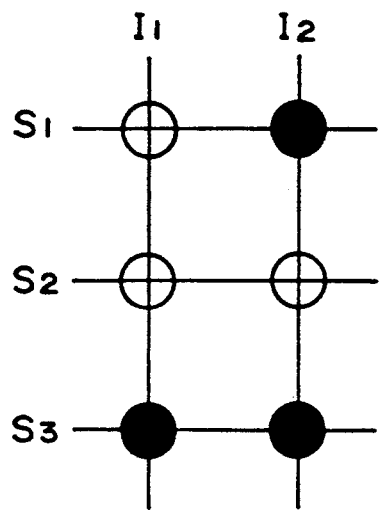
F I G. 7
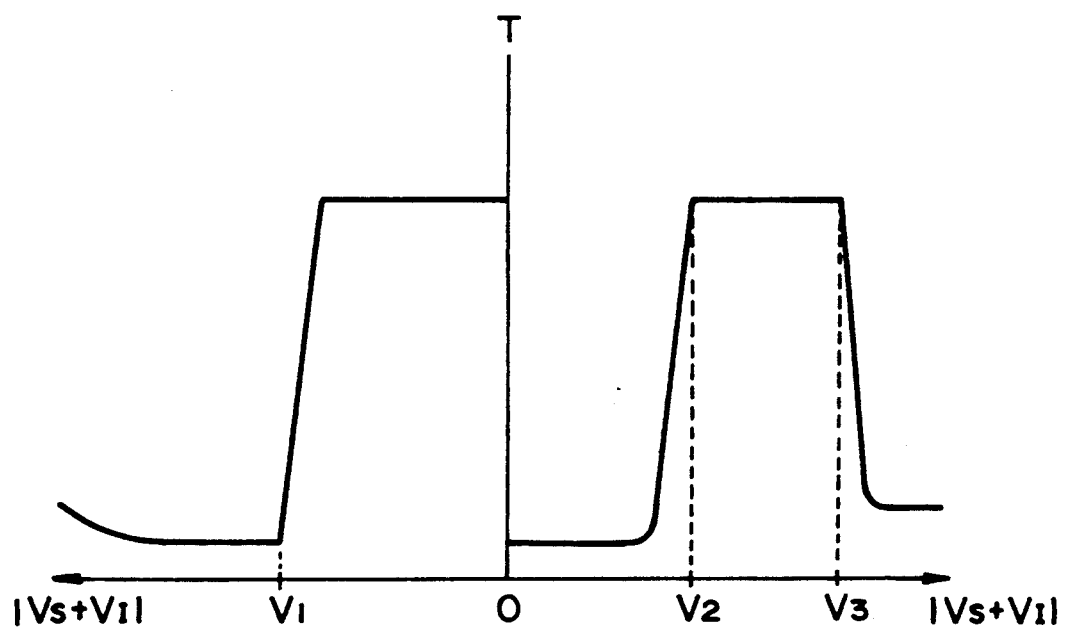
F I G. 8

LIQUID CRYSTAL COMPOSITION, LIQUID CRYSTAL DEVICE, DISPLAY APPARATUS AND DISPLAY METHOD

FIELD OF THE INVENTION AND RELATED ART

The present invention relates to a novel liquid crystal composition, a liquid crystal device, a display apparatus and a display method, and more particularly to a novel liquid crystal composition with improved responsiveness to an electric field, a liquid crystal device using the liquid crystal composition for use in a display device, a liquid crystal-optical shutter, etc., a display apparatus using the device, and a display method using the composition and device.

The use of liquid crystal devices having bistability has been proposed by Clark and Lagerwall (e.g. Japanese Laid-Open Patent Appln. No. 56-107216, U.S. Pat. No. 4,367,924, etc.). In this instance, as the liquid crystals having bistability, ferroelectric liquid crystals having chiral smectic C-phase (SmC*) or H-phase (SmH*) are generally used. These liquid crystals have bistable states of first and second stable states with respect to an electric field applied thereto. Accordingly, as different from optical modulation devices in which the conventional TN-type liquid crystals are used, the bistable liquid crystal molecules are oriented to first and second optically stable states with respect to one and the other electric field vectors, respectively. Further, this type of liquid crystal has a Property (bistability) of assuming either one of the two stable states in response to an applied electric and retaining the resultant state in the absence of an electric field.

In addition to the above-described characteristic of showing bistability, such a ferroelectric liquid crystal (hereinafter sometimes abbreviated as "FLC") has an excellent property, i.e., a high-speed responsiveness. This is because the spontaneous polarization of the ferroelectric liquid crystal and an applied electric field directly interact with each other to induce transition of orientation states. The resultant response speed is faster than the response speed due to the interaction between dielectric anisotropy and an electric field by 3 to 4 digits.

Thus, a ferroelectric liquid crystal potentially has very excellent characteristics, and by making use of these properties, it is possible to provide essential improvements to many of problems with the conventional TN-type devices. Particularly, the application to a high-speed optical shutter and a display of a high density and a large picture is expected.

A simple matrix display apparatus including a device comprising such a ferroelectric liquid crystal layer between a pair of substrates may be driven according to a driving method as disclosed in. e.g., Japanese Laid-Open Patent Applications Nos. 193426/1984, 193427/1984, 156046/1985 and 156047/1985.

FIGS. 4 and 5 are waveform diagrams showing driving voltage waveforms adopted in driving a ferroelectric liquid crystal panel as an embodiment of the liquid crystal device according to the present invention. FIG. 6 is a plan view of such a ferroelectric liquid crystal panel 61 having a matrix electrode structure. Referring to FIG. 6, the panel 61 comprises scanning lines 62 and data lines 63 intersecting with the scanning lines. Each intersection comprises a ferroelectric liquid crystal disposed between a scanning line 62 and a data line 63 to form a pixel.

Referring to FIG. 4, at $S_S$ is shown a selection scanning signal waveform applied to a selected scanning line, at $S_N$ is shown a non-selection scanning signal waveform applied to a non-selected scanning line, at $I_S$ is shown a selection data signal waveform (Providing a black display state) applied to a selected data line, and at $I_N$ is shown a non-selection data signal waveform (providing a white display state) applied to a non-selected data line. Further, at $(I_S - S_S)$ and $(I_N - S_S)$ in the figure are shown voltage waveforms applied to pixels on a selected scanning line, whereby a pixel supplied with the voltage $(I_S - S_S)$ assumes a black display state and a pixel supplied with the voltage $(I_N - S_S)$ assumes a white display state. FIG. 5 shows a time-serial waveform used for providing a display state as shown in FIG. 7.

In the driving embodiment shown in FIGS. 4 and 5, a minimum duration $\Delta t$ of a single polarity voltage applied to a pixel on a selected scanning line corresponds to the period of a writing phase $t_2$, and the period of a one-line clearing phase $t_1$ is set to $2\Delta t$.

The parameters $V_S$, $V_I$ and $\Delta t$ in the driving waveforms shown in FIGS. 4 and 5 are determined depending on switching characteristics of a ferroelectric liquid crystal material used.

FIG. 8 shows a V−T characteristic, i.e., a change in transmittance T when a driving voltage denoted by $(V_S + V_I)$ is changed while a bias ratio as mentioned hereinbelow is kept constant. In this embodiment, the parameters are fixed at constant values of $\Delta t = 50$ μs and a bias ratio $V_I/(V_I + V_S) = \frac{1}{3}$. On the right side of FIG. 8 is shown a result when the voltage $(I_N - S_S)$ shown in FIG. 4 is applied to a pixel concerned, and on the left side of FIG. 8 is shown a result when the voltage $(I_S - S_S)$ is applied to a pixel concerned, respectively while increasing the voltage $(V_S + V_I)$. On both sides of the ordinate, the absolute value of the voltage $(V_S + V_I)$ is separately indicated. Herein, a voltage $V_1$ denotes the minimum absolute value of $(V_S + V_I)$ required for switching from a white state to a black state by applying a voltage $V_B{}^2$ at $(I_S - S_S)$ shown in FIG. 4, a voltage $V_2$ denotes the minimum absolute value of $(V_S + V_I)$ required for switching (resetting) a black state to a white state by applying a voltage $V_R$ at $(I_N - S_S)$, and a voltage $V_3$ is the maximum absolute value of $(V_S + V_I)$ required for retaining a white state, i.e., beyond which a pixel concerned written in white is unexpectedly inverted into a black state by applying a voltage $V_B{}^1$ at $(I_N - S_S)$. In this instance, a relationship of $V_2 < V_1 < V_3$ holds. The voltage $V_1$ may be referred to as a threshold voltage in actual drive and the voltage $V_3$ may be referred to as a crosstalk voltage. Such a crosstalk voltage $V_3$ is generally present in actual matrix drive of a ferroelectric liquid crystal device. In an actual drive, $\Delta V = (V_3 - V_1)$ provides a range of $|V_S + V_I|$ allowing a matrix drive and may be referred to as a (driving) voltage margin, which is preferably large enough. It is of course possible to increase the value of $V_3$ and thus $\Delta V$ ($= V_3 - V_1$) by increasing the bias ratio (i.e., by causing the bias ratio to approach a unity). However, a large bias ratio corresponds to a large amplitude of a data signal and leads to an increase in flickering and a lower contrast, thus being undesirable in respect of image quality. According to our study, a bias ratio of about $\frac{1}{3}$-$\frac{1}{4}$ was practical. On the other hand, when the bias ratio is fixed, the voltage margin ΔV strongly depends on the switching characteristics of a liquid crystal material used, and it is needless to say that a liquid crystal material providing a large ΔV is very advantageous for matrix drive.

The upper and lower limits of application voltages and a difference therebetween (driving voltage margin ΔV) by which selected pixels are written in two states of "black" and "white" and non-selected pixels can retain the written "black" and "white" states at a constant temperature as described above, vary depending on and are inherent to a particular liquid Crystal material used. Further, the driving margin is deviated according to a change in environmental temperature, so that optimum driving voltages should be set in an actual display apparatus according to a liquid crystal material used and an environmental temperature.

In a practical use, however, when the display area of a matrix display apparatus is enlarged, the differences in environmental conditions (such as temperature and cell gap between opposite electrodes) naturally increase, so that it becomes impossible to obtain a good quality of image over the entire display area by using a liquid crystal material having a small driving voltage margin.

In order to realize such a matrix display apparatus, an alignment characteristic of the liquid crystal material used becomes an important factor.

On the other hand, the liquid crystal materials assuming a chiral smectic C phase (SmC*) are liable to cause a zig-zag defect or an alignment defect at an area around a gap-retaining material such as spacer beads in a liquid crystal cell when the above rubbing (treatment is conducted. Further, the liquid crystal materials assuming SmC* are also liable to cause an alignment defect due to difference in rubbing state of an alignment film. The difference is caused by. e.g., surface unevenness of the alignment film due to the liquid crystal device structures used.

These problems may be attributable to the fact that an SmC* phase is provided through some phase transitions from an isotropic phase on temperature decrease in many cases and is closer to a crystal state than a nematic phase.

The above-mentioned alignment defect leads to drawbacks of lowering in bistability characteristic of the SmC* liquid crystal materials, lowering in image quality and contrast or occurrence of crosstalk.

SUMMARY OF THE INVENTION

The present invention is accomplished in order to solve the above-mentioned problems of the conventional liquid crystal devices and aims at realizing a ferroelectric liquid crystal device which is expected to be applied to a high-speed optical shutter and a display of a high density and a large picture.

An object of the present invention is to provide a liquid crystal composition which is easily aligned by simple rubbing treatment and provides a monodomain having a uniform alignment characteristic and no defects.

Another object of the present invention is to provide a liquid crystal composition having a large driving temperature margin and a wide driving temperature margin affording satisfactory drive of entire pixels even when some degree of temperature fluctuation is present over a display area comprising the pixels of a liquid crystal device.

A further object of the present invention is to provide a liquid crystal device using such a liquid crystal composition and showing improved driving and display characteristics, and a display apparatus using the device and a display method using the composition or the device.

According to the present invention, there is provided liquid crystal composition, comprising:

at least one mesomorphic compound represented by the following formula (I):

$$R^1-X^1-A^1-B-A^2-X^2-R^2 \quad (I),$$

wherein $R^1$ and $R^2$ independently denote a linear or branched alkyl group having 1-18 carbon atoms capable of including one or non-neighboring two or more methylene groups which can be replaced with at least one species of —O—, —CO—, —COO—, —OCO—, —OCOO— or —CH(X)— with the proviso that —O— cannot directly be connected to —O— and X denotes halogen; $X^1$ and $X^2$ independently denotes a single bond, —O—, —COO—, —OCO— or —CO—; B denotes

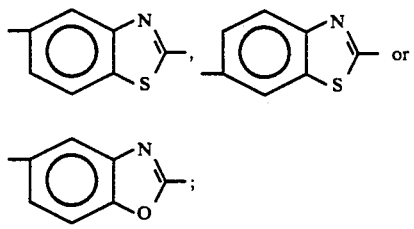

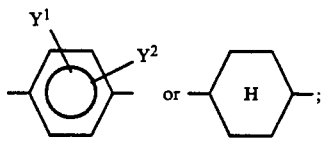

$A^1$ denotes a single bond,

$A^2$ denotes a single bond, $-A^3-$ or $-A^3-A^4-$ wherein $A^3$ and $A^4$ independently denote any one of $A^1$,

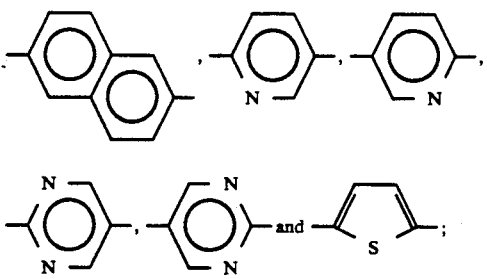

and $Y^1$ and $Y^2$ independently denote any one of hydrogen, F, Cl, Br, —CH$_3$, —CN and —CF$_3$; and at least one mesomorphic compound represented by the following formula (II):

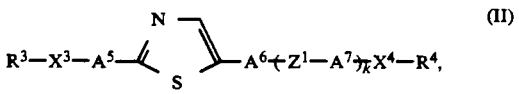

wherein R³ and R⁴ independently denote a linear or branched alkyl group having 1-18 carbon atoms capable of including one or non-neighboring two or more methylene groups which can be replaced with at least one species of —O—, —CO—, —COO—, —OCO—, —OCOO— or —CH(X)—with the proviso that —O— cannot directly be connected to —O— and X denotes halogen; X³ and X⁴ independently denotes a single bond, —O—, —COO—, —OCO— or —CO—; Z¹ denotes a single bond. —COO— or —OCO—; A⁵, A⁶ and A⁷ independently denote a single bond,

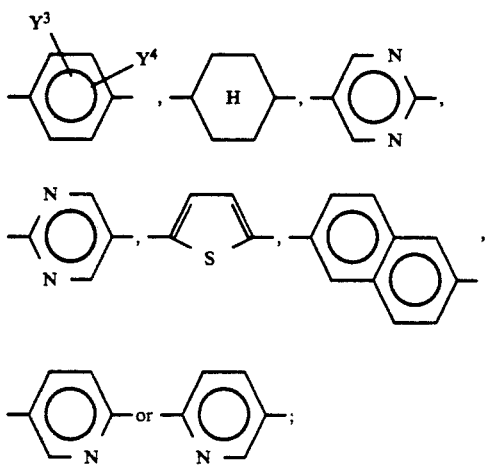

Y³ and Y⁴ independently denote halogen, —CH₃ or —CF₃; and k is 0 or 1 with the proviso that X³ is a single bond when A⁵ is a single bond, and X⁴ is a single bond when A⁶ is a single bond and k is 0.

According to the present invention, there is also provided a liquid crystal composition containing the above composition and a mesomorphic compound represented by the following formula (III):

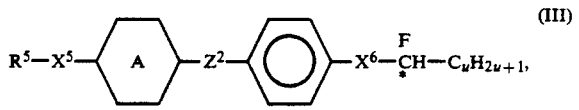

wherein R⁵ denotes a linear or branched alkyl group having 1-18 carbon atoms optionally having a substituent; X⁵ denotes a single bond, —O—, —COO— or —OCO—; Z² denotes a single bond, —COO—, —OCO—, —COS— or —SCO—; X⁶ denotes —OCH₂—, —COOCH₂—, —OCO— or

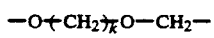

wherein k is an integer of 1-4;

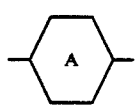

denotes

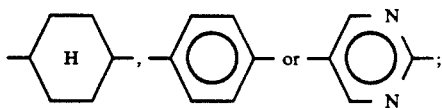

and u is an integer of 1-12.

The present invention provides a liquid crystal device comprising a pair of electrode plates and the liquid crystal composition described above disposed between the electrode plates.

The present invention further provides a display apparatus comprising the above-mentioned liquid crystal device, and voltage application means for driving the liquid crystal device.

The present invention still further provides a display method using the liquid crystal composition or the liquid crystal device described above and switching the alignment direction of liquid crystal molecules by applying voltages to the liquid crystal composition to effect display.

These and other objects, features and advantages of the present invention will become more apparent upon a consideration of the following description of the preferred embodiments of the present invention taken in conjunction with the accompanying drawings.

BRIEF DESCRIPTION OF THE DRAWINGS

FIG. 1 is a schematic sectional view of a liquid crystal display device using a liquid crystal composition assuming a chiral smectic phase;

FIG. 4 shows unit driving waveforms used in an embodiment of the present invention.

FIG. 6 is a plan view of a ferroelectric liquid crystal panel having a matrix electrode structure;

FIG. 7 is an illustration of a display pattern obtained by an actual drive using the time-serial waveforms shown in FIG. 5;

FIG. 8 is a V—T characteristic chart showing a change in transmittance under application of varying drive voltages;

DETAILED DESCRIPTION OF THE INVENTION

Figure 2:
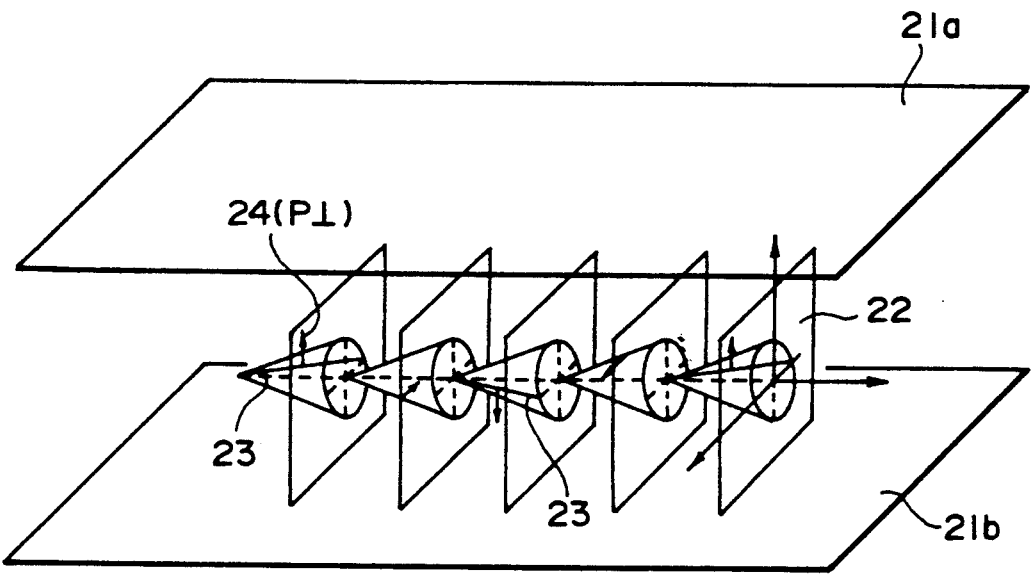
FIGS. 2 and 3 are schematic perspective views of a device cell embodiment for illustrating the operation principle of a liquid crystal device utilizing ferroelectricity of a liquid crystal composition.

Preferred examples of the mesomorphic compound of the formula (I) may include those represented by the following formulas (Ia) and (Ig):

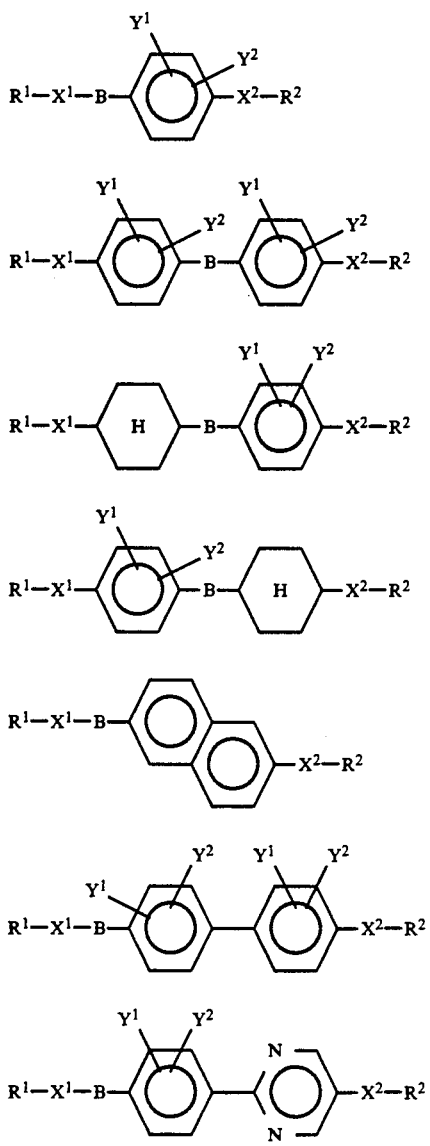

In the above formula (Ia)–(Ig), $R^1$, $R^2$, B, $X^1$, $X^2$, $Y^1$ and $Y^2$ are the same as defined above.

Preferred examples of B in the above formulas (Ia)–(Ig) may include

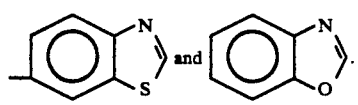

Preferred Examples of $X^1$ and $X^2$ may independent include a single bond, —O—, —COO— and —OCO—. Further, $Y^1$ and $Y^2$ may preferably be Cl or F, particularly F, respectively.

In the above-mentioned formula (I), preferred examples of $R^1$ and $R^2$ may respectively include those represented by the following groups (I-i) to (I-iv):

(I-i) an n-alkyl group having 1–16 carbon atoms, particularly 4–12 carbon atoms;

(I-ii)

$$\mathrm{+CH_2\mathpunct{)}_{\overline{m}}CH-C_nH_{2n+1}} \quad \overset{CH_3}{|}$$

wherein m is an integer of 0–6 and n is an integer of 1–8 (optically active or inactive);

(I-iii)

$$\mathrm{+CH_2\mathpunct{)}_{\overline{r}}CH+CH_2\mathpunct{)}_{\overline{s}}O-C_tH_{2t+1}} \quad \overset{CH_3}{|}$$

wherein r is an integer of 0–6, s is or 1, and t is an integer of 1–12 (optically active or inactive); and (I-iv)

$$\mathrm{+CH_2\mathpunct{)}_{\overline{p}}CH-C_xH_{2x+1}} \quad \overset{F}{|}$$

wherein p is 0 or 1 and x is an integer of 1–14.

Preferred examples of the mesomorphic compound of the formula (II) may include those represented by the following formulas (IIa) to (IIq):

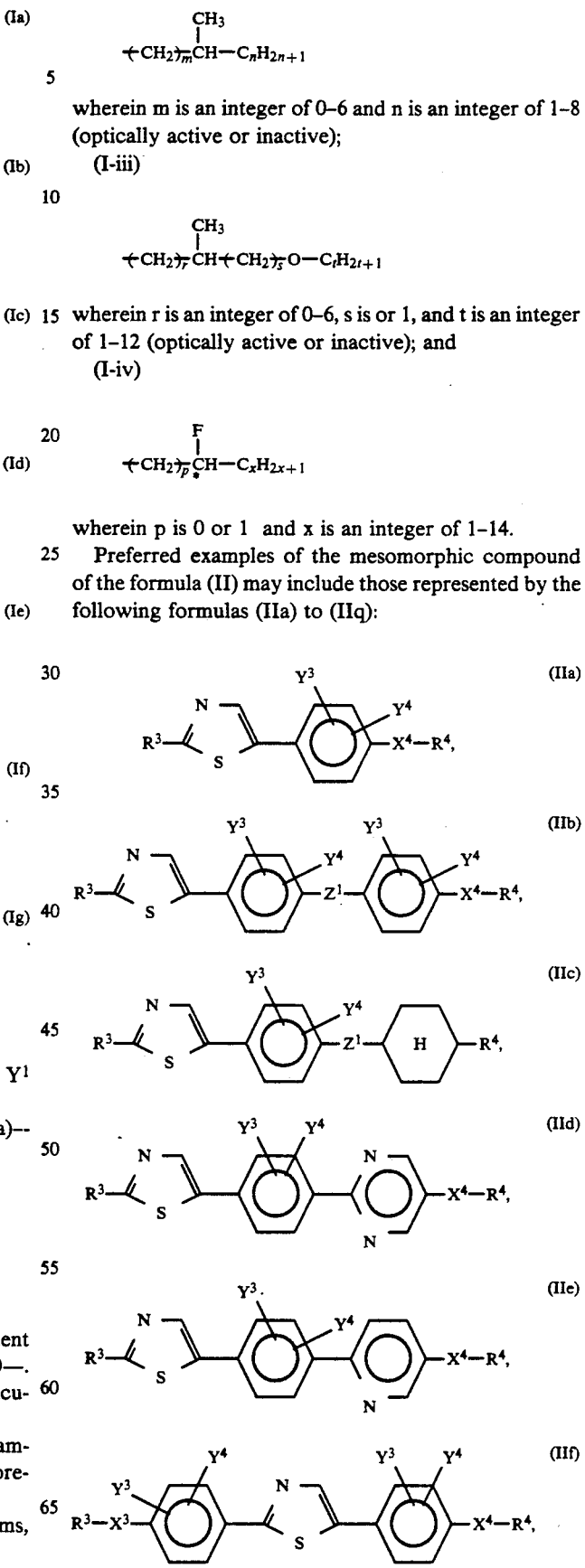

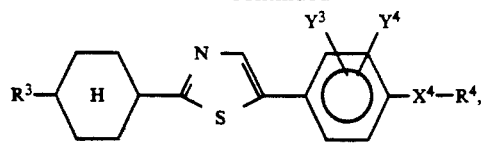 (IIg)
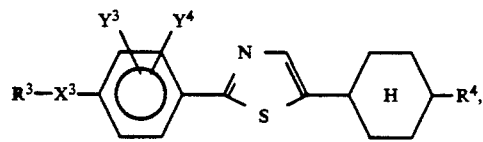 (IIh)
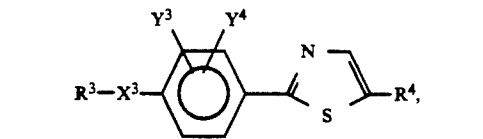 (IIi)
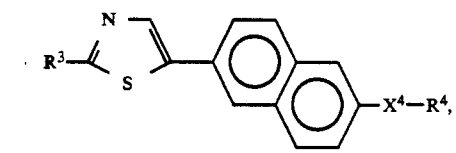 (IIj)
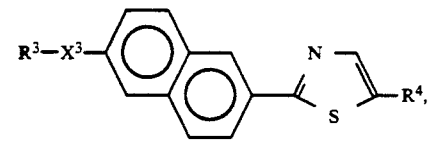 (IIk)
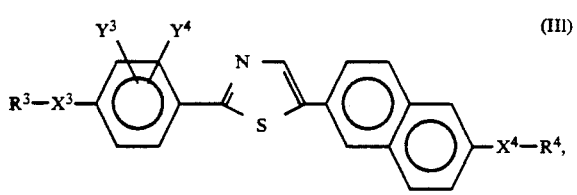 (IIl)
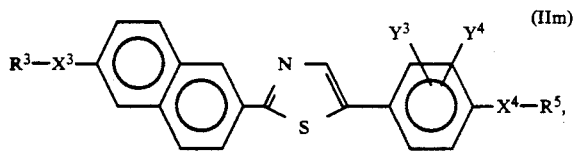 (IIm)
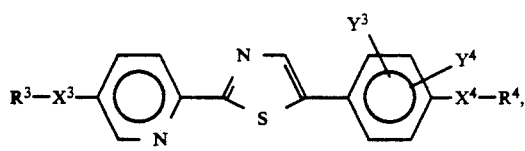 (IIn)
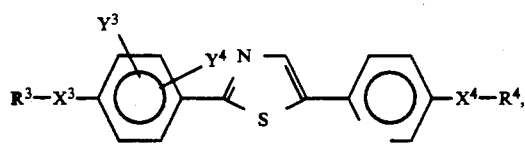 (IIo)
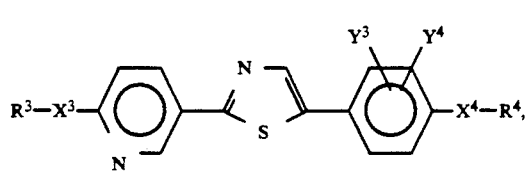 (IIp)
and
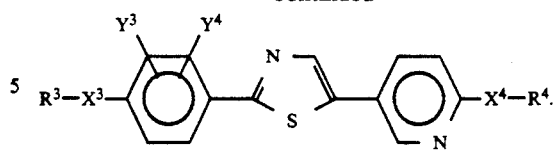 (IIq)
In the above, $R^3$, $R^4$, $X^3$, $X^4$, $Z^1$, $Y^3$ and $Y^4$ are the same as defined above.
In the above formulas (IIa)–(IIq), further preferred examples of the mesomorphic compound of the formula (II) may include those represented by the following formulas (IIaa) to (IIna):
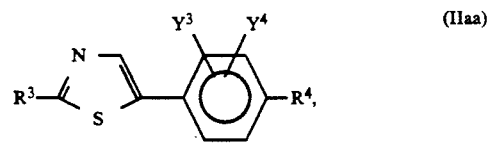 (IIaa)
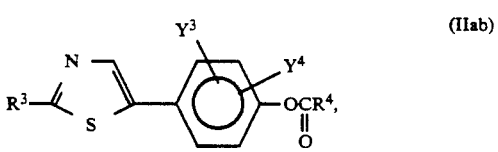 (IIab)
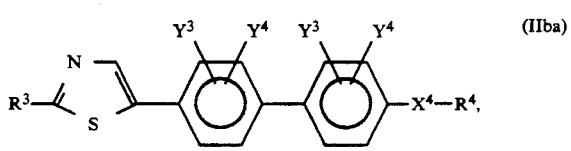 (IIba)
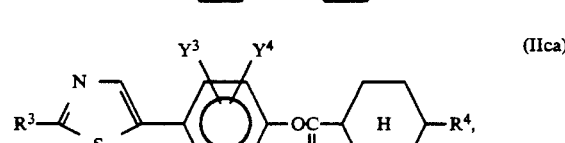 (IIca)
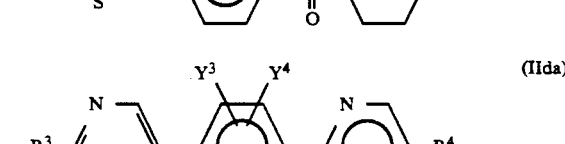 (IIda)
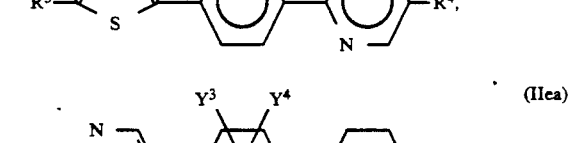 (IIea)
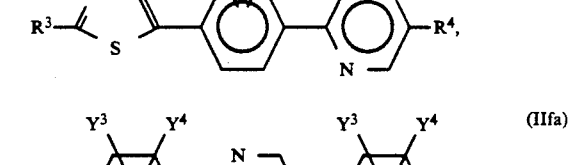 (IIfa)
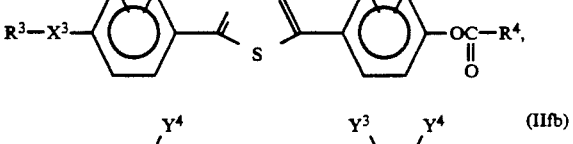 (IIfb)

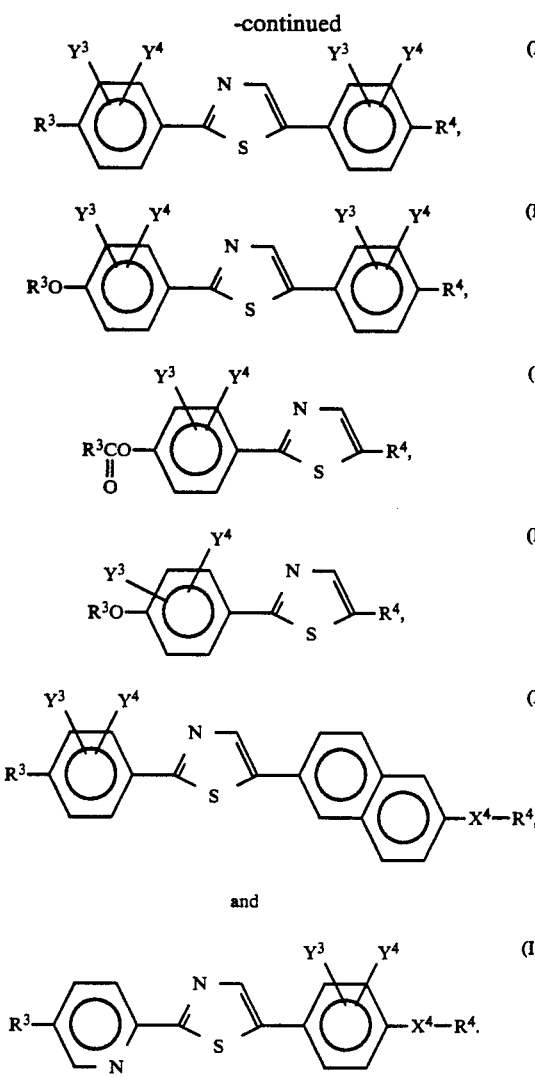

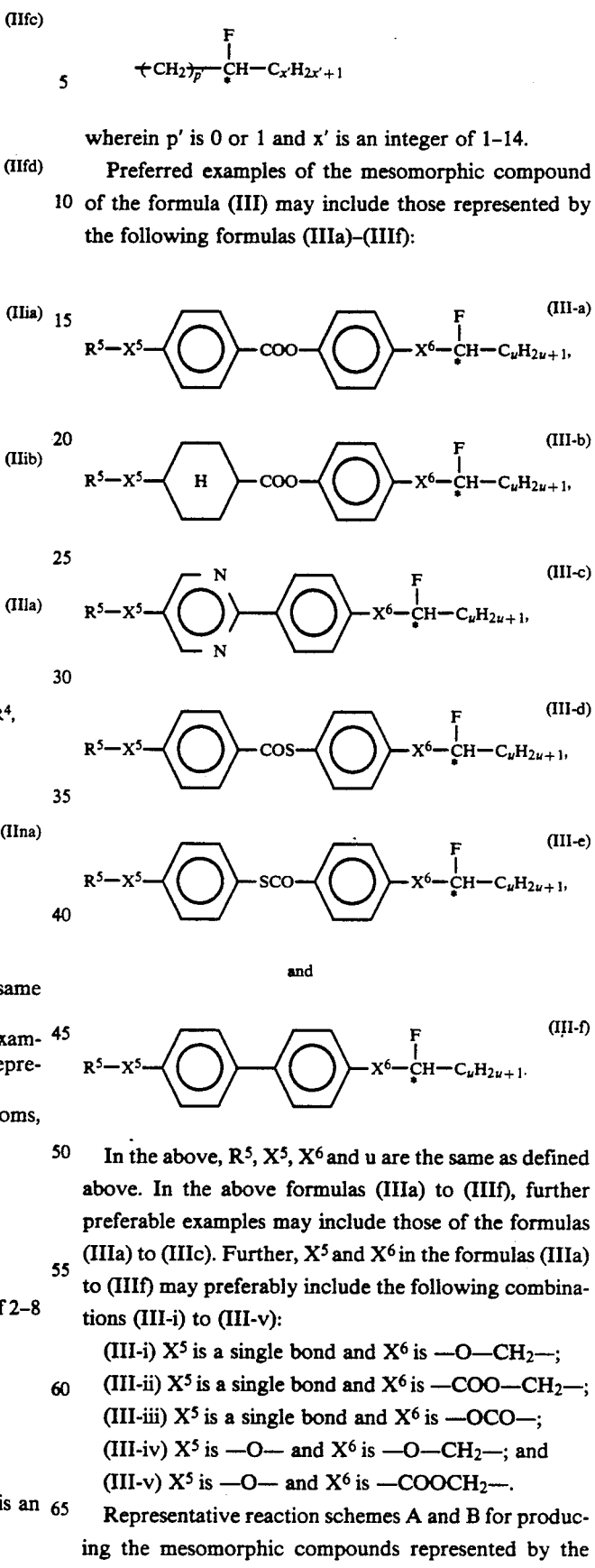

In the above, $R^3$, $R^4$, $X^3$, $X^4$, $Y^3$ and $Y^4$ are the same as defined above.

In the above-mentioned formula (II), preferred examples of $R^3$ and $R^4$ may respectively include those represented by the following groups (II-i) to (II-iv):

(II-i) an n-alkyl group having 2–16 carbon atoms, particularly 4–14 carbon atoms;

(II-ii)

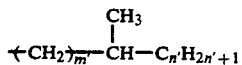

wherein m' is an integer of 0–6 and n' is an integer of 2–8 (optically active or inactive);

(II-iii)

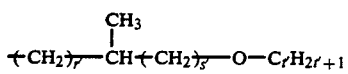

wherein r' is an integer of 0–6, s' is 0 or 1, and t' is an integer of 1–12 (optically active or inactive); and (II-iv)

$$+CH_2\overline{)_{p'}}-\overset{F}{\underset{*}{C}H}-C_{x'}H_{2x'+1}$$

wherein p' is 0 or 1 and x' is an integer of 1–14.

Preferred examples of the mesomorphic compound of the formula (III) may include those represented by the following formulas (IIIa)–(IIIf):

In the above, $R^5$, $X^5$, $X^6$ and u are the same as defined above. In the above formulas (IIIa) to (IIIf), further preferable examples may include those of the formulas (IIIa) to (IIIc). Further, $X^5$ and $X^6$ in the formulas (IIIa) to (IIIf) may preferably include the following combinations (III-i) to (III-v):

(III-i) $X^5$ is a single bond and $X^6$ is —O—CH₂—;
(III-ii) $X^5$ is a single bond and $X^6$ is —COO—CH₂—;
(III-iii) $X^5$ is a single bond and $X^6$ is —OCO—;
(III-iv) $X^5$ is —O— and $X^6$ is —O—CH₂—; and
(III-v) $X^5$ is —O— and $X^6$ is —COOCH₂—.

Representative reaction schemes A and B for producing the mesomorphic compounds represented by the above formula (I) are shown below.

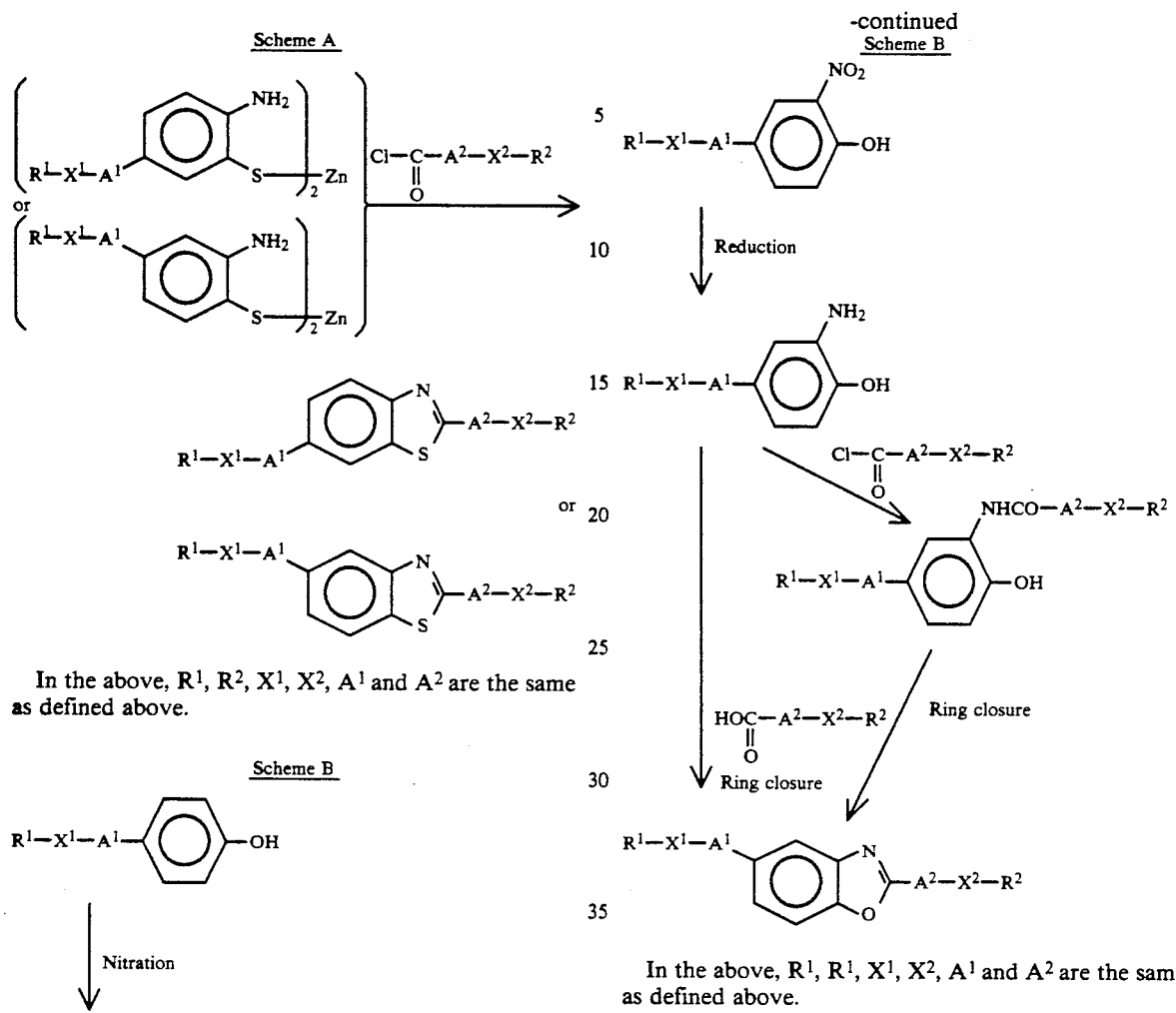
In the above, $R^1$, $R^2$, $X^1$, $X^2$, $A^1$ and $A^2$ are the same as defined above.
In the above, $R^1$, $R^1$, $X^1$, $X^2$, $A^1$ and $A^2$ are the same as defined above.
Specific examples of the mesomorphic compounds represented by the above-mentioned general formula (I) may include those shown by the following structural formulas.
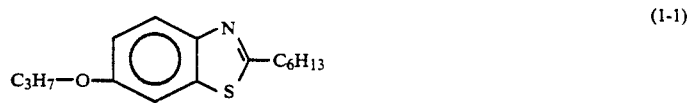
(1-1)
(1-2)
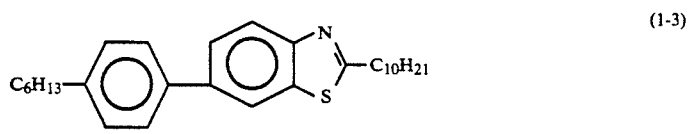
(1-3)
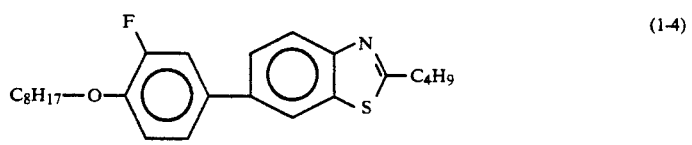
(1-4)

-continued
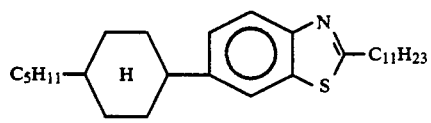 (1-5)
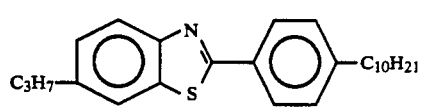 (1-6)
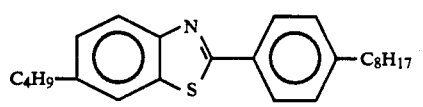 (1-7)
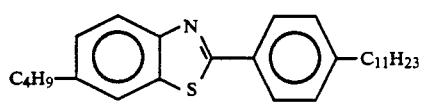 (1-8)
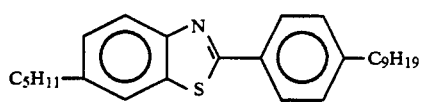 (1-9)
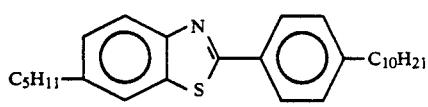 (1-10)
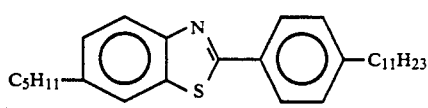 (1-11)
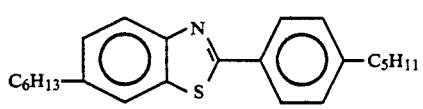 (1-12)
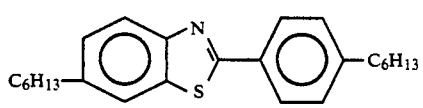 (1-13)
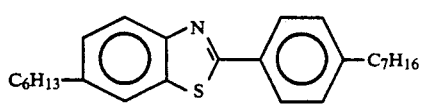 (1-14)
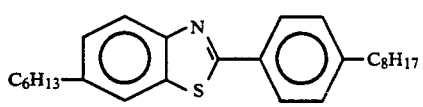 (1-15)
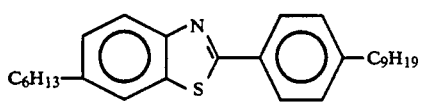 (1-16)
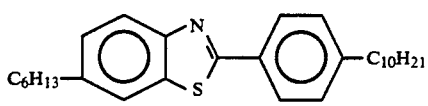 (1-17)

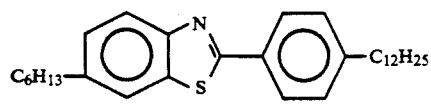 (1-18)
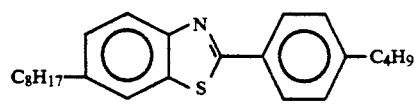 (1-19)
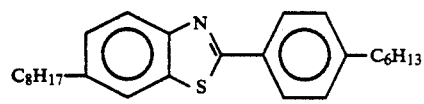 (1-20)
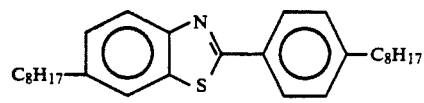 (1-21)
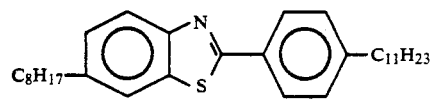 (1-22)
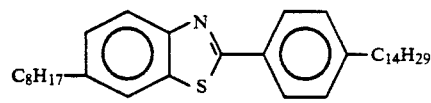 (1-23)
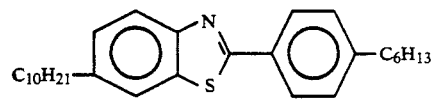 (1-24)
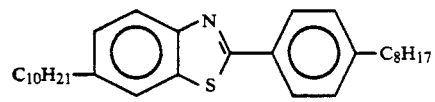 (1-25)
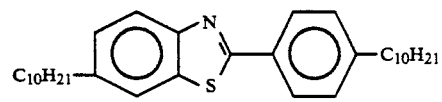 (1-26)
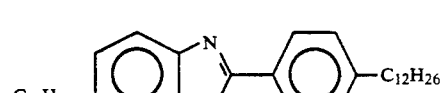 (1-27)
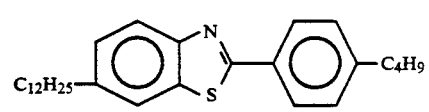 (1-28)
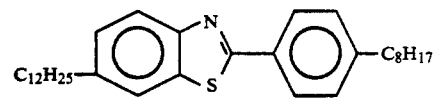 (1-29)
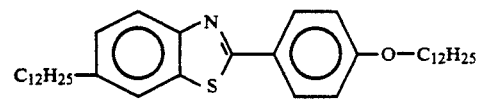 (1-30)
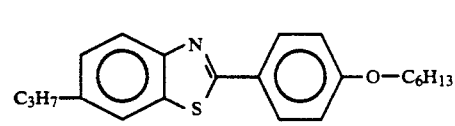 (1-31)

-continued
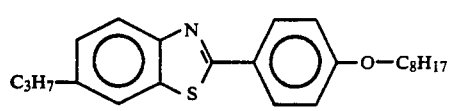 (1-32)
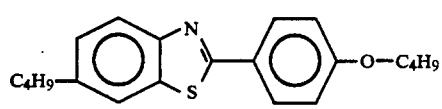 (1-33)
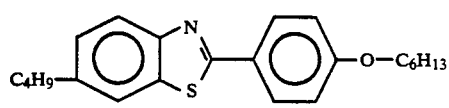 (1-34)
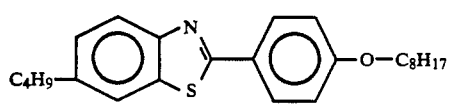 (1-35)
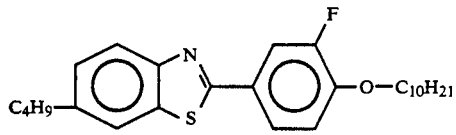 (1-36)
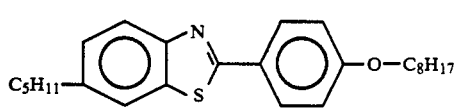 (1-37)
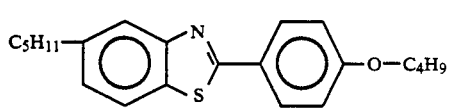 (1-38)
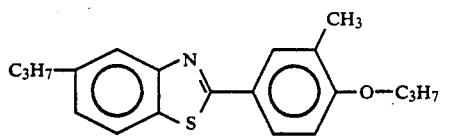 (1-39)
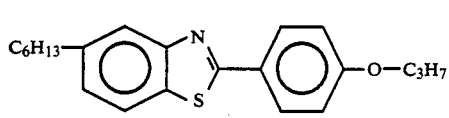 (1-40)
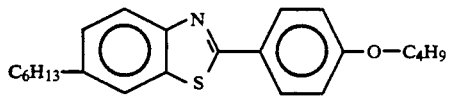 (1-41)
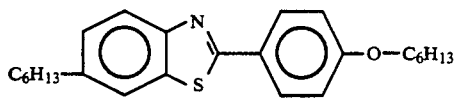 (1-42)
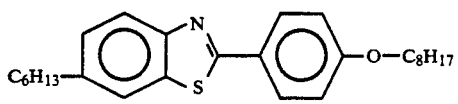 (1-43)
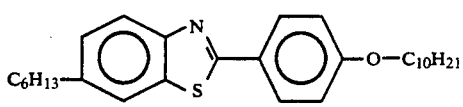 (1-44)

-continued
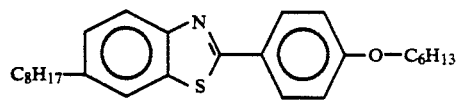 (1-45)
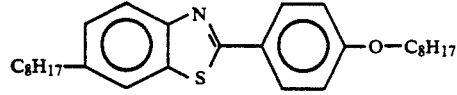 (1-46)
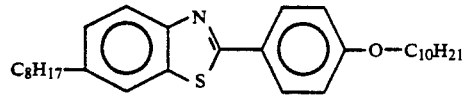 (1-47)
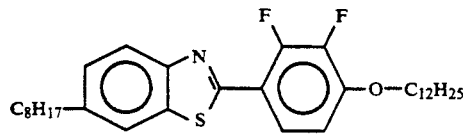 (1-48)
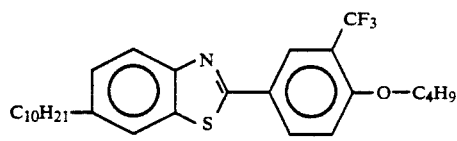 (1-49)
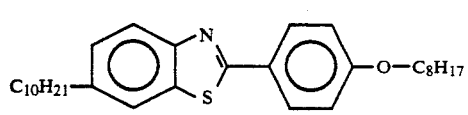 (1-50)
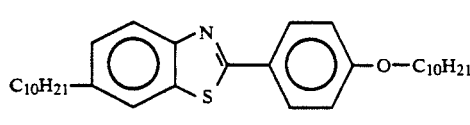 (1-51)
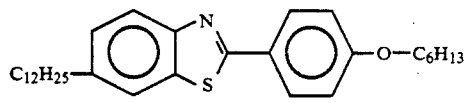 (1-52)
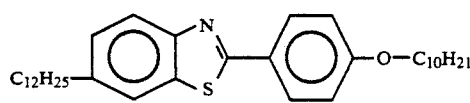 (1-53)
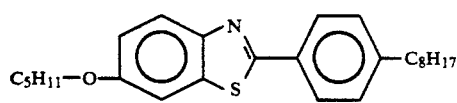 (1-54)
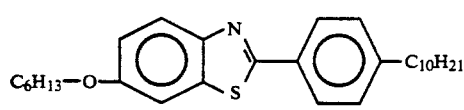 (1-55)
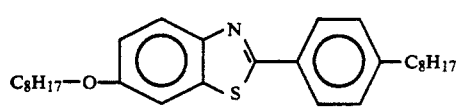 (1-56)
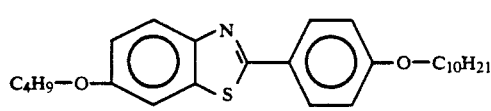 (1-57)

-continued
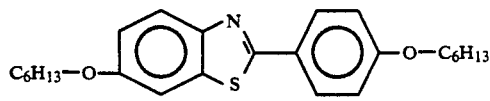 (1-58)
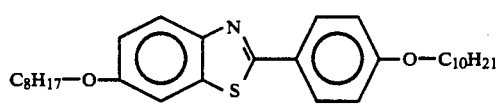 (1-59)
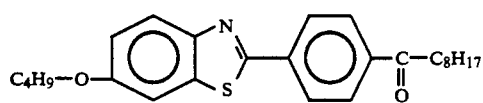 (1-60)
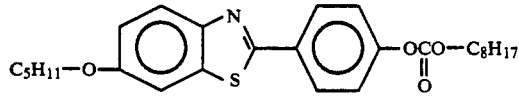 (1-61)
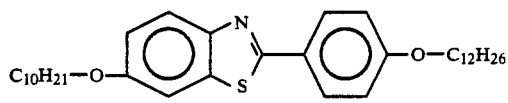 (1-62)
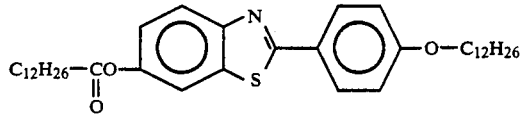 (1-63)
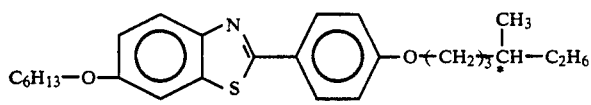 (1-64)
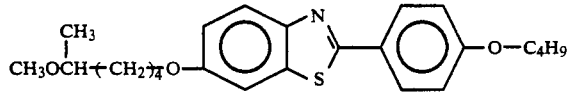 (I-65)
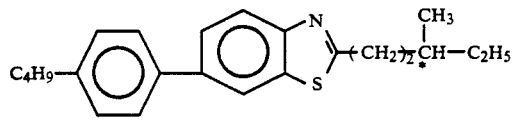 (I-66)
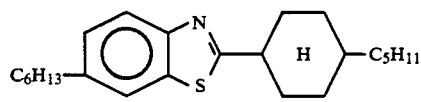 (1-67)
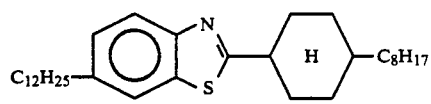 (1-68)
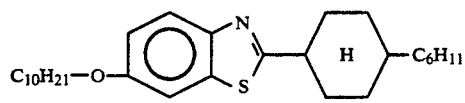 (1-69)
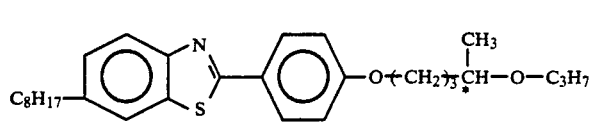 (1-70)

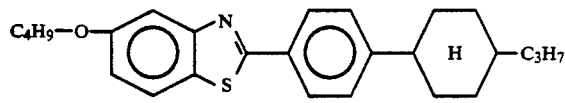 (1-71)
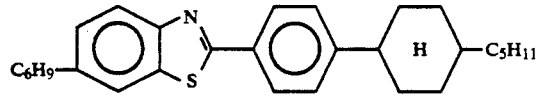 (1-72)
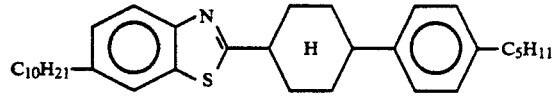 (1-73)
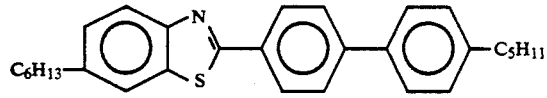 (1-74)
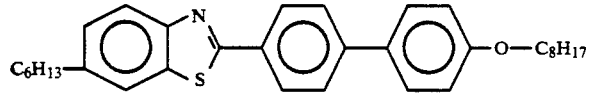 (1-75)
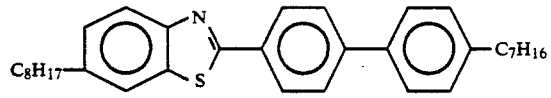 (1-76)
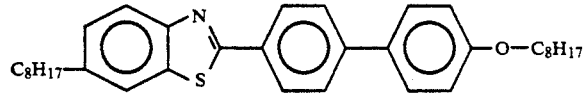 (1-77)
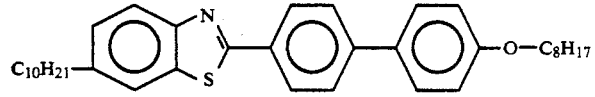 (1-78)
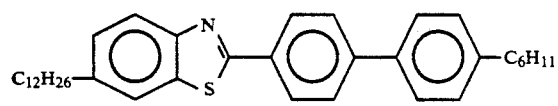 (1-79)
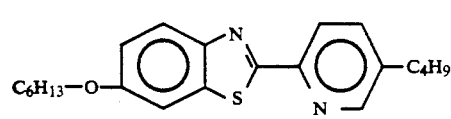 (1-80)
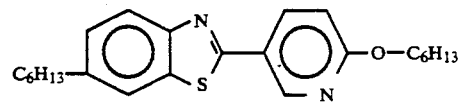 (1-81)
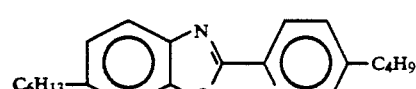 (1-82)
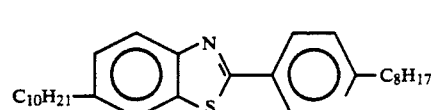 (1-83)

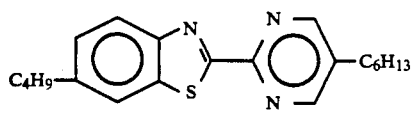 (1-84)
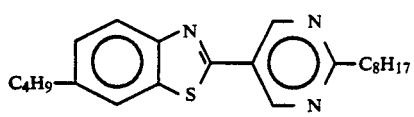 (1-85)
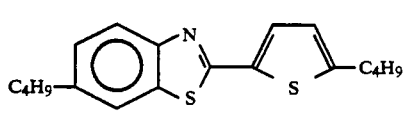 (1-86)
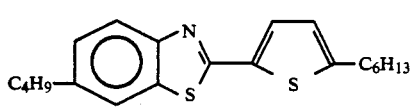 (1-87)
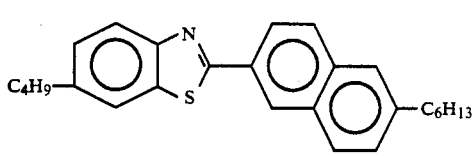 (1-88)
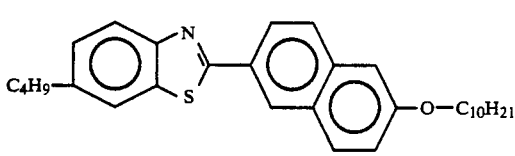 (1-89)
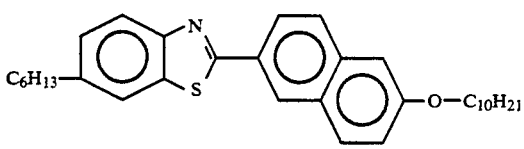 (1-90)
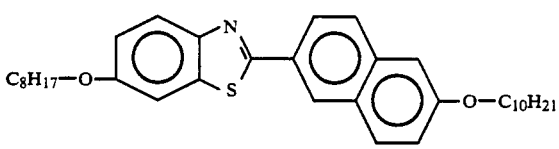 (1-91)
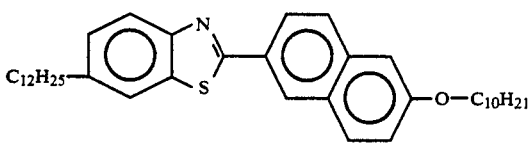 (1-92)
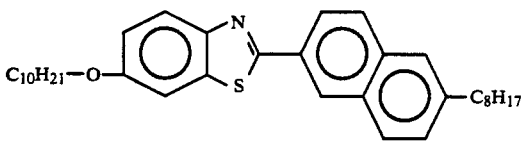 (1-93)
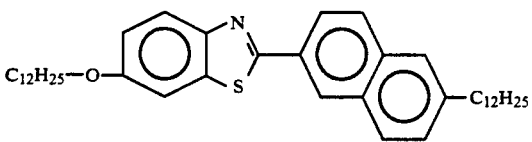 (1-94)

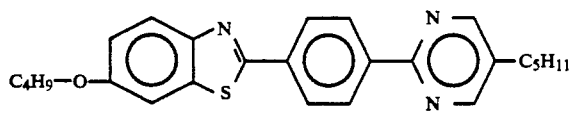 (1-95)
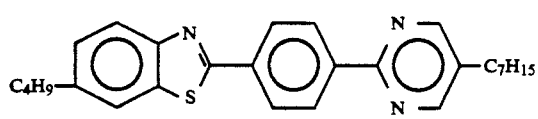 (1-96)
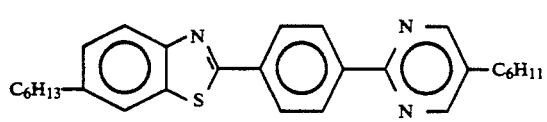 (1-97)
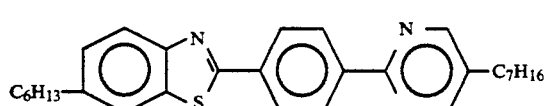 (1-98)
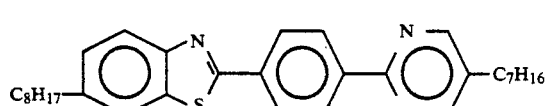 (1-99)
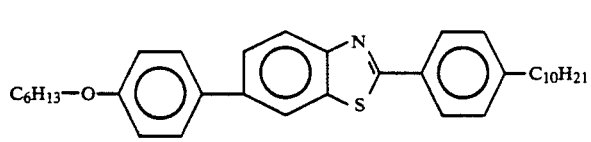 (1-100)
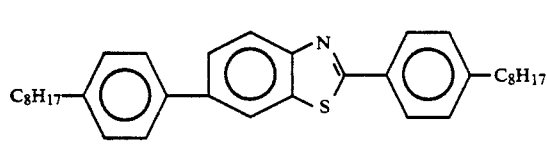 (1-101)
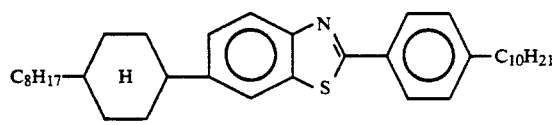 (1-102)
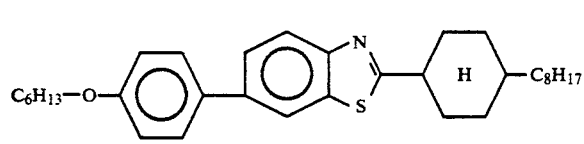 (1-103)
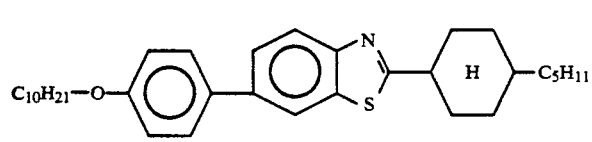 (1-104)
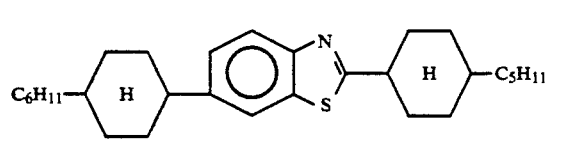 (1-105)
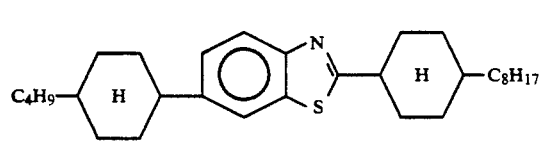 (1-106)

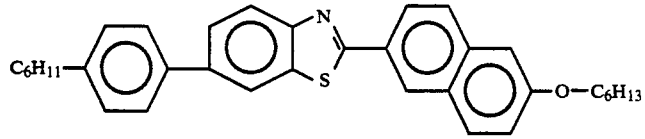 (1-107)
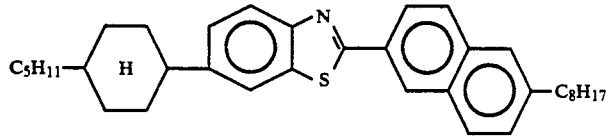 (1-108)
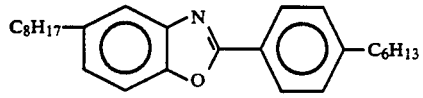 (1-109)
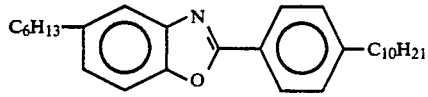 (1-110)
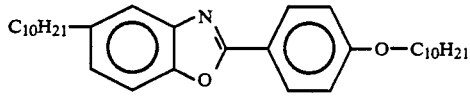 (1-111)
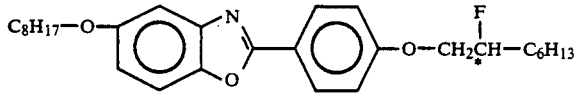 (1-112)
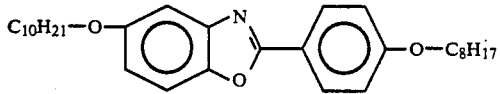 (1-113)
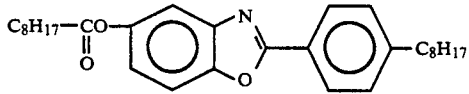 (1-114)
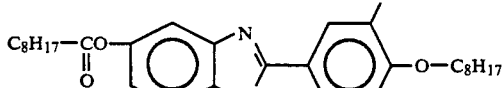 (1-115)
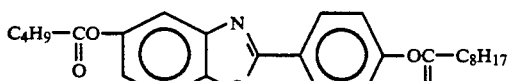 (1-116)
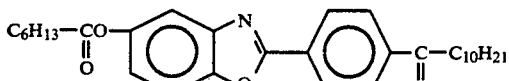 (1-117)
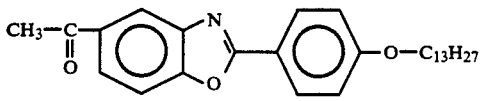 (1-118)
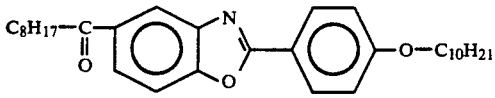 (1-119)

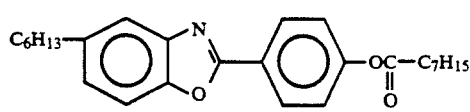
(1-120)
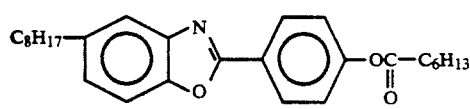
(1-121)
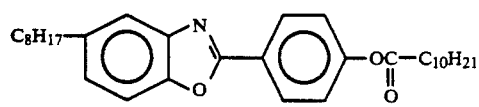
(1-122)
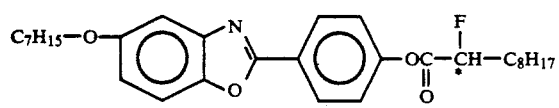
(1-123)
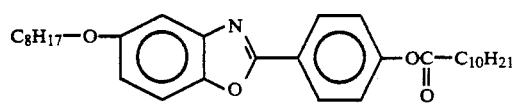
(1-124)
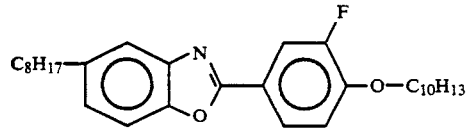
(1-125)
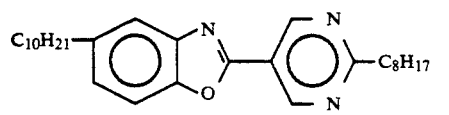
(1-126)
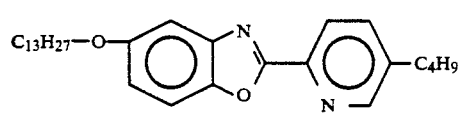
(1-127)
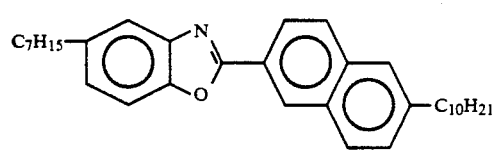
(1-128)
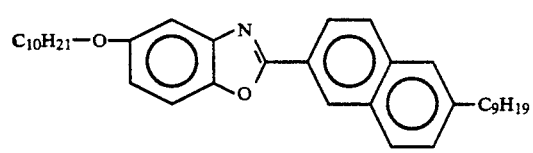
(1-129)
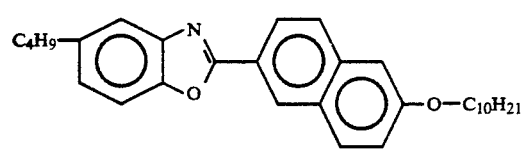
(1-130)
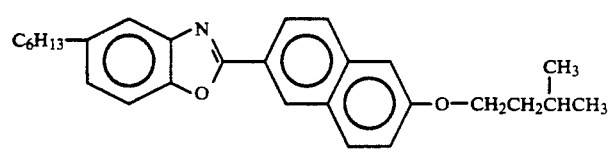
(1-131)

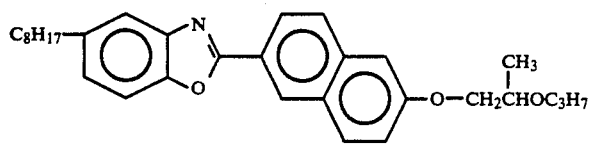 (1-132)
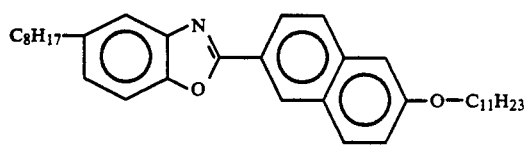 (1-133)
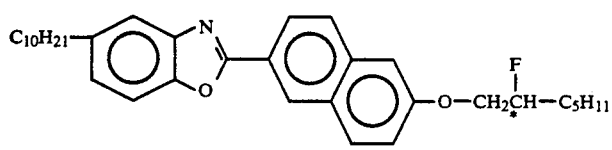 (1-134)
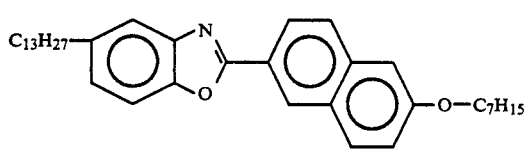 (1-135)
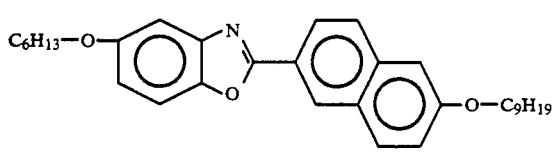 (1-136)
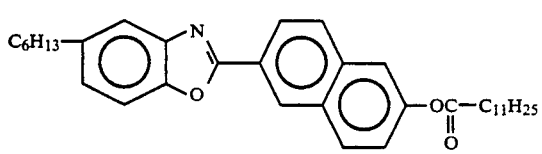 (1-137)
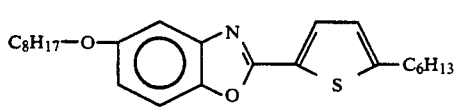 (1-138)
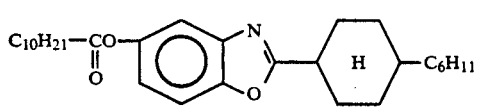 (1-139)
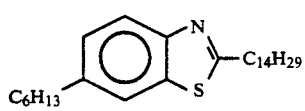 (1-140)
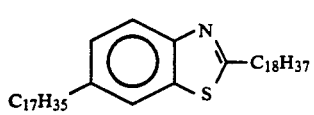 (1-141)
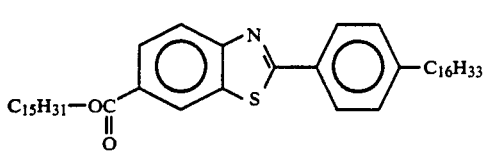 (1-142)

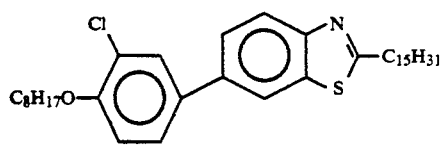 (1-143)
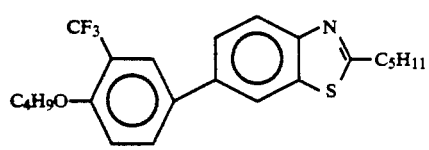 (1-144)
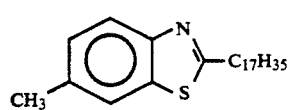 (145)
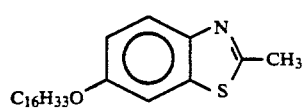 (1-146)
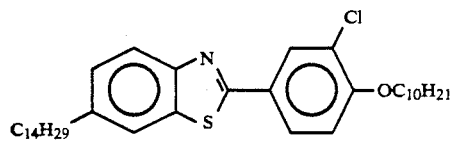 (147)
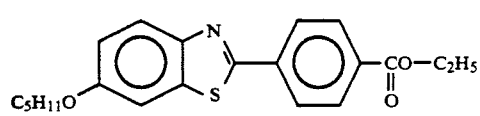 (148)
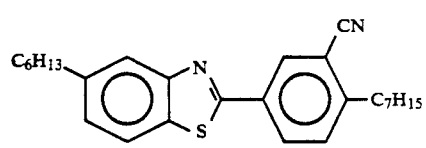 (149)
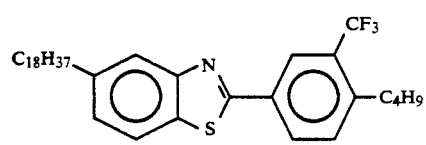 (150)
Representative examples of synthesis of the compounds of the formula (I) are shown below.
SYNTHESIS EXAMPLE 1
2-(p-octylphenyl)-6-hexylbenzothiazole (Example Compound No. 1-15) was synthesized through the following steps i)–iii).
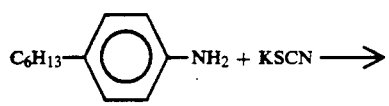 i)
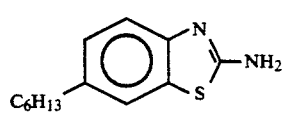
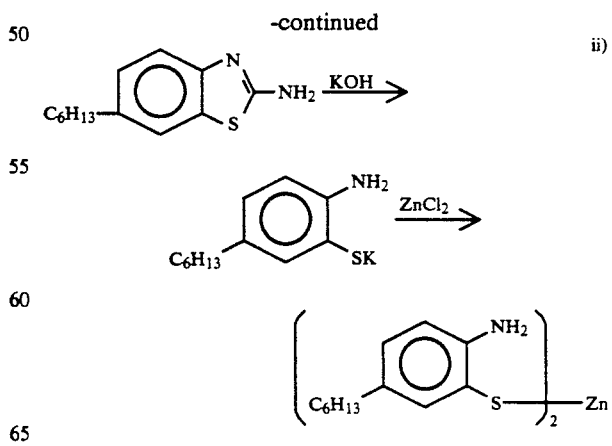

-continued

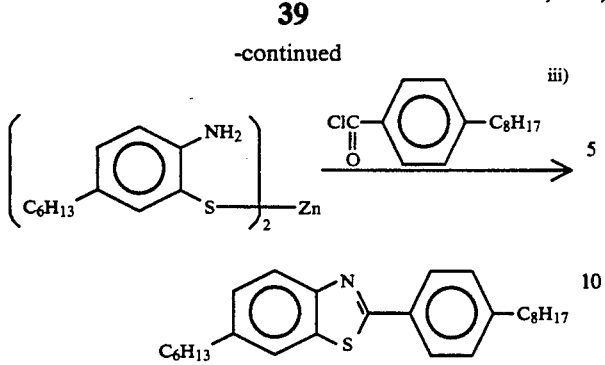

Step i) Production of 2-amino-6-hexylbenzothiazole

In a 2 liter-reaction vessel, 50.0 g (0.28M) of p-hexylaniline, 54.8 g (0.56M) of potassium thiocyanate and 400 ml of acetic acid were placed and cooled below 10° C. To the mixture, a solution of 45.0 g of bromine in 135 ml of acetic acid was added dropwise in 40 minutes below 10° C. under strong stirring, followed by reaction for 1.5 hours below 10° C. After the reaction, 500 ml of water was poured into the reaction mixture, followed by heating to dissolve the resultant precipitate. The resultant solution was filtered under heating. Ammonia water was added to the filtrate until the resultant solution became basic, followed by cooling with ice to precipitate a crystal. The crystal was recovered by filtration, followed by washing and drying to obtain a crude product. The crude product was recrystallized from a mixture solvent of n-hexane/benzene (1/1) to obtain 33.0 g of 2-amino-6-hexylbenzothiazole (Yield: 49.9 %).

Step ii) Production of zinc 5-hexyl-2-aminobenzenethiol

In a 1 liter-reaction vessel, 30.0 g (0.128M), 136 ml of water and 136.4 g of KOH were placed, followed by heat-refluxing for 6.5 hours. After the reaction, the reaction mixture was cooled to precipitate a crystal Then, ethanol was added to the resultant reaction mixture to dissolve the crystal. To the solution, 5N-acetic acid aqueous solution was added dropwise until the resultant mixture showed pH=9 to provide precipitate. The precipitate was filtered off and a solution of 8.9 g of $ZnCl_2$ in 40 ml of 15 %-acetic acid aqueous solution was added dropwise to the resultant filtrate to precipitate a crystal. The crystal was recovered by filtration after heating for 30 minutes at 70° C., followed by washing with hot water, ethanol and water in succession. The resultant crystal was dried to obtain 27.Q g Of zinc 5-hexyl-2-aminobenzenethiol (Yield: 73.4 %).

Step iii) Production of 2-(p-octylphenyl)-6-hexylbenzothiazole 20 ml of thionyl chloride was added to 3.74 g (16.0 mM) of p-octylbenzoic acid, followed by heat-refluxing for 1 hour. After the heat-refluxing, excessive thionyl chloride was distilled off under reduced pressure, followed by distilling-off thereof with benzene. To the resultant acid chloride, 3.84 g (8.0 mM) of zinc 5-hexyl-2-aminobenzenethiol was added, followed by stirring for 30 minutes at 200° C. After the reaction, the reaction mixture was cooled under room temperature. To the resultant reaction mixture, 40 ml of dilute sodium hydroxide aqueous solution was added, followed by extraction with ethyl acetate, washing with water, drying with anhydrous magnesium sulfate and distilling-off of the solvent to obtain a crude product. The crude product was purified by silica gel column chromatography (developing solvent: hexane/benzene=10/1) and treated with activated carbon followed by recrystallization from ethanol to obtain 3.45 g of 2-(p-octylphenyl)-6-hexylbenzothiazole (Yield: 52.9 %).

Phase transition temperature (°C.)

$$\text{Cryst.} \underset{32}{\overset{62}{\rightleftarrows}} \text{SmA} \underset{66}{\overset{69}{\rightleftarrows}} \text{Iso.}$$

Herein, the respective symbols denote the following phases; Iso.: isotropic phase; SmA: smectic A phase; and Cryst.: crystal.

SYNTHESIS EXAMPLE 2

2-(6-decyloxy-2-naphthyl)-5-butylbenzoxazole (Example Compound No. 1-130) was synthesized through the following reaction scheme.

In a 50 ml-three-necked flask, 0.40 g (2.42 mM) of 2-amino-4-butylphenol, 0.95 g (2.74 mM) of 6-decyloxy-2-naphthoyl chloride and 10 ml of dioxane were placed. To the mixture. 0.81 ml of pyridine was gradually added dropwise at about 75° C. under stirring, followed by heat-stirring for 20 minutes at about 80°-90° C. After the reaction, the reaction mixture was poured into 80 ml of water to precipitate a crystal. The crystal was recovered by filtration, washed with water and recrystallized from acetone to obtain 1.00 g of 2-(6-decyloxy-2-naphthoylamino)-4-butylphenyl (yield: 86.8 %).

In a 20 ml-round-bottomed flask, 0.95 g (2.00 mM) of 2-(6-decyloxy-2-naphthoylamino)-4-butylphenol, 0.07 g of p-toluenesulfonic acid monohydrate and 8 ml of o-dichlorobenzene were placed, followed by stirring for 30 min. at 200°-203° C. After the reaction, o-dichlorobenzene was distilled-off under reduced pressure. The residue was purified by silica gel column chromatography (eluent: toluene/hexane=1/1) and recrystallized from acetone) to obtain 0.56 g of 2-(6-decyloxy-2-naphthyl)-5-butyl-benzoxazole (yield: 61.3%).

Phase transition temperature (°C.)

$$\text{Cryst.} \underset{69.4}{\overset{90.1}{\rightleftarrows}} \text{SmA} \underset{108.5}{\overset{109.9}{\rightleftarrows}} \text{Iso.}$$

Then, the compounds represented by the general formula (II) may be synthesized through the following reaction schemes A and B.

Reaction scheme A

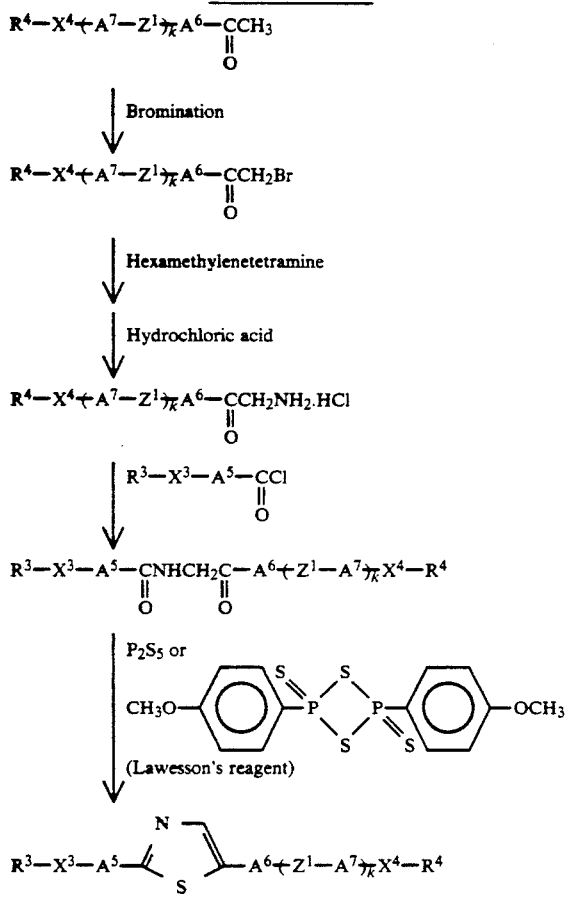

Reaction scheme B

H₂N—CH₂COOH

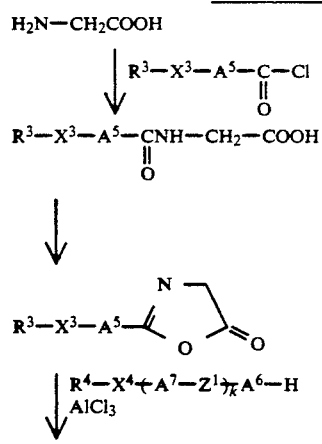

-continued
Reaction scheme B

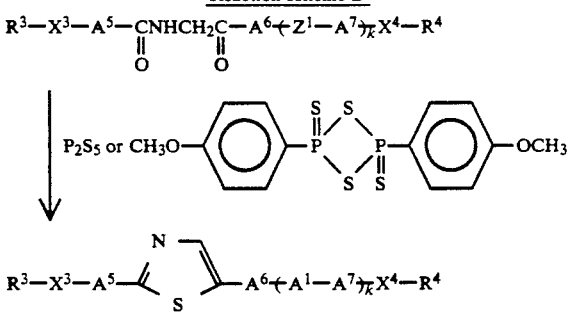

In a case where $X^3$, $X^4$ and $Z^1$ are respectively —O—,

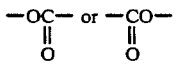

or it is also possible to form a group of $R^3$—$X^3$—$A^5$— or

through the following steps (a) to (c):

(a) Hydroxyl group or carboxyl group combined with $A^5$, $A^6$ and $A^7$ is modified with addition of a protective group into a non-reactive or less reactive group such as —OCH₃,

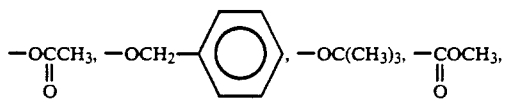

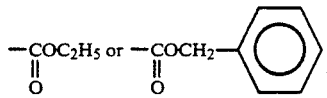

capable of elimination reaction.

(b) Ring closure is effected to form a thiazole ring.

(c) The protective group is eliminated and then the $R^7$—$X^3$—$A^5$— or

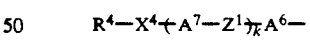

structure is formed.

Specific examples of the mesomorphic compounds represented by the above-mentioned general formula (II) may include those shown by the following structural formulas.

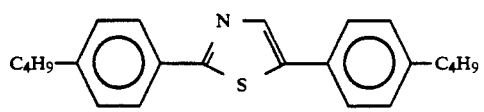

(2-1)

-continued
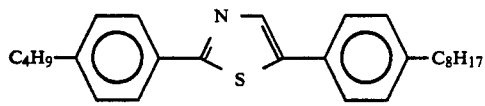 (2-2)
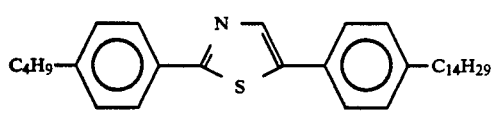 (2-3)
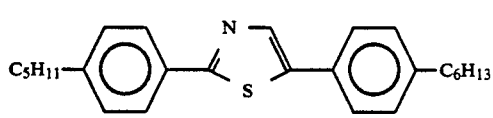 (2-4)
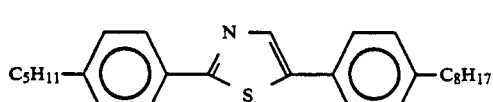 (2-5)
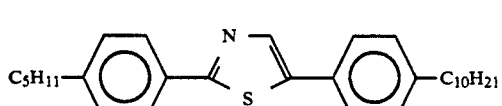 (2-6)
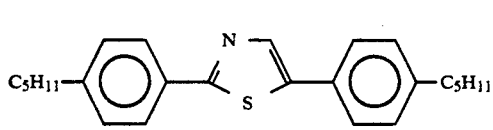 (2-7)
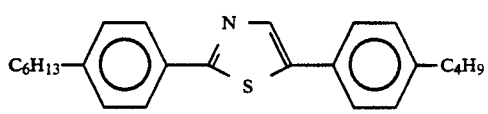 (2-8)
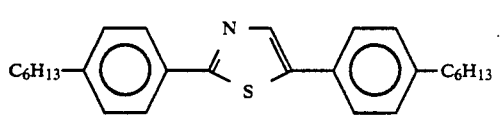 (2-9)
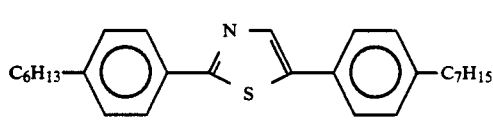 (2-10)
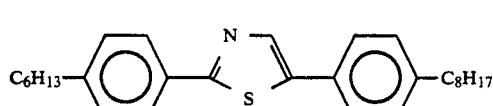 (2-11)
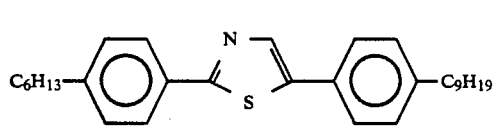 (2-12)
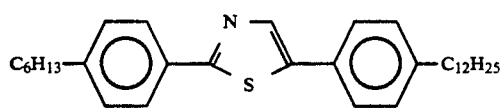 (2-13)
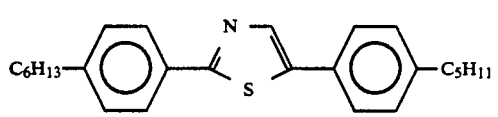 (2-14)
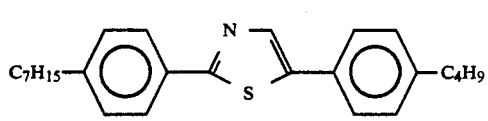 (2-15)

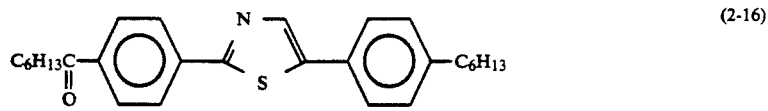 (2-16)
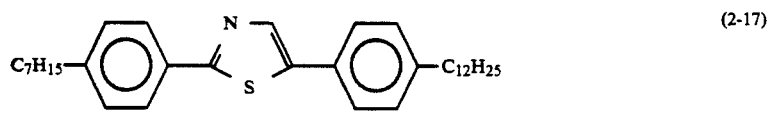 (2-17)
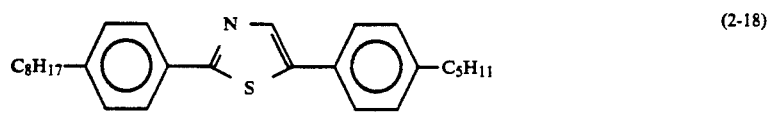 (2-18)
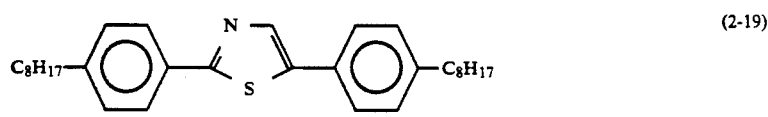 (2-19)
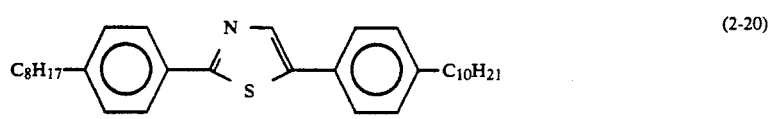 (2-20)
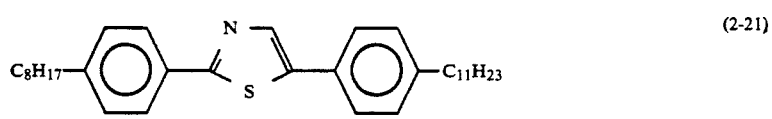 (2-21)
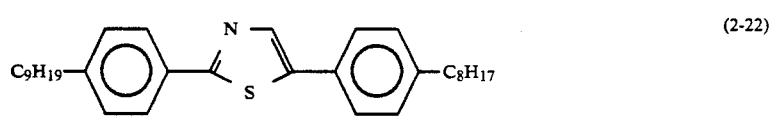 (2-22)
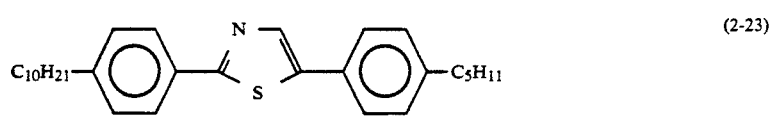 (2-23)
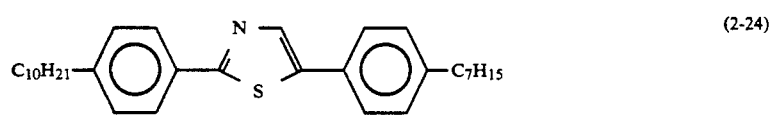 (2-24)
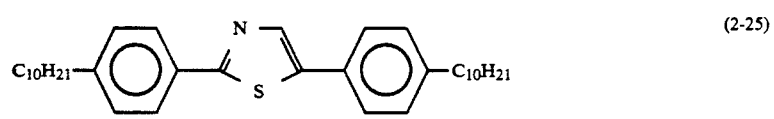 (2-25)
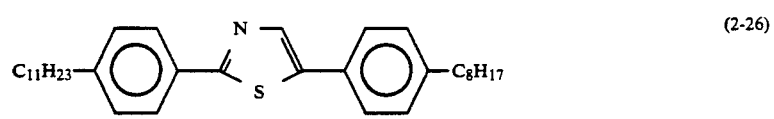 (2-26)
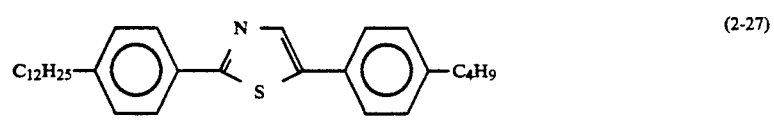 (2-27)
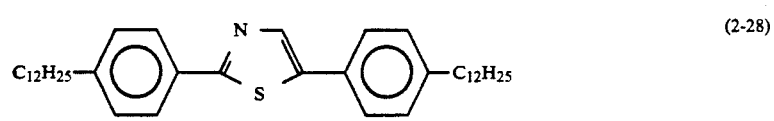 (2-28)

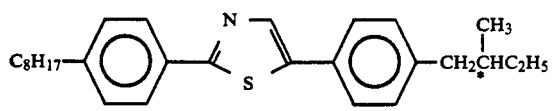 (2-29)
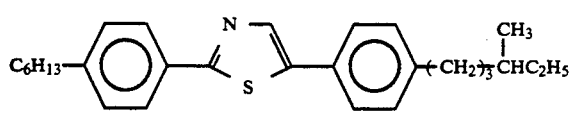 (2-30)
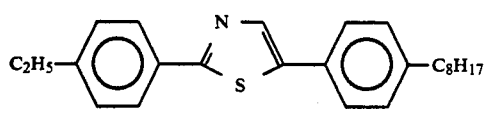 (2-31)
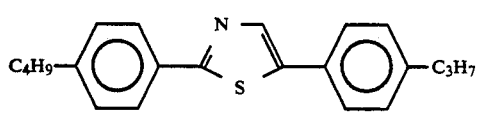 (2-32)
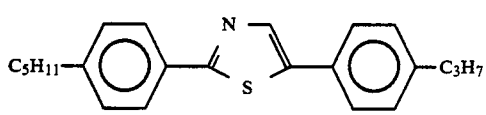 (2-33)
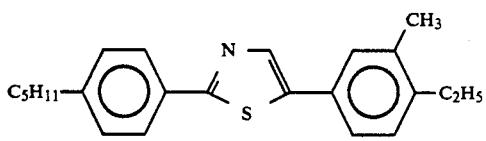 (2-34)
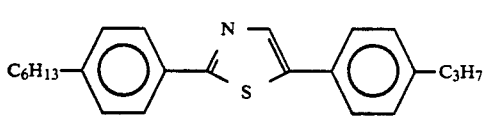 (2-35)
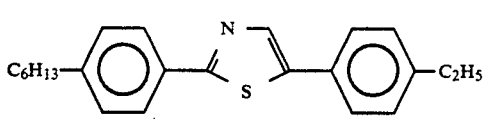 (2-36)
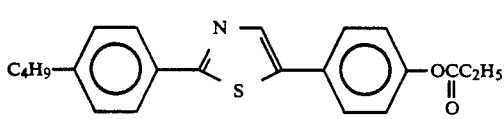 (2-37)
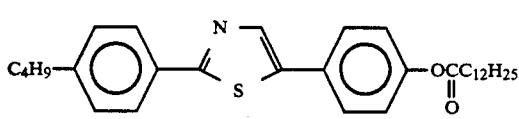 (2-38)
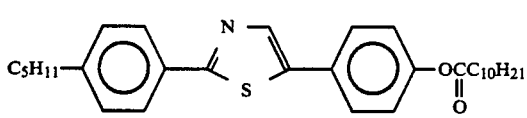 (2-39)
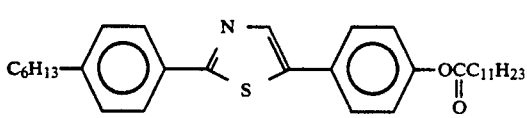 (2-40)
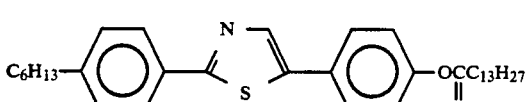 (2-41)
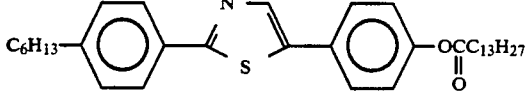

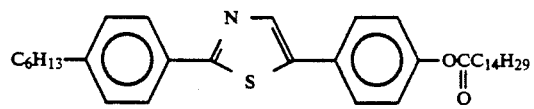 (2-42)
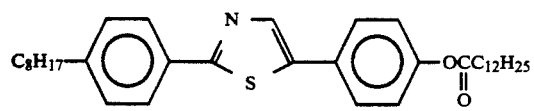 (2-43)
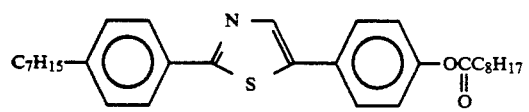 (2-44)
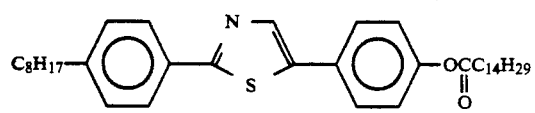 (2-45)
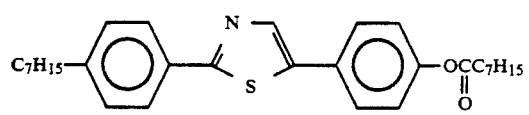 (2-46)
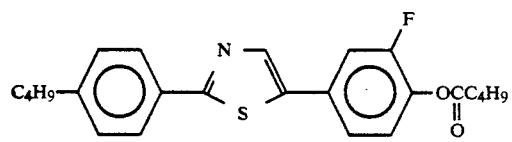 (2-47)
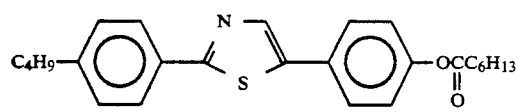 (2-48)
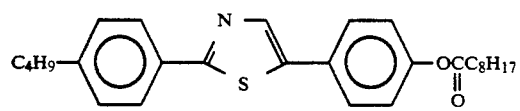 (2-49)
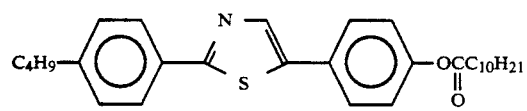 (2-50)
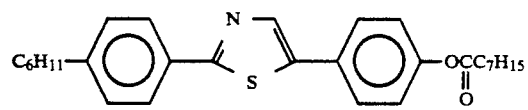 (2-51)
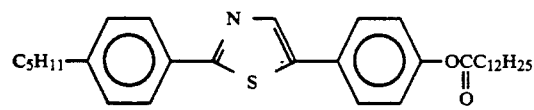 (2-52)
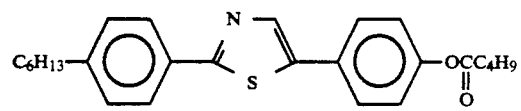 (2-53)
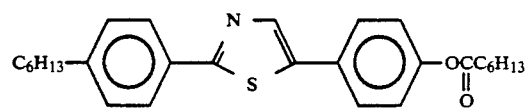 (2-54)

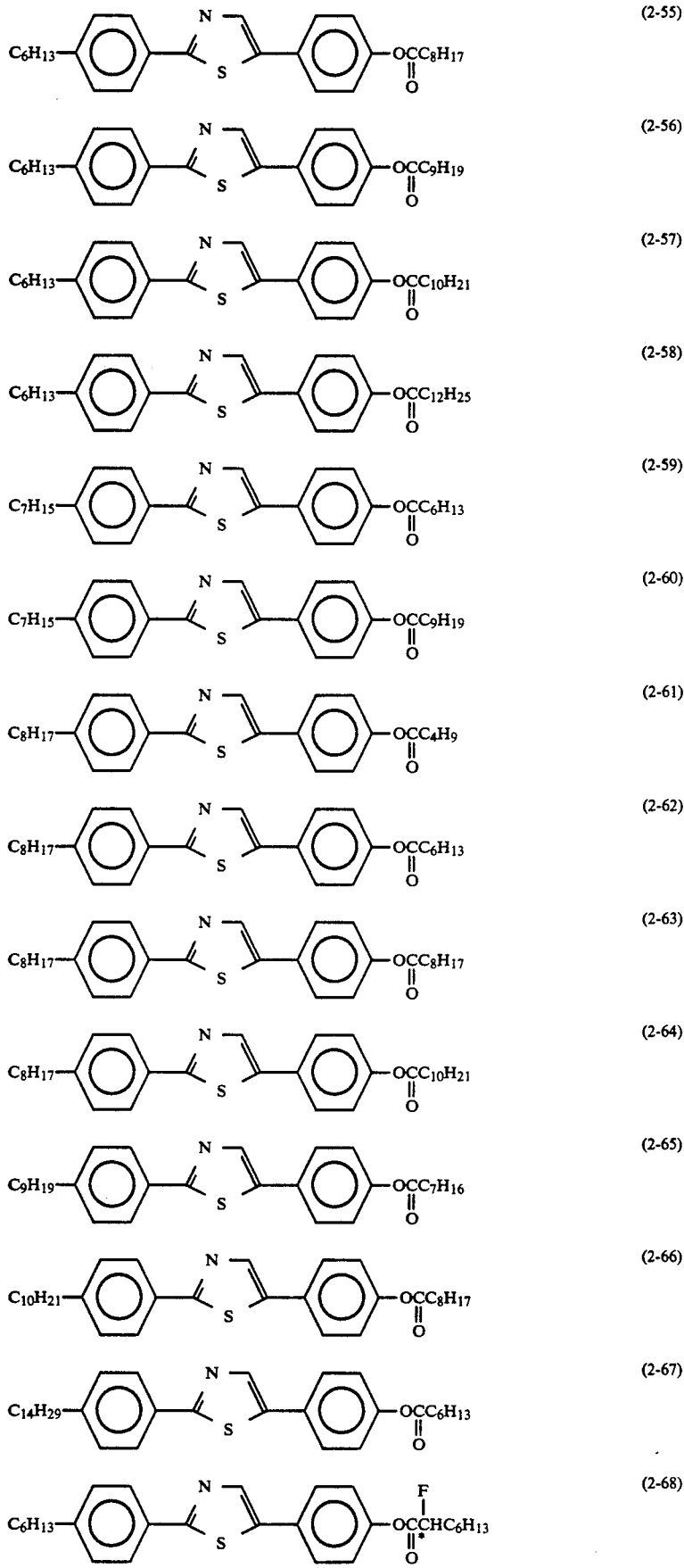

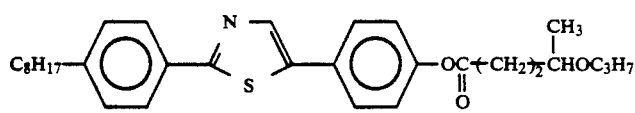
(2-69)
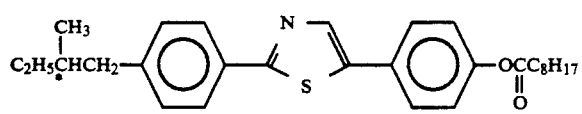
(2-70)
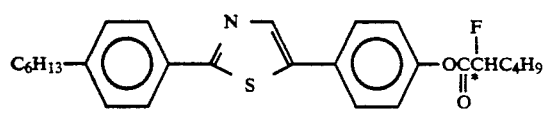
(2-71)
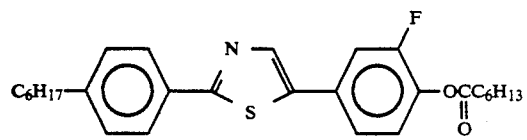
(2-72)
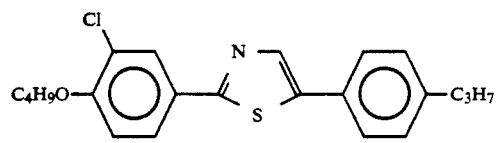
(2-73)
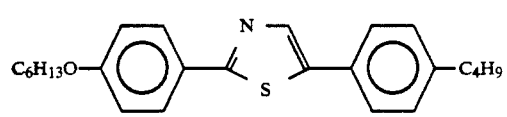
(2-74)
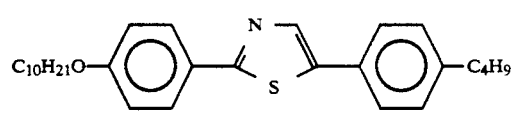
(2-75)
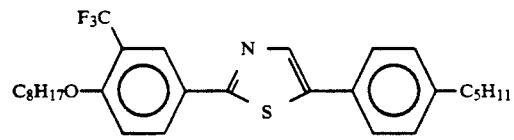
(2-76)
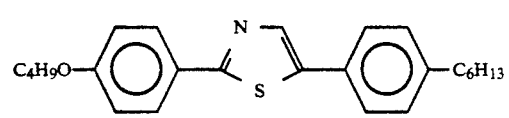
(2-77)
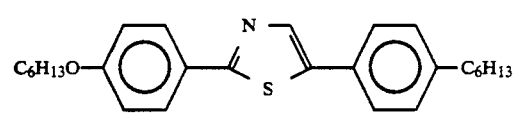
(2-78)
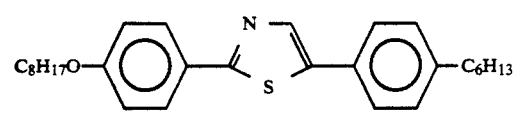
(2-79)
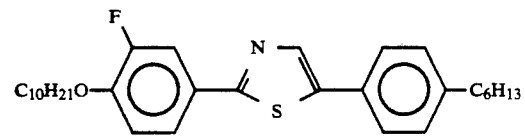
(2-80)
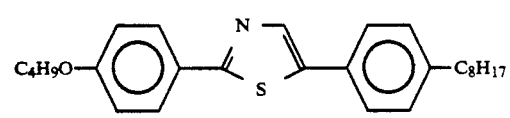
(2-81)

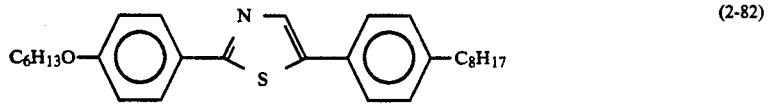 (2-82)
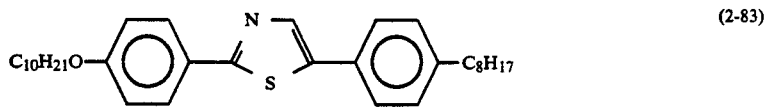 (2-83)
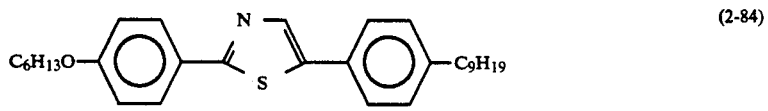 (2-84)
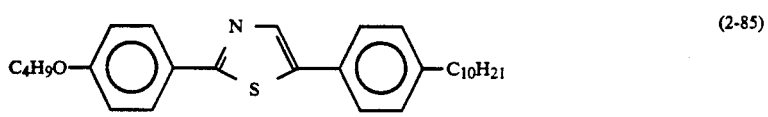 (2-85)
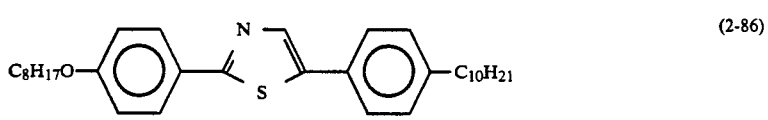 (2-86)
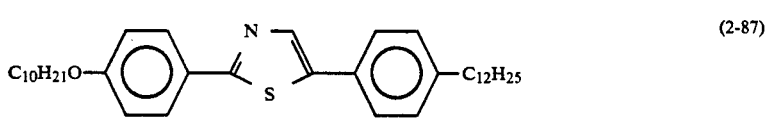 (2-87)
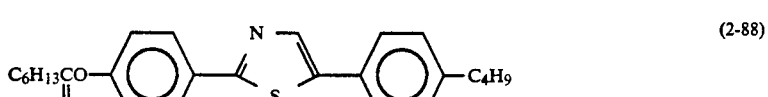 (2-88)
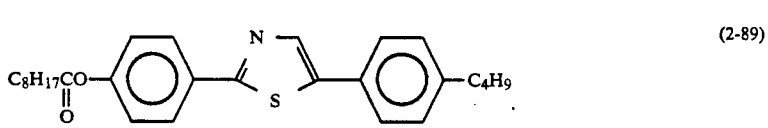 (2-89)
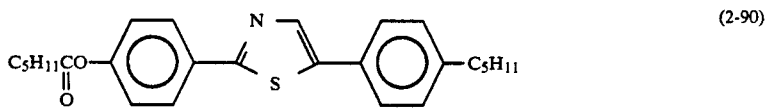 (2-90)
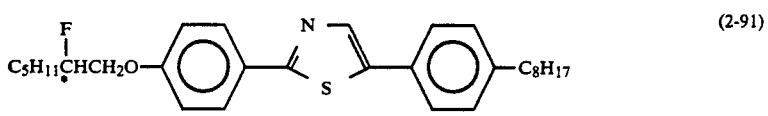 (2-91)
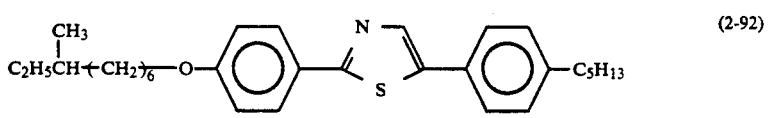 (2-92)
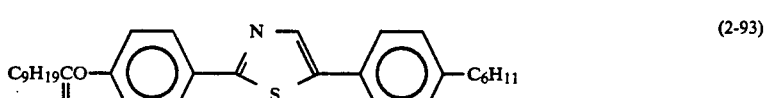 (2-93)
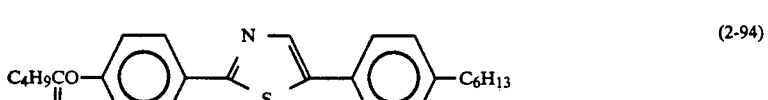 (2-94)

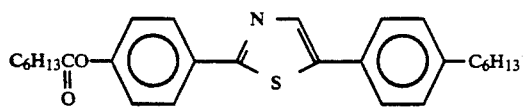 (2-95)
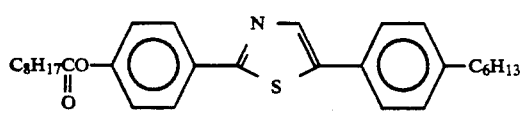 (2-96)
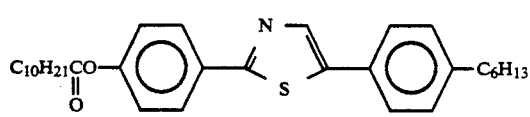 (2-97)
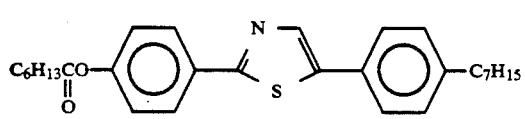 (2-98)
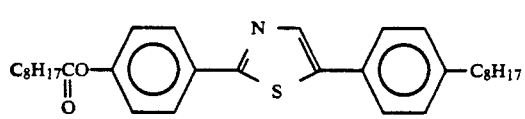 (2-99)
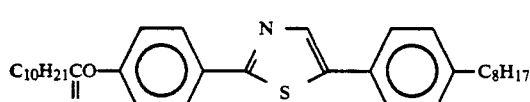 (2-100)
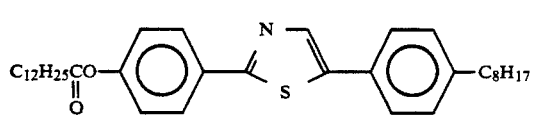 (2-101)
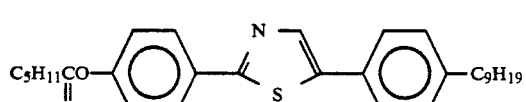 (2-102)
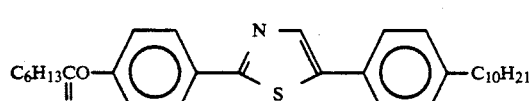 (2-103)
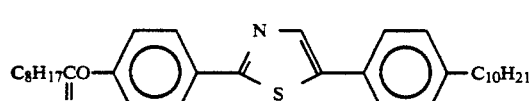 (2-104)
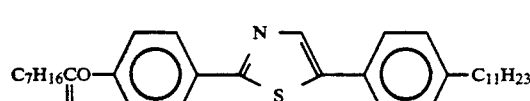 (2-105)
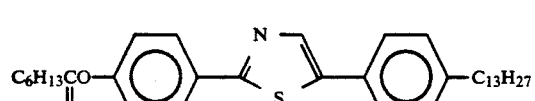 (2-106)
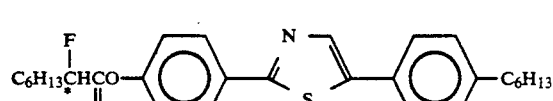 (2-107)

-continued
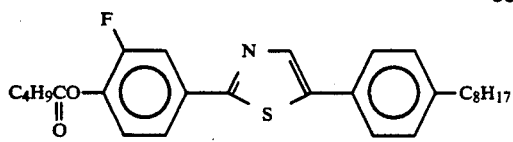 (2-108)
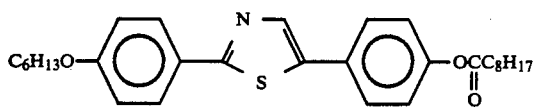 (2-109)
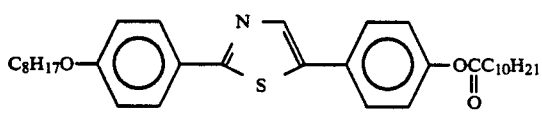 (2-110)
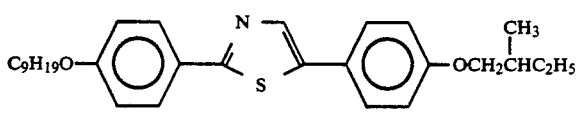 (2-111)
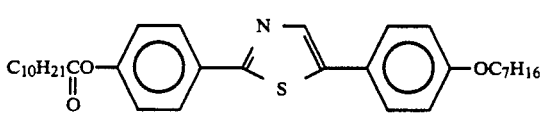 (2-112)
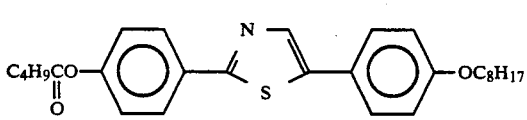 (2-113)
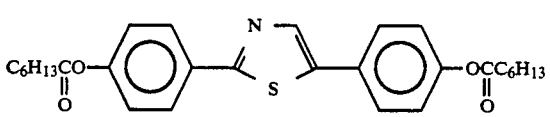 (2-114)
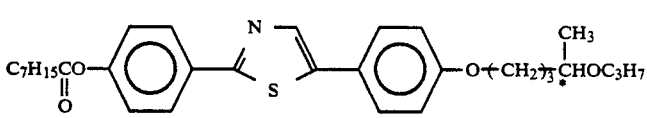 (2-115)
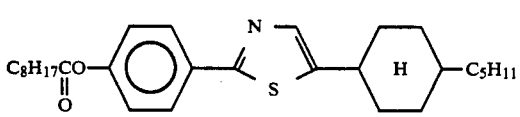 (2-116)
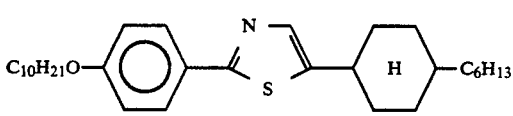 (2-117)
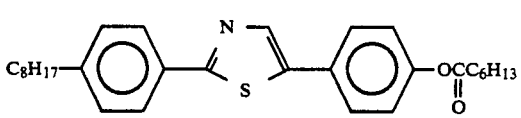 (2-118)
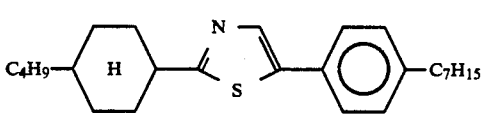 (2-119)
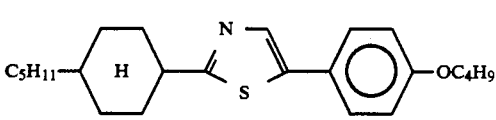 (2-120)

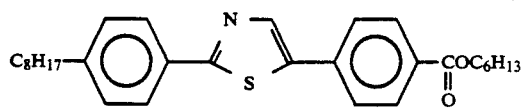 (2-121)
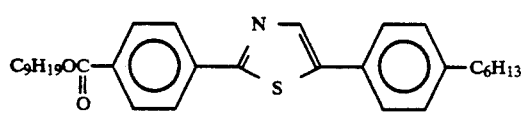 (2-122)
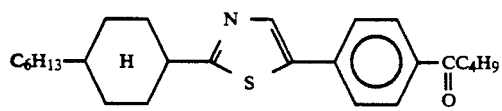 (2-123)
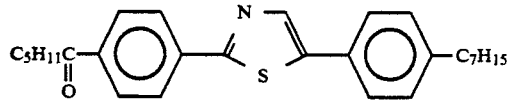 (2-124)
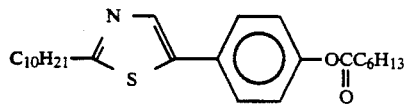 (2-125)
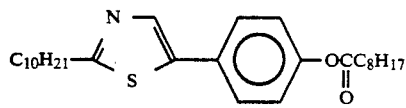 (2-126)
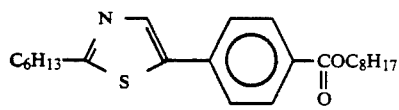 (2-127)
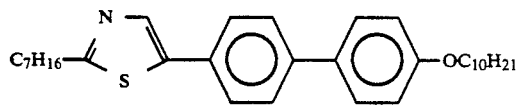 (2-128)
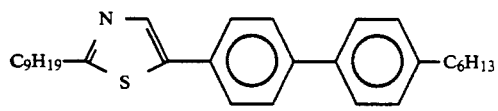 (2-129)
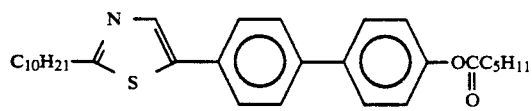 (2-130)
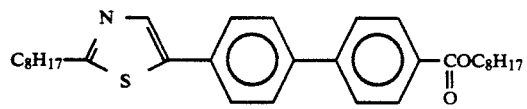 (2-131)
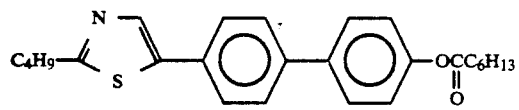 (2-132)
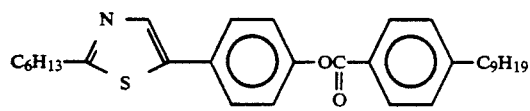 (2-133)
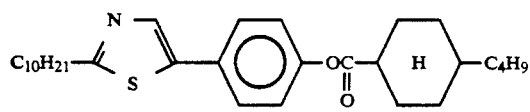 (2-134)

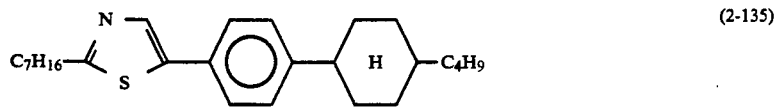 (2-135)
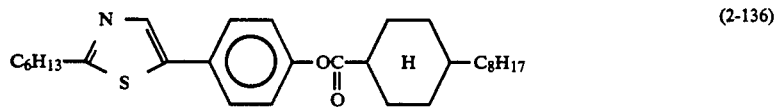 (2-136)
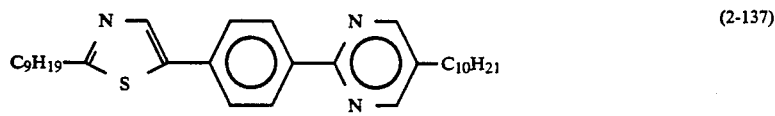 (2-137)
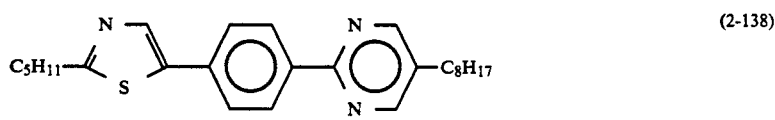 (2-138)
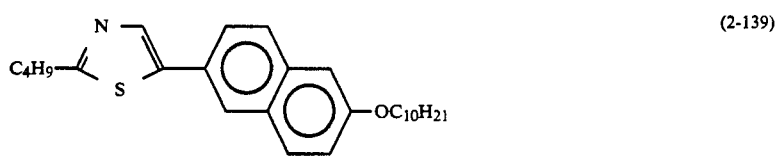 (2-139)
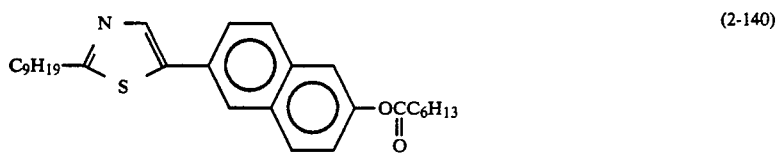 (2-140)
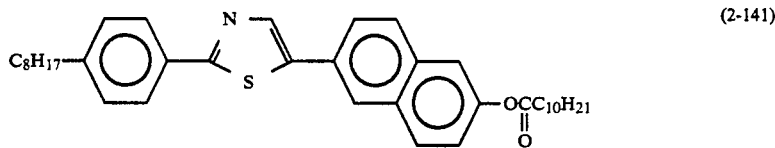 (2-141)
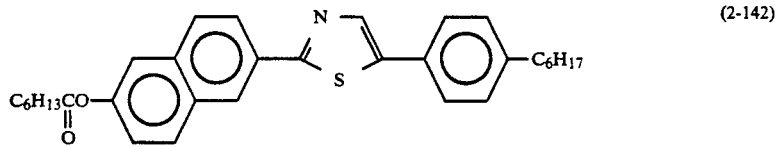 (2-142)
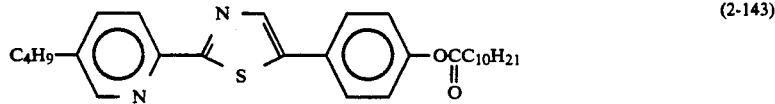 (2-143)
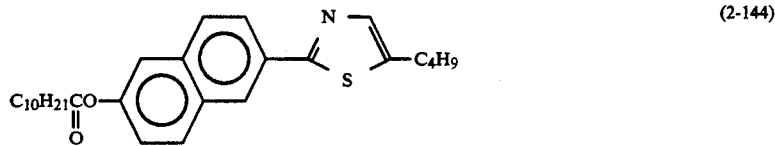 (2-144)
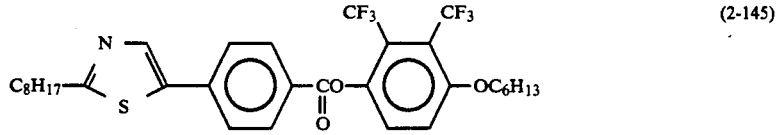 (2-145)

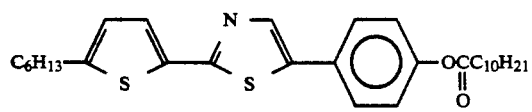 (2-146)
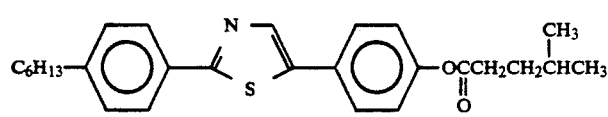 (2-147)
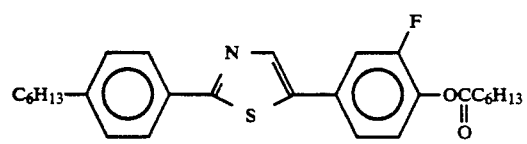 (2-148)
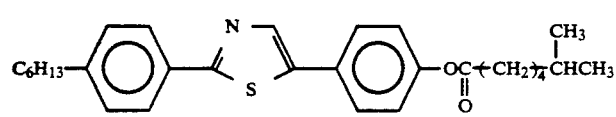 (2-149)
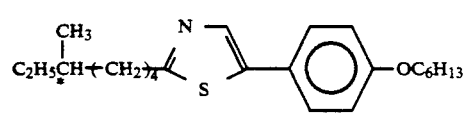 (2-150)
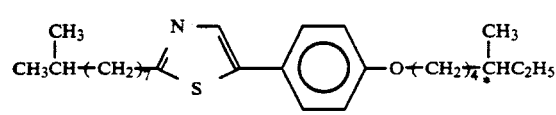 (2-151)
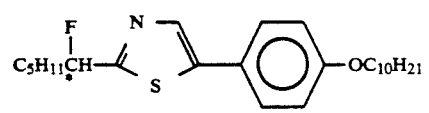 (2-152)
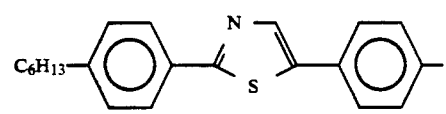 (2-153)
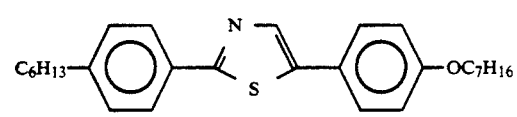 (2-154)
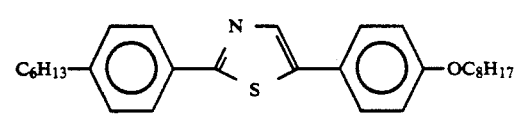 (2-155)
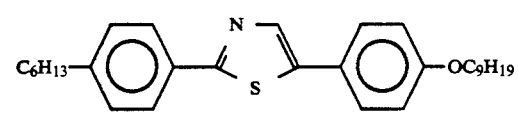 (2-156)
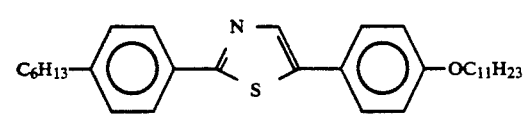 (2-157)
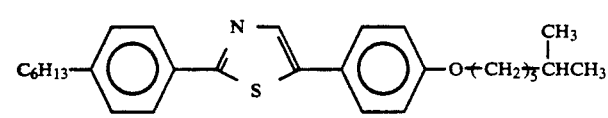 (2-158)

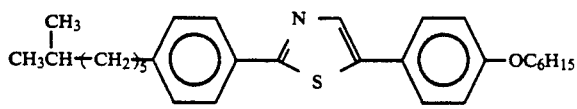 (2-159)
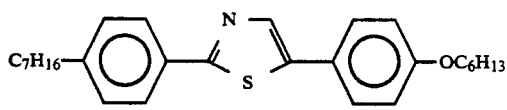 (2-160)
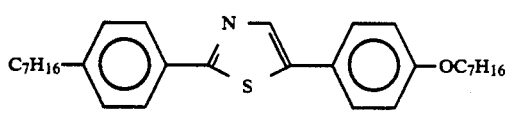 (2-161)
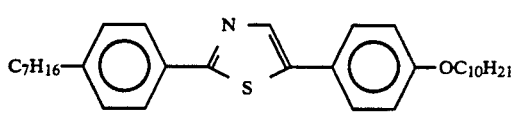 (2-162)
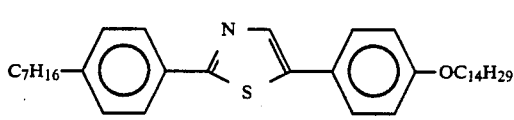 (2-163)
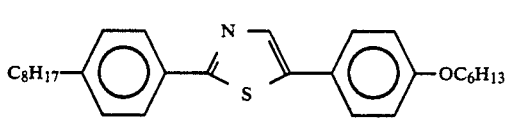 (2-164)
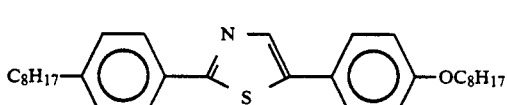 (2-165)
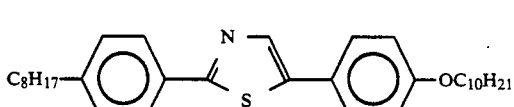 (2-166)
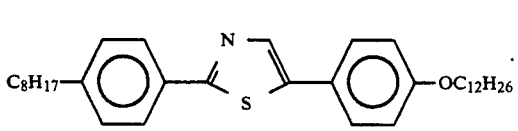 (2-167)
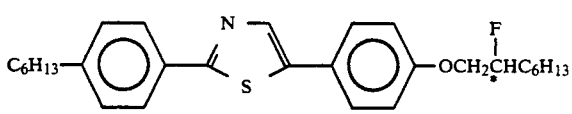 (2-168)
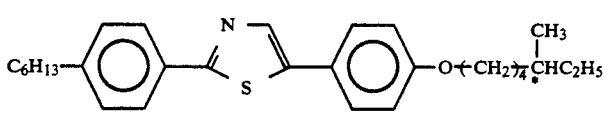 (2-169)
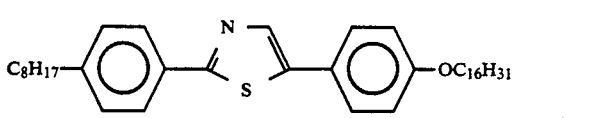 (2-170)
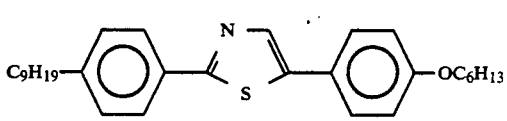 (2-171)
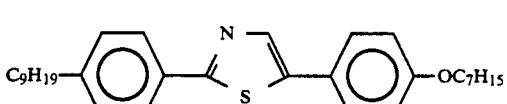 (2-172)

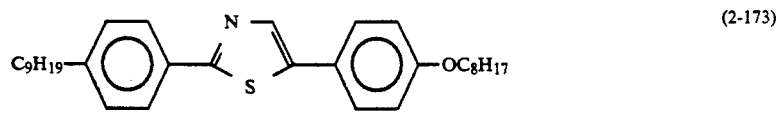
(2-173)
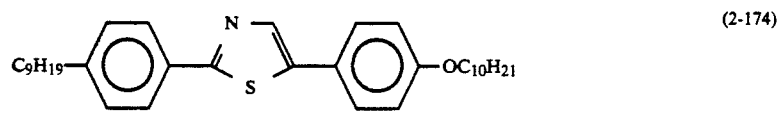
(2-174)
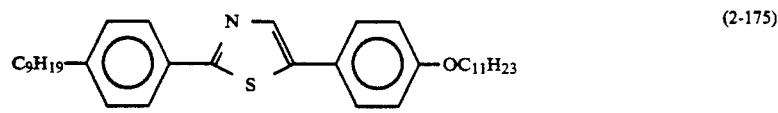
(2-175)
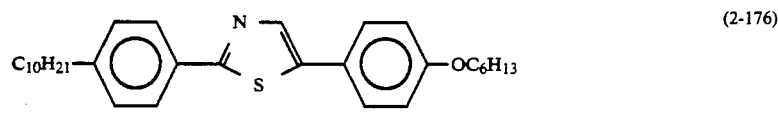
(2-176)
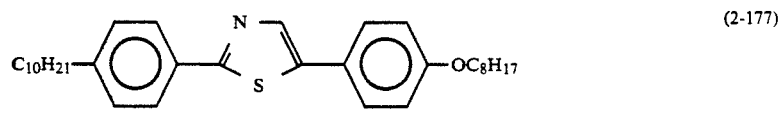
(2-177)
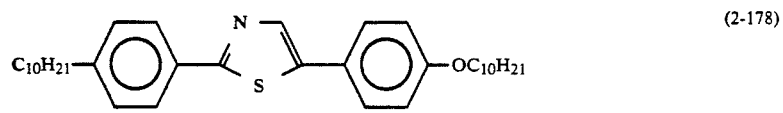
(2-178)
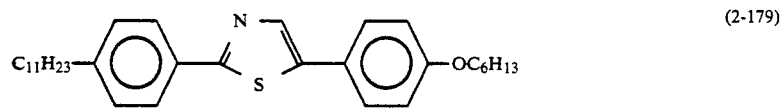
(2-179)
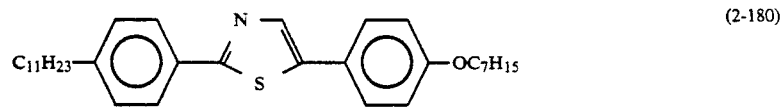
(2-180)
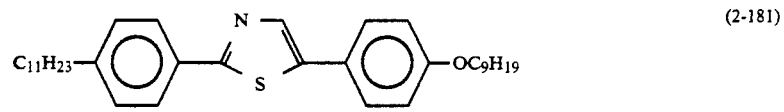
(2-181)
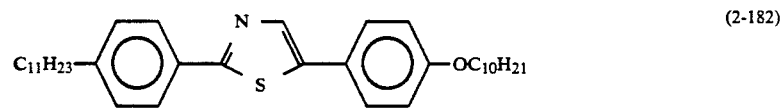
(2-182)
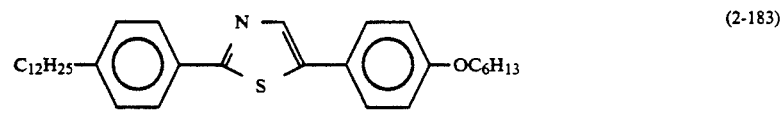
(2-183)
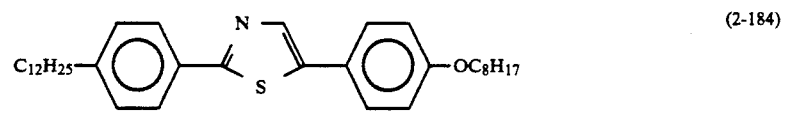
(2-184)
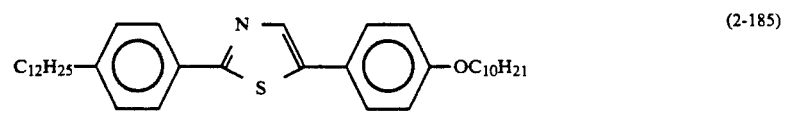
(2-185)

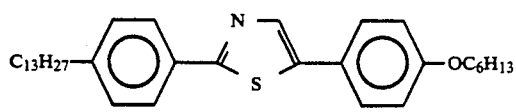 (2-186)
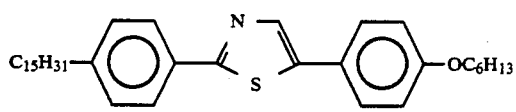 (2-187)
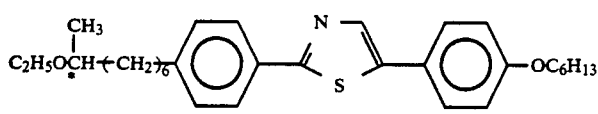 (2-188)
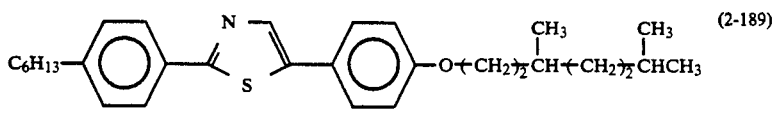 (2-189)
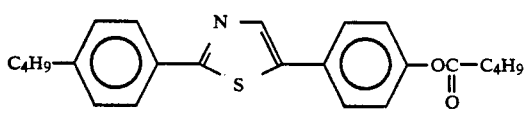 (2-190)
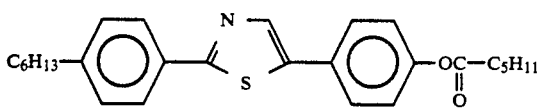 (2-191)
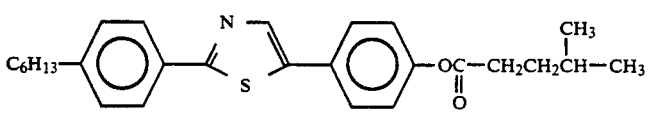 (2-192)
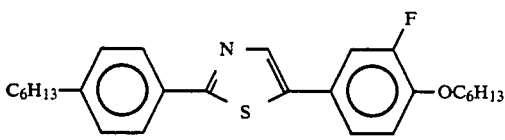 (2-193)
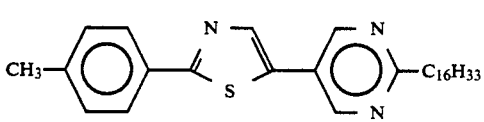 (2-194)
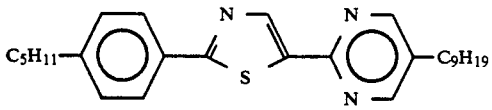 (2-195)
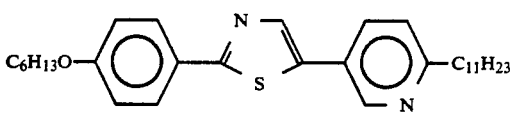 (2-196)
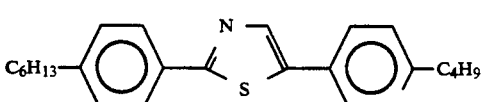 (2-197)
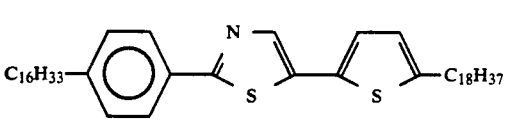 (2-198)

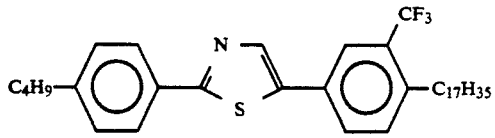
(2-199)

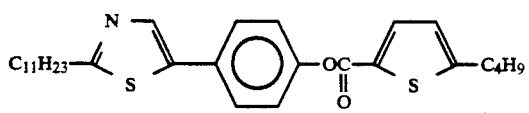
(2-200)

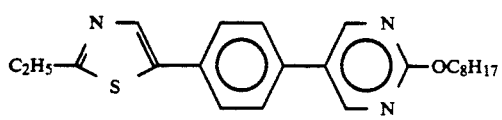
(2-201)

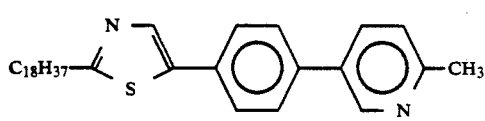
(2-202)

Representative examples of synthesis of the compounds of the formula (II) are shown hereinbelow.

SYNTHESIS EXAMPLE 3

2-(4-hexylphenyl)-5-(4-pentanoyloxyphenyl)thiazole (Example Compound No. 2-53) was synthesized through the following steps i)–iv).

Step i) 4-methoxyphenacyl bromide was prepared by brominating 4-methoxyacetophenone with tetrabutylammonium tribromine in the same manner as in "Bull. Chem. Soc. Jpn.", 60. 1159 (1987).

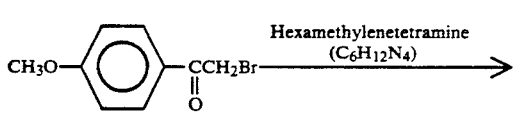

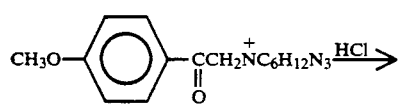

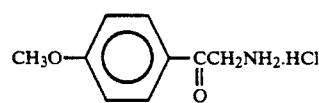

4-methoxyphenacylamine hydrochloride was synthesized from 4-methoxyphenacyl bromide through the above reaction scheme according to a process shown in "Ber.", 44. 1542 (1911).

Step ii)

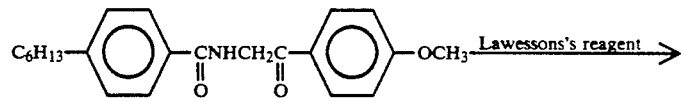

To a solution of 26.9 g (120 mM) of 4-hexylbenzoyl chloride in 206 ml of pyridine, 22.2 g (110 mM) of 4-methoxyphenacylamine hydrochloride was gradually added in 30 minutes under cooling and stirring at $-10°$ to $-5°$ C., followed by stirring for 30 minutes at $-10°$ to $-5°$ C. and heat-refluxing of 1 hour under stirring. After the reaction, the reaction mixture was cooled to room temperature and poured into 600 ml of cool water to precipitate a crystal. The crystal was recovered by filtration, washed with water and recrystallized from ethanol to obtain 19.6 g of 4-hexylbenzoyl-4'-methoxyphenacylamine (Yield: 50.5 %).

Step iii)

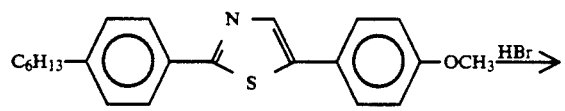

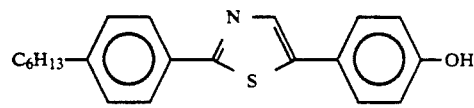

In a 300 ml-round-bottomed flask, 19.6 g (55.5 mM) of 4-hexylbenzoyl-4'-methoxyphenacylamine, 24.3 g (60.1 mM) of Lawesson's reagent and 97 ml of tetrahydrofuran were placed, followed by heat-refluxing for 1 hour under stirring. After the reaction, the reaction mixture was poured into a solution of 19 g of sodium hydroxide in 2 liters of water to precipitate a crystal. The crystal was recovered by filtration, successively washed with water and ethanol and recrystallized from ethanol to obtain 15.9 g of 2-(4-hexylphenyl)-5-(4-methoxyphenyl)thiazole (Yield: 82.9

Then, in a 300 ml-three-necked flask, 13.9 g (39.3 mM) of 2-(4-hexylphenyl)-5-(4-methoxyphenyl)tiazole, 76.5 ml of acetic acid and 69.5 ml of 47%-hydrobromic acid were placed, followed by heat-stirring for 16 hours at 100°–110° C. After the reaction, the reaction mixture was poured into cool water, followed by extraction with ethyl acetate. The organic layer was successively washed with water, 5%-sodium hydrogenecarbonate aqueous solution and water, followed by distilling-off of the solvent under reduced pressure. The residue was dissolved in a mixture solvent of ethanol/chloroform=1/1, followed by decolorization with activated carbon and distilling-off of the solvent under reduced pressure. The resultant residue was recrystalized two times from toluene to obtain 10.0 g of 2-(4-hexylphenyl)-5-(4-hydroxyphenyl)thiazole (Yield: 75.8 %).

Step iv)

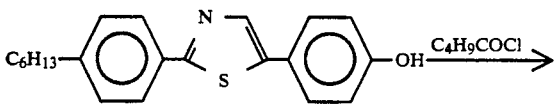

-continued

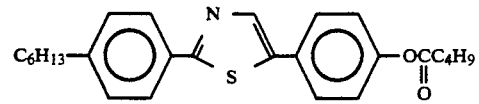

To a solution of 0.60 g (1.78 mM) of 2-(4-hexylphenyl)-5-(4-hydroxyphenyl)thiazole in 10 ml of pyridine, 0.36 ml (3.03 mM) of pentanoyl chloride was added on an ice water bath under stirring, followed by further stirring for 2 hours at room temperature. After the reaction, the reaction mixture was poured into 100 ml of ice water to precipitate a crystal. The crystal was recovered by filtration and dissolved in toluene, followed by drying with anhydrous sodium sulfate and distilling-off of the solvent. The residue was purified by silica gel column chromatography (eluent: toluene) and recrystallized from a mixture solvent of toluene-methanol to obtain 0.64 g of 2-(4-hexylphenyl)-5-(4-pentanoyloxyphenyl)thiazole (Yield: 85.4%).

Phase transition temperature (° C.)

$$\text{Cryst.} \underset{96.0}{\overset{101.9}{\rightleftarrows}} \text{SmC} \underset{127.7}{\overset{128.5}{\rightleftarrows}} \text{N} \underset{148.6}{\overset{149.4}{\rightleftarrows}} \text{Iso.}$$

SmC: smectic C phase, and

N: nematici phase.

SYNTHESIS EXAMPLE 4

2-(4-hexylphenyl)-5-(3-fluoro-4-heptanoyloxyphenyl)thiazole (Example Compound No. 2-148) was synthesized through the following reaction schemes in the same manner as in Synthesis Example 3.

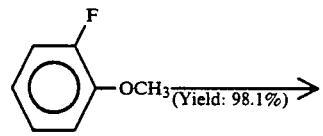

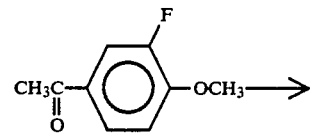

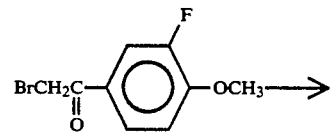

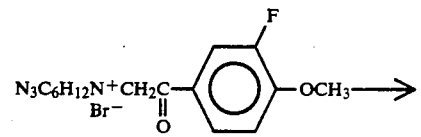

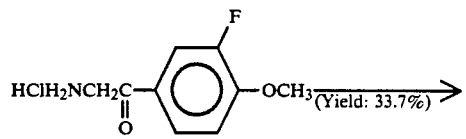

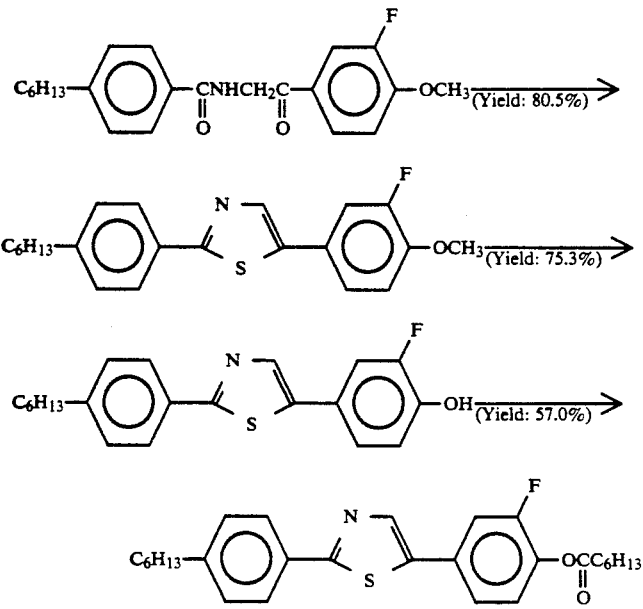

Phase transition temperature (° C.)

Cryst. $\underset{44.5}{\overset{51.1}{\rightleftarrows}}$ SmC $\underset{119}{\overset{119}{\rightleftarrows}}$ SmA $\underset{120.7}{\overset{121.2}{\rightleftarrows}}$ N $\underset{128}{\overset{128.8}{\rightleftarrows}}$ Iso.

Then, the compounds represented by the formula (III) may be synthesized through processes as disclosed by, e.g., Japanese Laid-Open Patent Application (JP-A) No. 22042/1988 and 122651/1988.

Specific examples of the mesomorphic compounds represented by the above-mentioned general formula (III) may include those shown by the following structural formulas.

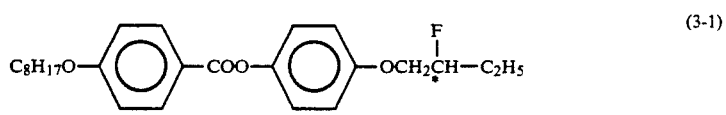

(3-1)

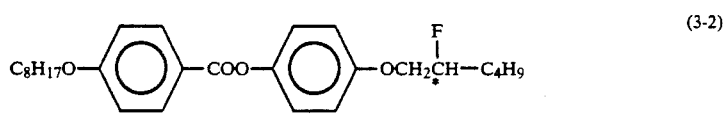

(3-2)

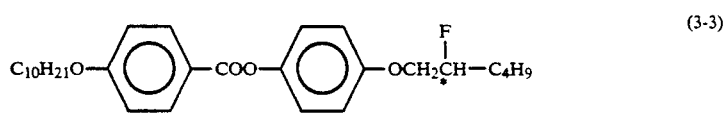

(3-3)

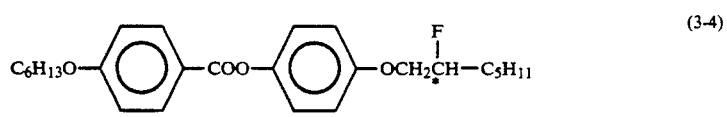

(3-4)

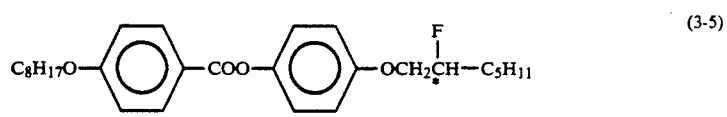

(3-5)

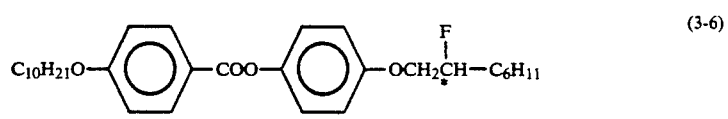

(3-6)

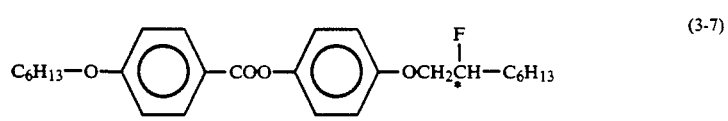

(3-7)

-continued
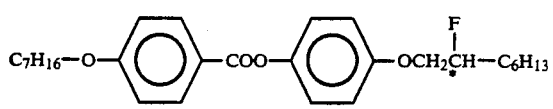 (3-8)
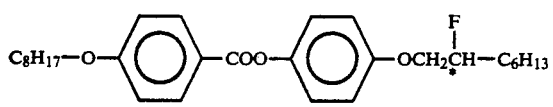 (3-9)
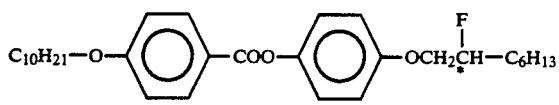 (3-10)
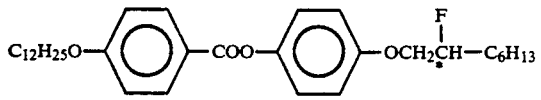 (3-11)
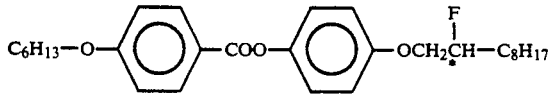 (3-12)
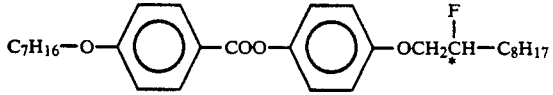 (3-13)
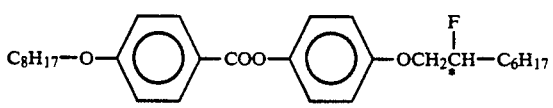 (3-14)
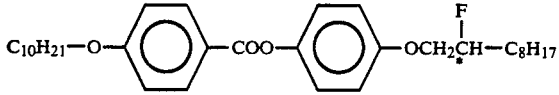 (3-15)
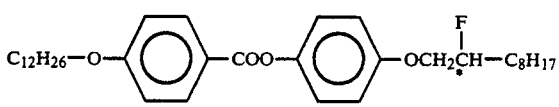 (3-16)
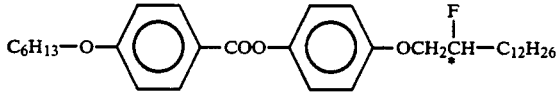 (3-17)
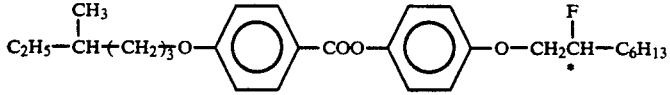 (3-18)
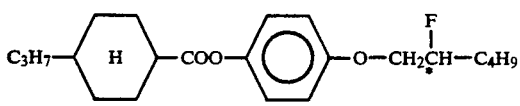 (3-19)
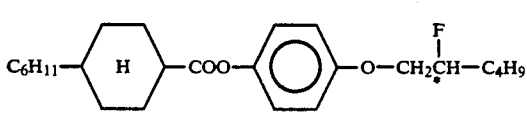 (3-20)
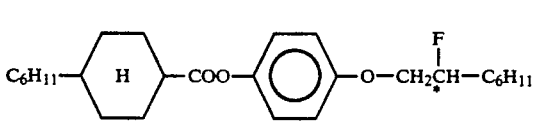 (3-21)

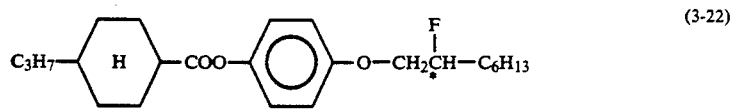
(3-22)
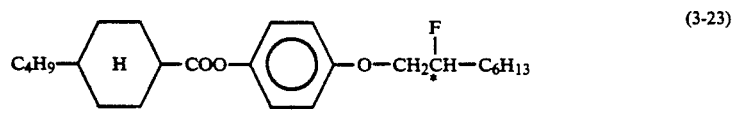
(3-23)
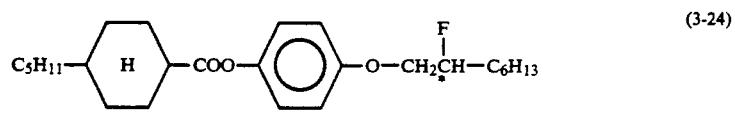
(3-24)
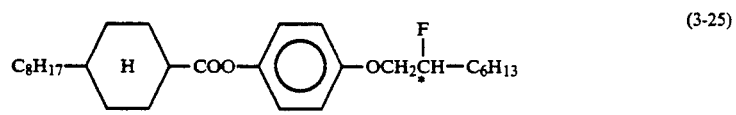
(3-25)
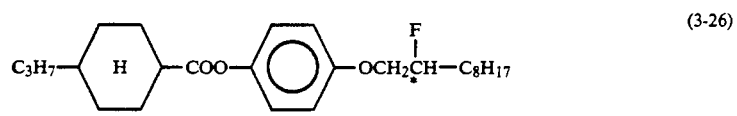
(3-26)
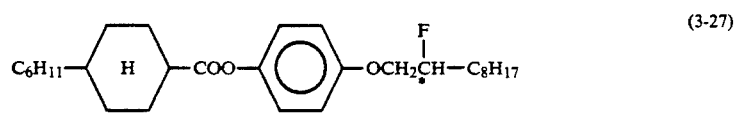
(3-27)
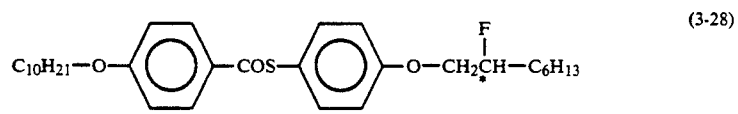
(3-28)
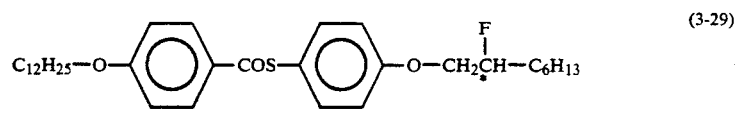
(3-29)
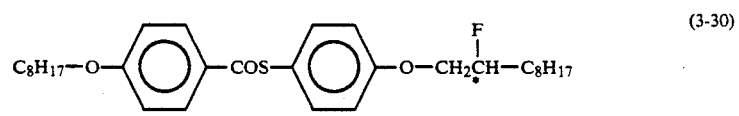
(3-30)
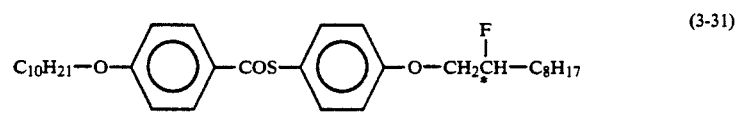
(3-31)
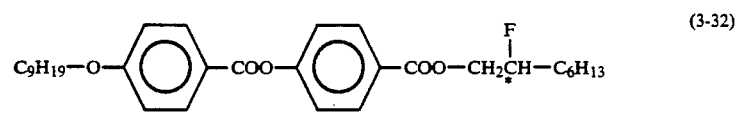
(3-32)
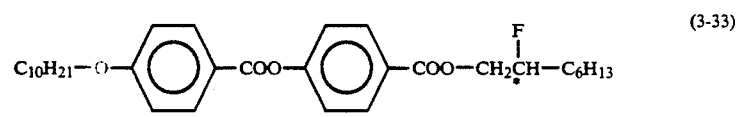
(3-33)
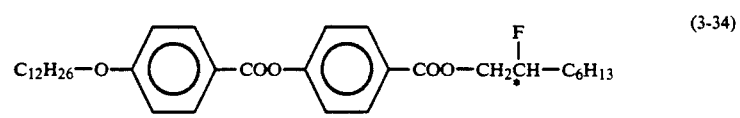
(3-34)

-continued
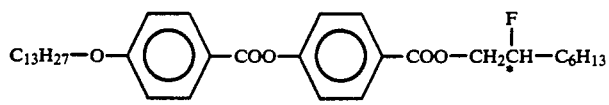 (3-35)
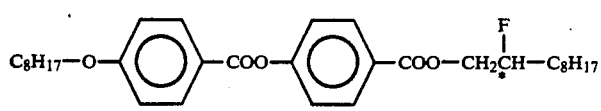 (3-36)
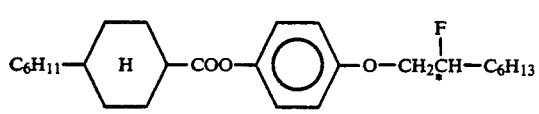 (3-37)
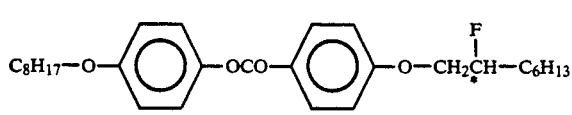 (3-38)
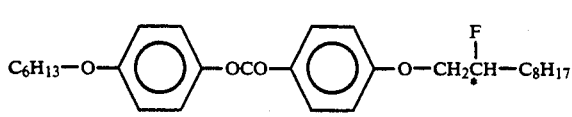 (3-39)
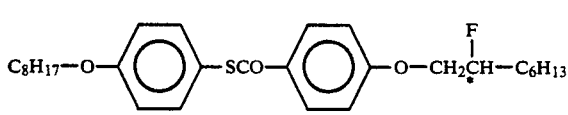 (3-40)
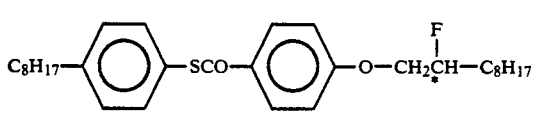 (3-41)
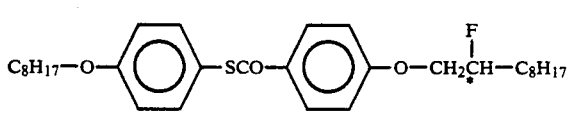 (3-42)
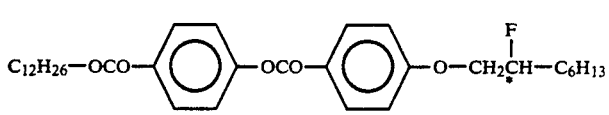 (3-43)
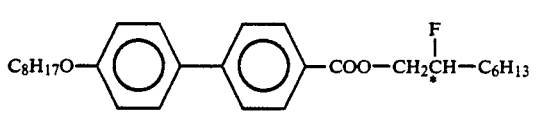 (3-44)
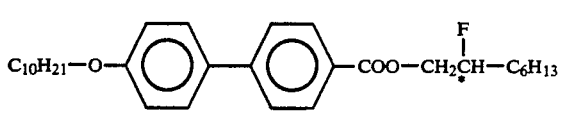 (3-45)
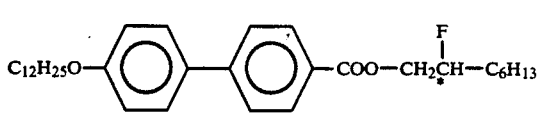 (3-46)
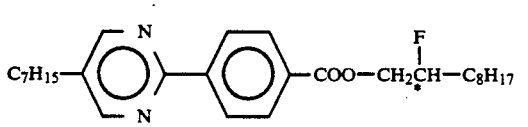 (3-47)
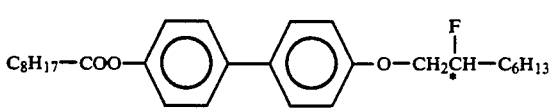 (3-48)

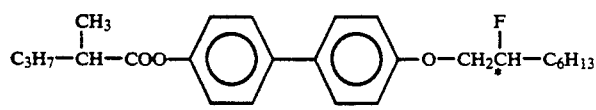 (3-49)
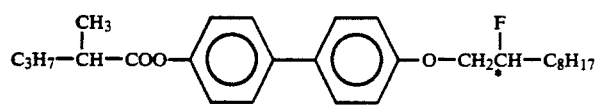 (3-50)
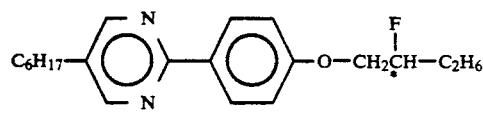 (3-51)
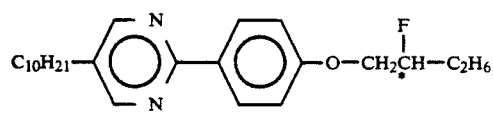 (3-52)
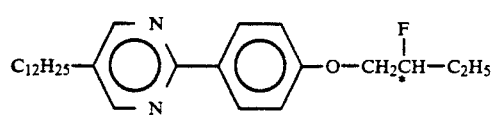 (3-53)
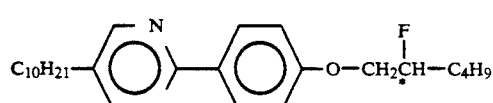 (3-54)
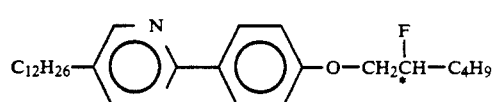 (3-55)
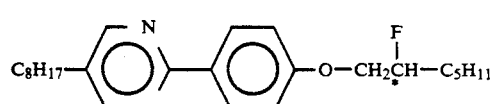 (3-56)
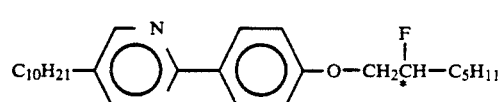 (3-57)
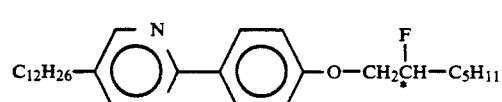 (3-58)
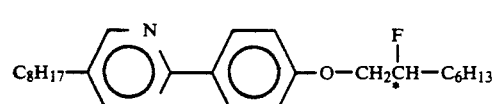 (3-59)
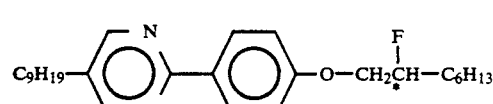 (3-60)
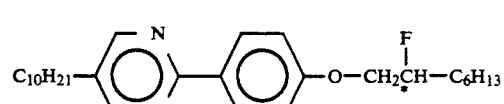 (3-61)

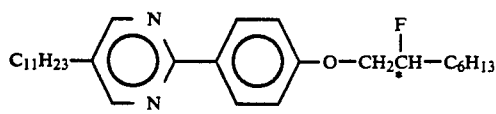 (3-62)
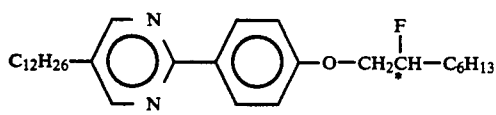 (3-63)
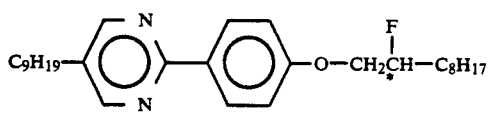 (3-64)
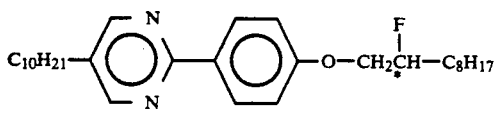 (3-65)
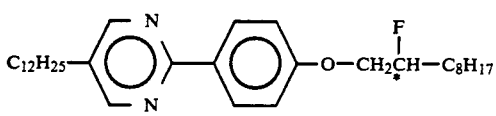 (3-66)
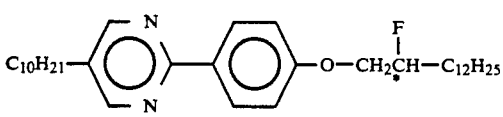 (3-67)
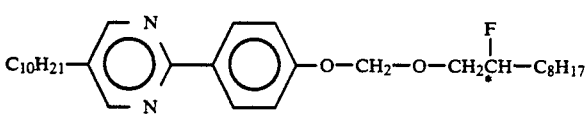 (3-68)
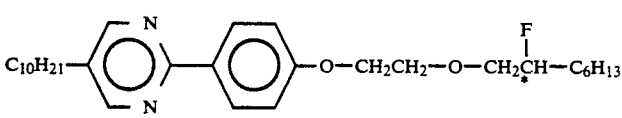 (3-69)
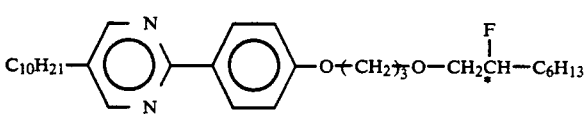 (3-70)
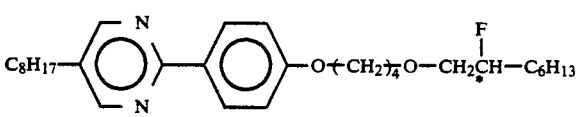 (3-71)
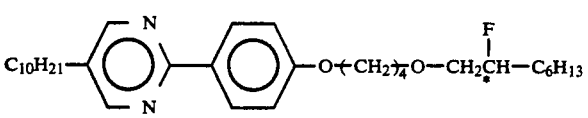 (3-72)
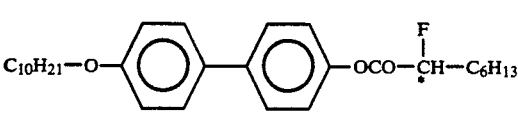 (3-73)
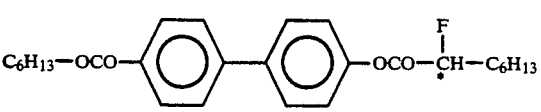 (3-74)

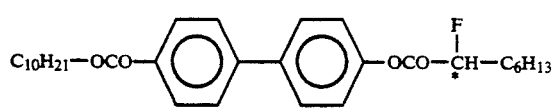 (3-75)
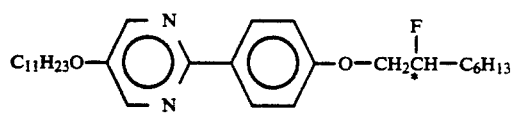 (3-76)
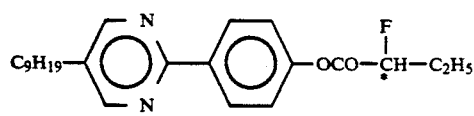 (3-77)
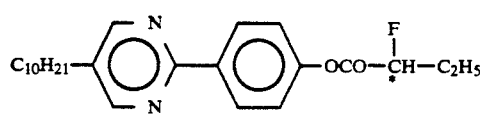 (3-78)
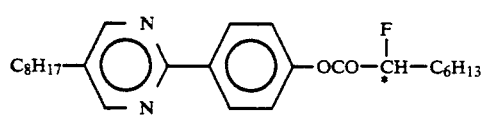 (3-79)
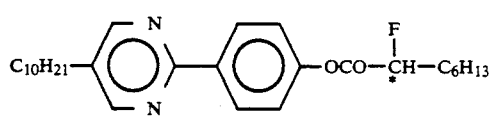 (3-80)
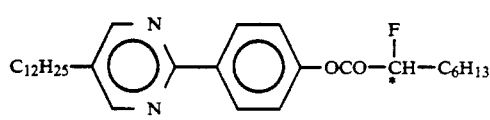 (3-81)
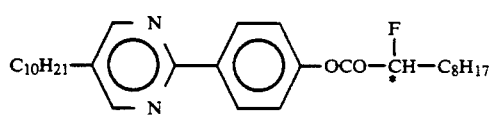 (3-82)
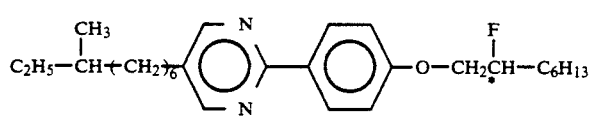 (3-83)
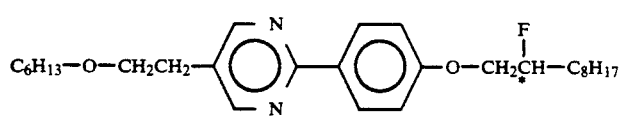 (3-84)
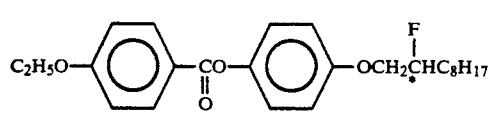 (3-85)
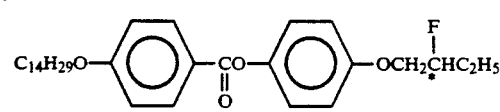 (3-86)
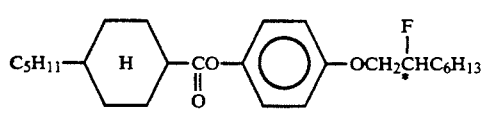 (3-87)

(3-88)

CH₃—⟨benzene⟩—⟨benzene⟩—COCH₂CHC₅H₁₁
                              ‖  |
                              O  F
                                 *

(3-89)

C₁₅H₃₁—⟨pyrimidine(N,N)⟩—⟨benzene⟩—OCH₂CHC₆H₁₃
                                        |
                                        F
                                        *

(3-90)

C₁₆H₃₃—⟨pyrimidine(N,N)⟩—⟨benzene⟩—OCH₂CHC₇H₁₅
                                        |
                                        F
                                        *

(3-91)

C₁₇H₃₅—⟨pyrimidine(N,N)⟩—⟨benzene⟩—OCH₂CHC₆H₁₃
                                        |
                                        F
                                        *

(3-92)

C₁₈H₃₇—⟨pyrimidine(N,N)⟩—⟨benzene⟩—OCH₂CHC₆H₁₃
                                        |
                                        F
                                        *

Representative examples of synthesis of the compounds are shown hereinbelow.

SYNTHESIS EXAMPLE 5

Synthesis of Example Compound No. 3-24

1.00 g (4.16 mM) of p-2-fluorooctyloxyphenol was dissolved in a mixture of 10 ml of pyridine and 5 ml of toluene, and a solution of 1.30 g (6.00 mM) of trans-4-n-pentylcyclohexanecarbonyl chloride in 5 ml of toluene was added dropwise thereto in 20 - 40 min. at below 5° C. After the addition, the mixture was stirred overnight at room temperature to obtain a white precipitate.

After the reaction, the reaction product was extracted with benzene, and the resultant benzene layer was washed with distilled water, followed by drying with magnesium sulfate and distilling-off of the benzene, purification by silica gel column chromatography and recrystallization from ethanol/methanol to obtain 1.20 g (2.85 mM) of trans-4-n-pentylcyclohexanecarboxylic acid-p-2-fluorooctyloxypheny 1-ester. (Yield: 68.6%)

NMR data (ppm):
0.83–2.83 ppm (34H, m),
4.00–4.50 ppm (2H, q),
7.11 ppm (4H, s)
IR data (cm⁻¹);
3456, 2928, 2852, 1742, 1508, 1470, 1248, 1200 1166, 1132, 854.
Phase transition temperature (°C.)

SYNTHESIS EXAMPLE 6

Synthesis of Example Compound No. 3-56

In a vessel sufficiently replaced with nitrogen, 0.40 g (3.0 mmol) of (−)-2-fluoroheptanol and 1.00 g (13 mmol) of dry pyridine were placed and stirred for 30 min. under cooling on an ice bath. Into the solution, 0.69 g (3.6 mmol) of p-toluenesulfonyl chloride was added, and the mixture was stirred for 5 hours. After the reaction, 10 ml of 1N-HCl was added, and the resultant mixture was subjected to two times of extraction with 10 ml of methylene chloride. The extract liquid was washed once with 10 ml of distilled water and dried with an appropriate amount of anhydrous sodium sulfate, followed by distilling-off of the solvent to obtain 0.59 g (2.0 mmol) of (+)-2-fluoroheptyl p-toluenesulfonate.

The yield was 66%, and the product showed the following optical rotation and IR data.

Optical rotation:
$[\alpha]_D^{26.4} + 2.59$ degrees (c=1, CHCl₃),
$[\alpha]_{435}^{23.6} + 9.58$ degrees (c=1, CHCl₃)
IR (cm⁻¹):
2900, 2850, 1600, 1450, 1350, 1170, 1090, 980, 810, 660, 550

0.43 g (1.5 mmol) of the thus obtained (+)-2-fluoroheptyl p-toluenesulfonate and 0.28 g (1.0 mmol) of 5-octyl-2-(4-hydroxyphenyl)pyrimidine were mixed with 0.2 ml o±1-butanol, followed by sufficient stir- Cryst. →49.0→ S₄ →69.5→ SmC* ⇌73/73⇌ SmA ⇌79.8/78.7⇌ Ch. ⇌81.9/81.0⇌ Iso,
   ↖−3.8  ↙43.2  ↖68.2  ↙68.9
      S₆ ⇌25.7⇌ S₅        S₃

S₃–S₆: phases of higher order than SmC*,
SmC*: chiral smectic C phase, and
Ch.: cholesteric phase.

ring. To the solution was quickly added a previously obtained alkaline solution of 0.048 g (1.2 mmol) of sodium hydroxide in 1.0 ml of 1-butanol, followed by 5.5 hours of heat-refluxing. After the reaction, 10 ml of distilled water was added, and the mixture was extracted respectively once with 10 ml of benzene and 5 ml of benzene, followed by drying with an appropriate amount of anhydrous sodium sulfate, distilling-off of the solvent and purification by silica gel column chromatography (eluent: chloroform) to obtain 0.17 g (0.43 mmol) of objective (+)-5-octyl-2-[4-(2-fluoroheptyloxy)phenyl]pyrimidine.

The yield was 43 %, and the product showed the following optical rotation and IR data.

Optical rotation:
$[\alpha]_D^{25.6} + 0.44$ degree (c=1, CHCl$_3$),
$[\alpha]_{435}^{22.4} + 4.19$ degrees (c=1, CHCl$_3$)
IR (cm$^{-1}$).
2900, 2850, 1600, 1580, 1420, 1250,
1160, 800, 720, 650, 550.

The liquid crystal composition according to the present invention may be obtained by mixing at least one species of the compound represented by the formula (I), at least one species of the compound represented by the formula (II), optionally at least one species of the compound represented by the formula (III), and another mesomorphic compound in appropriate proportions. The liquid crystal composition according to the present invention may preferably be formulated as a liquid crystal composition capable of utilizing ferroelectricity, particularly a liquid crystal composition showing a chiral smectic phase.

Specific examples of another mesomorphic compound as described above may include those denoted by the following formulas (IV) to (VIII).

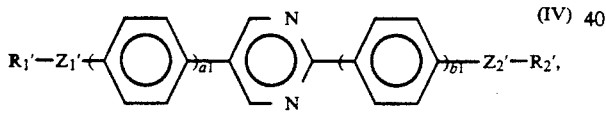  (IV)

wherein $R_1'$ and $R_2'$ respectively denote a linear or branched alkyl group having 1-18 carbon atoms capable of including one or two or more non-neighboring methylene groups which an be replaced with —CHCN—, —C(CH$_3$)CN—, —CHCl— or —CHBr— and capable of further including one or two or more non-neighboring methylene groups other than those directly connected to $Z_1'$ or $Z_2'$ which can be replaced with —O—,

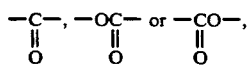

at least one of $R_1'$ and $R_2'$ being optically active; $Z_1'$ and $Z_2'$ respectively denote a single bond, —O—,

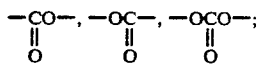

a1 and b1 are respectively 0, 1 or 2 with the proviso that a1+b1=1 or 2.

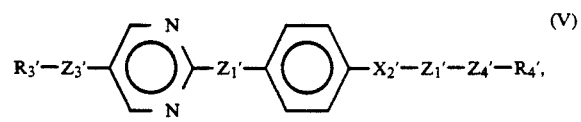  (V)

wherein $R_3'$ and $R_4'$ respectively denote a linear or branched alkyl group having 1-18 carbon atoms capable of including one or two or more non-neighboring methylene groups which an be replaced with —CHCN—, —C(CH$_3$)CN—, —CHCl— or —CHBr— and capable of further including one or two or more non-neighboring methylene groups other than those directly connected to $Z_3'$ or $Z_4'$ which can be replaced with —O—,

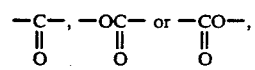

$Z_3'$ and $Z_4'$ respectively denote a single bond, —O—,

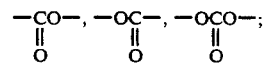

$X_1'$ and $X_2'$ respectively denote a single bond,

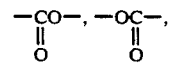

—CH$_2$O— or —OCH$_2$— with the proviso that $X_1'$ and $X_2'$ cannot simultaneously denote a single bond; $A_1'$ denotes

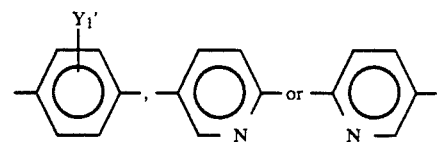

wherein wherein $Y_1'$ denotes hydrogen, —CH$_3$ or —CF$_3$.

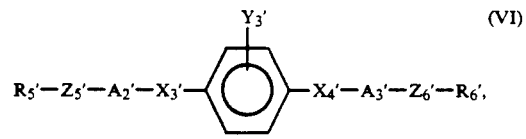  (VI)

wherein $R_5'$ and $R_6'$ respectively denote a linear or branched alkyl group having 1-18 carbon atoms capable of including one or two or more non-neighboring methylene groups which an be replaced with —CHCN—, —C(CH$_3$)CN—, —CHCl— or —CHBr— and capable of further including one or two or more non-neighboring methylene groups other than those directly connected to $Z_5'$ or $Z_6'$ which can be replaced with —O—,

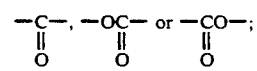

$A_2'$ denotes

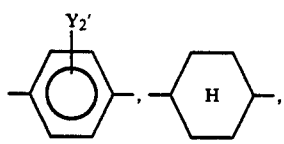, 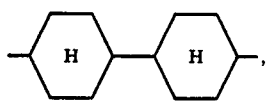, 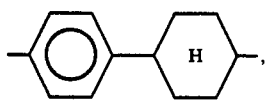, 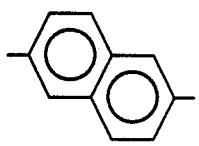

or a single bond; A₃' denotes

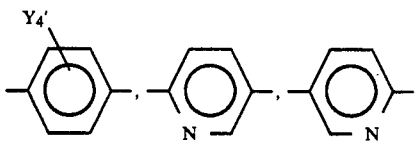

or a single bond with the proviso that A₂' and A₃' cannot simultaneously denote a single bond; Z₅' and Z₆' respectively denote a single bond, —O—,

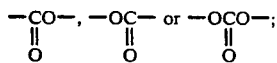

X₃' and X₄' respectively denote a single bond,

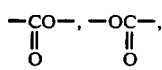

—CH₂O— or —CH₂— with the proviso that X₃' is a single bond when A₂' is a single bond and X₄' is a single bond when A₃' is a single bond; and Y₂', Y₃' and Y₄' respectively denote hydrogen, halogen, —CH₃ or —CF₃.

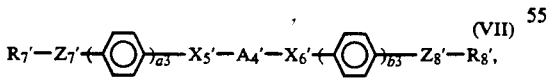
(VII)

wherein R₇' and R₈' respectively denote a linear or branched alkyl group having 1-18 carbon atoms capable of including one or two or more non-neighboring methylene groups which an be replaced with —CHCN—, —C(CH₃)CN—, —CHCl— or —CHBr— and capable of further including one or two or more non-neighboring methylene groups other than those directly connected to Z₇' or Z₈' which can be replaced with —O—,

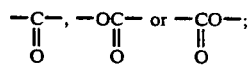

A₄' denotes

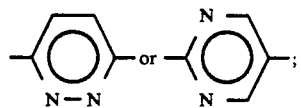

Z₇' and Z₈' respectively a single bond, —O—,

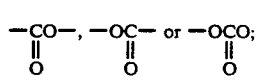

X₅' and X₆' respectively denote a single bond,

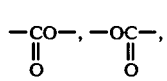

—CH₂O— or —OCH₂—; and a3 and b3 are respectively 0 or 1 with the proviso that a3 and b3 cannot simultaneously be 0.

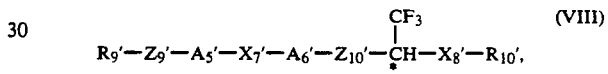
(VIII)

wherein R₉' denotes a linear or branched alkyl group having 1-18 carbon atoms; R₁₀' denotes a linear or branched alkyl group having 1-16 carbon atoms; A₅' denotes

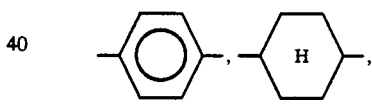

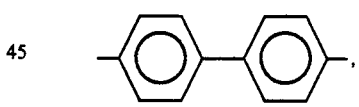

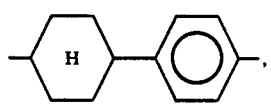

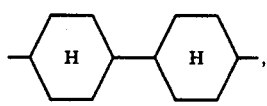

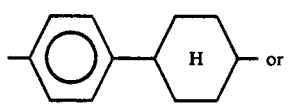 or

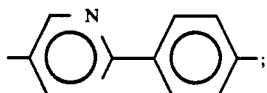;

A₆' denotes

X₇' denotes a single bond,
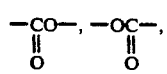
—CH₂O— or —OCH₂—; X₈' denotes a single bond or
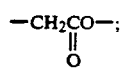
Z₉' denotes a single bond, —O—,
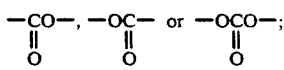
Z₁₀' denotes
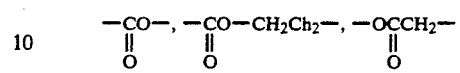
or —O—CH₂CH₂—; C* denotes an optically active asymmetric carbon atom.
In the formula (IV)–(VIII), preferred compounds thereof may include those represented by the following formulas (IVa) to (VIIIe):
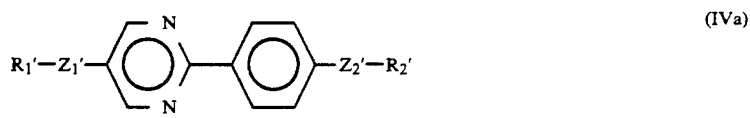 (IVa)
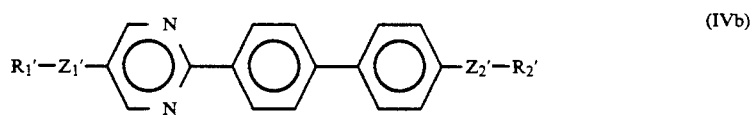 (IVb)
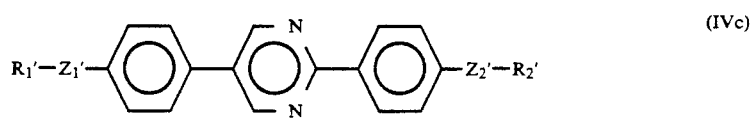 (IVc)
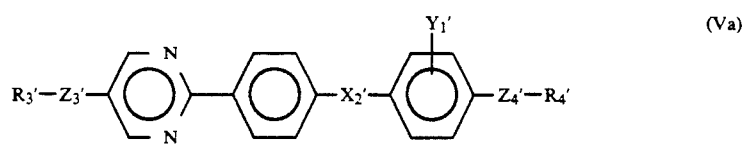 (Va)
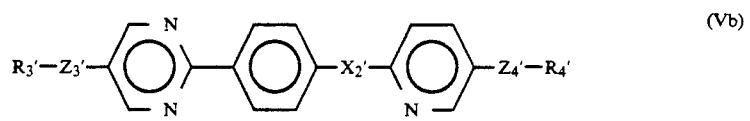 (Vb)
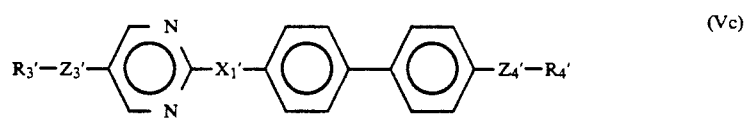 (Vc)
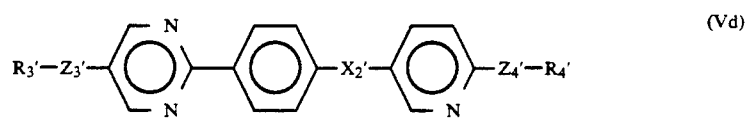 (Vd)
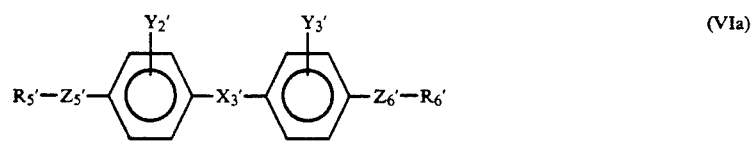 (VIa)
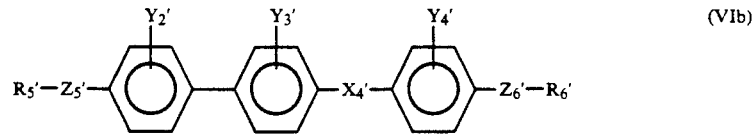 (VIb)

-continued
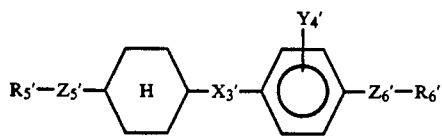  (VIc)
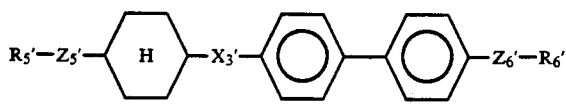  (VId)
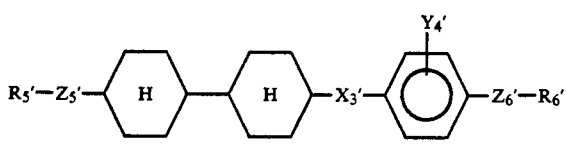  (VIe)
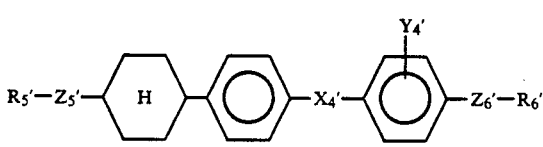  (VIf)
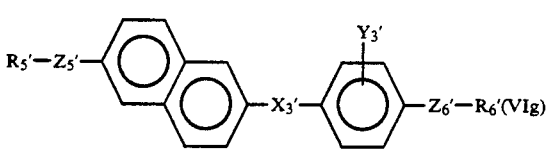 (VIg)
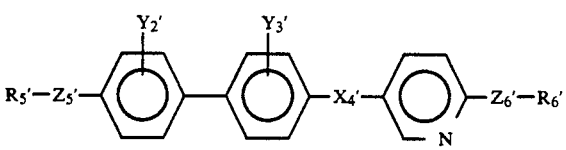  (VIh)
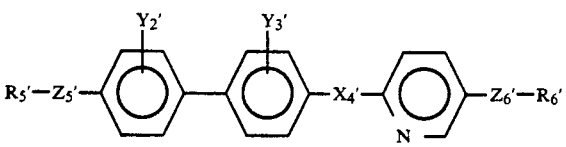  (VIi)
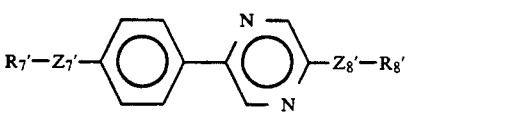  (VIIa)
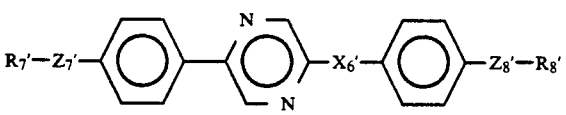  (VIIb)
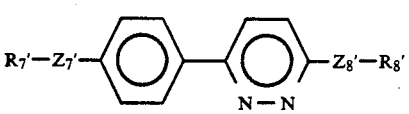  (VIIc)
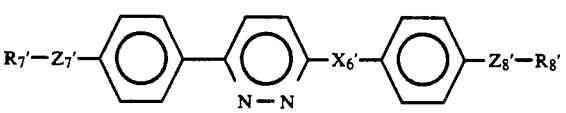  (VIId)
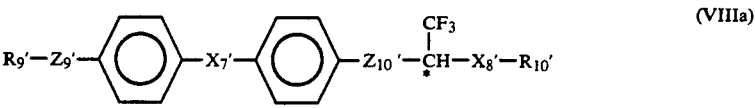  (VIIIa)

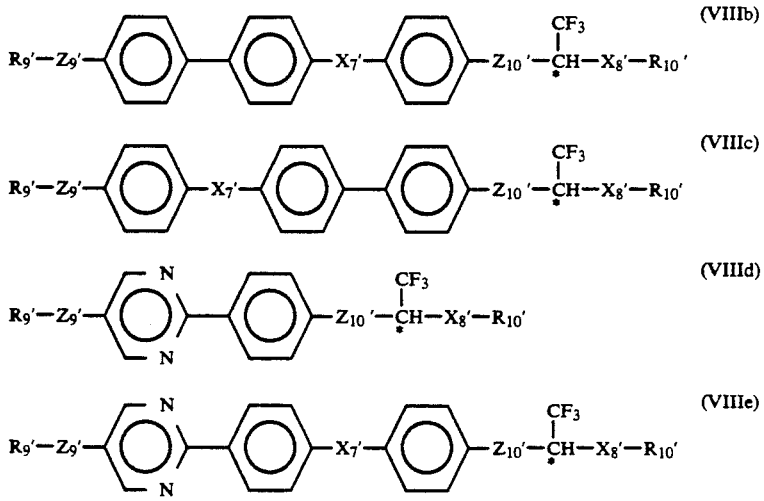

In formulating the liquid crystal composition according to the present invention, it is desirably that the mesomorphic compounds of the formulas (I) and (II) in total constitute 1–90 wt. %, preferably 2–80 wt. %, further preferably 4–80%. of the resultant composition. The compound of the formula I) and the compound of the formula (II) may desirably be contained in a weight ratio of 100:1–1:100, preferably 70:1–1:70, further preferably 30:1–1:30.

The above proportional relationships may be desired also when two or more species of either one or both of the compounds of the formulas (I) and (II) are used.

When the compounds of (I), (II) and (III) are used in combination for constituting the liquid crystal composition according to the present invention, these compounds in total may desirably constitute 1–99 wt. %, 4–90 wt. %, further preferably 6–80 wt. %, of the resultant liquid crystal composition. The compounds of the formulas (I) and (II) in total and the compound of the formula (III) may desirably be used in a weight ratio of 1:30–100:1, preferably 1:20–50:1, more preferably 1:10–30:1.

Again the above proportional relationships regarding the compounds (I), (II) and (III) used in combination may be desired also when two or more species of one, two or all of the compounds of the formulas (I), (II) and (III) are used.

The ferroelectric liquid crystal device according to the present invention may preferably be prepared by heating the liquid crystal composition prepared as described above into an isotropic liquid under vacuum, filling a blank cell comprising a pair of oppositely spaced electrode plates with the composition, gradually cooling the cell to form a liquid crystal layer and restoring the normal pressure.

FIG. 1 is a schematic sectional view of an embodiment of the ferroelectric liquid crystal device prepared as described above for explanation of the structure thereof.

Referring to FIG. 1, the ferroelectric liquid crystal device includes a chiral smectic liquid crystal layer 1 disposed between a pair of glass substrates 2 each having thereon a transparent electrode 3 and an insulating alignment control layer 4. Lead wires 6 are connected to the electrodes so as to apply a driving voltage to the liquid crystal layer 1 from a power supply 7. Outside the substrates 2, a pair of polarizers 8 are disposed so as to modulate incident light $I_0$ from a light source 9 in cooperation with the liquid crystal 1 to provide modulated light I.

Each of two glass substrates 2 is coated with a transparent electrode 3 comprising a film of $In_2O_3$, $SnO_2$ or ITO (indium-tin-oxide) to form an electrode plate. Further thereon, an insulating alignment control layer 4 is formed by rubbing a film of a polymer such as polyimide with gauze or acetate fiber-planted cloth so as to align the liquid crystal molecules in the rubbing direction. Further, it is also possible to compose the alignment control layer of two layers, e.g., by first forming an insulating layer of an inorganic material, such as silicon nitride, silicon nitride containing hydrogen, silicon carbide, silicon carbide containing hydrogen, silicon oxide, boron nitride, boron nitride containing hydrogen, cerium oxide, aluminum oxide, zirconium oxide, titanium oxide, or magnesium fluoride, and forming thereon an alignment control layer of an organic insulating material, such as polyvinyl alcohol, polyimide, polyamide-imide, polyester-imide, polyparaxylylene, polyester, polycarbonate, polyvinyl acetal, polyvinyl chloride, polyvinyl acetate, polyamide. polystyrene, cellulose resin, melamine resin, urea resin, acrylic resin, or photoresist resin. Alternatively, it is also possible to use a single layer of inorganic insulating alignment control layer or organic insulating alignment control layer. An inorganic insulating alignment control layer may be formed by vapor deposition, while an organic insulating alignment control layer may be formed by applying a solution of an organic insulating material or a precursor thereof in a concentration of 0.1 to 20 wt. %, preferably 0.2–10 wt. %, by spinner coating, dip coating, screen printing, spray coating or roller coating, followed by curing or hardening under prescribed hardening condition (e.g., by heating). The insulating alignment control layer may have a thickness of ordinarily 30 Å–1 micron, preferably 40–3000 Å, further preferably 40–1000 Å. The two glass substrates 2 with transparent electrodes 3 (which may be inclusively referred to herein as "electrode plates") and further with insulating alignment control layers 4 thereof are held to have a prescribed (but arbitrary) gap with a spacer 5. For example, such a cell structure with a prescribed gap may be formed by sandwiching spacers of silica beads or alumina beads having a prescribed diameter with two glass plates, and then sealing the periphery thereof with, e.g., an epoxy adhesive. Alternatively, a polymer film or glass fiber may also be used as a spacer. Between the two glass plates, a ferroelectric liquid crystal is sealed up to provide a ferroelectric liquid crystal layer 1 in a thickness of generally 0.5 to 20 microns, preferably 1 to 5 microns.

The ferroelectric liquid crystal provided by the composition of the present invention may desirably assume a SmC* phase (chiral smectic C phase) in a wide temperature range including room temperature (particularly, broad in a lower temperature side) and also shows wide drive voltage margin and drive temperature margin when contained in a device.

Particularly, in order to show a good alignment characteristic to form a uniform monodomain, the ferroelectric liquid crystal may show a phase transition series comprising isotropic phase - Ch phase (cholesteric phase) - SmA phase (smectic A phase) - SmC* phase (chiral smectic C phase) on temperature decrease.

The transparent electrodes 3 are connected to the external power supply 7 through the lead wires 6. Further, outside the glass substrates 2, polarizers 8 are applied. The device shown in FIG. 1 is of a transmission type and is provided with a light source 9.

FIG. 2 is a schematic illustration of a ferroelectric liquid crystal cell (device) for explaining operation thereof. Reference numerals 21a and 21b denote substrates (glass plates) on which a transparent electrode of, e.g., $In_2O_3$, $SnO_2$, ITO (indium-tin-oxide), etc., is disposed, respectively. A liquid crystal of an SmC*-phase (chiral smectic C phase) or SmH*-phase (chiral smectic H phase) in which liquid crystal molecular layers 22 are aligned perpendicular to surfaces of the glass plates is hermetically disposed therebetween. Full lines 23 show liquid crystal molecules. Each liquid crystal molecule 23 has a dipole moment (P⊥) 24 in a direction perpendicular to the axis thereof. The liquid crystal molecules 23 continuously form a helical structure in the direction of extension of the substrates. When a voltage higher than a certain threshold level is applied between electrodes formed on the substrates 21a and 21b, a helical structure of the liquid crystal molecules 23 is unwound or released to change the alignment direction of respective liquid crystal molecules 23 so that the dipole moments (P⊥) 24 are all directed in the direction of the electric field. The liquid crystal molecules 23 have an elongated shape and show refractive anisotropy between the long axis and the short axis thereof. Accordingly, it is easily understood that when, for instance, polarizers arranged in a cross nicol relationship, i.e., with their polarizing directions crossing each other, are disposed on the upper and the lower surfaces of the glass plates, the liquid crystal cell thus arranged functions as a liquid crystal optical modulation device of which optical characteristics vary depending upon the polarity of an applied voltage.

Figure 3:
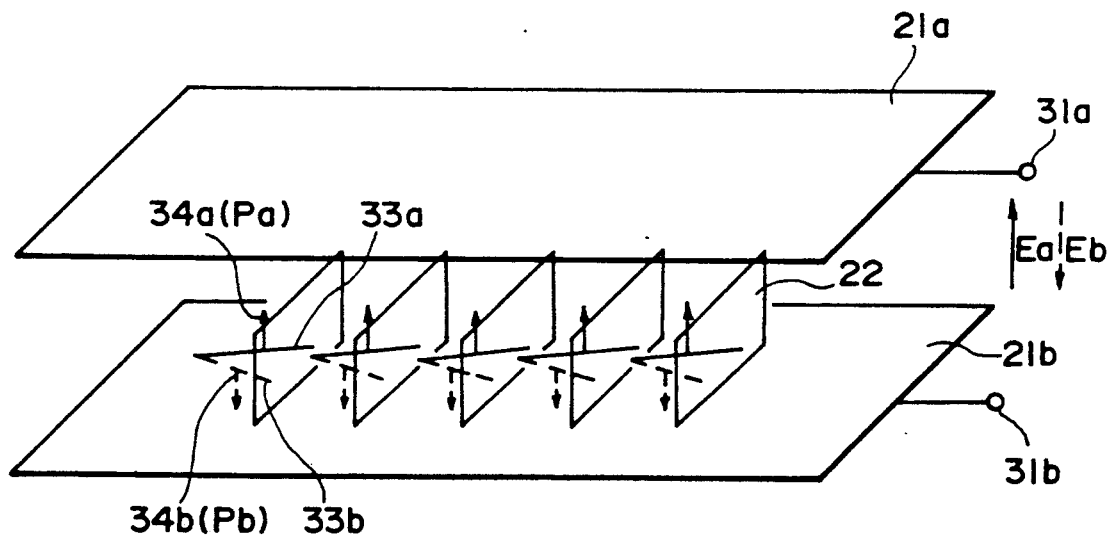

Further, when the liquid crystal cell is made sufficiently thin (e.g., less than about 10 microns), the helical structure of the liquid crystal molecules is unwound to provide a non-helical structure even in the absence of an electric field, whereby the dipole moment assumes either of the two states, i.e., Pa in an upper direction 34a or Pb in a lower direction 34b as shown in FIG. 3, thus providing a bistable condition. When an electric field Ea or Eb higher than a certain threshold level and different from each other in polarity as shown in FIG. 3 is applied to a cell having the above-mentioned characteristics by using voltage application means 31a and 31b, the dipole moment is directed either in the upper direction 34a or in the lower direction 34b depending on the vector of the electric field Ea or Eb. In correspondence with this, the liquid crystal molecules are oriented in either of a first stable state 33a and a second stable state 33b.

When the above-mentioned ferroelectric liquid crystal is used as an optical modulation element, it is possible to obtain two advantages. First is that the response speed is quite fast. Second is that the orientation of the liquid crystal shows bistability. The second advantage will be further explained, e.g., with reference to FIG. 3. When the electric field Ea is applied to the liquid crystal molecules, they are oriented in the first stable state 33a. This state is stably retained even if the electric field is removed. On the other hand, when the electric field Eb of which direction is opposite to that of the electric field Ea is applied thereto, the liquid crystal molecules are oriented to the second stable state 33b, whereby the directions of molecules are changed. This state is similarly stably retained even if the electric field is removed. Further, as long as the magnitude of the electric field Ea or Eb being applied is not above a certain threshold value, the liquid crystal molecules are placed in the respective orientation states.

Figure 9:
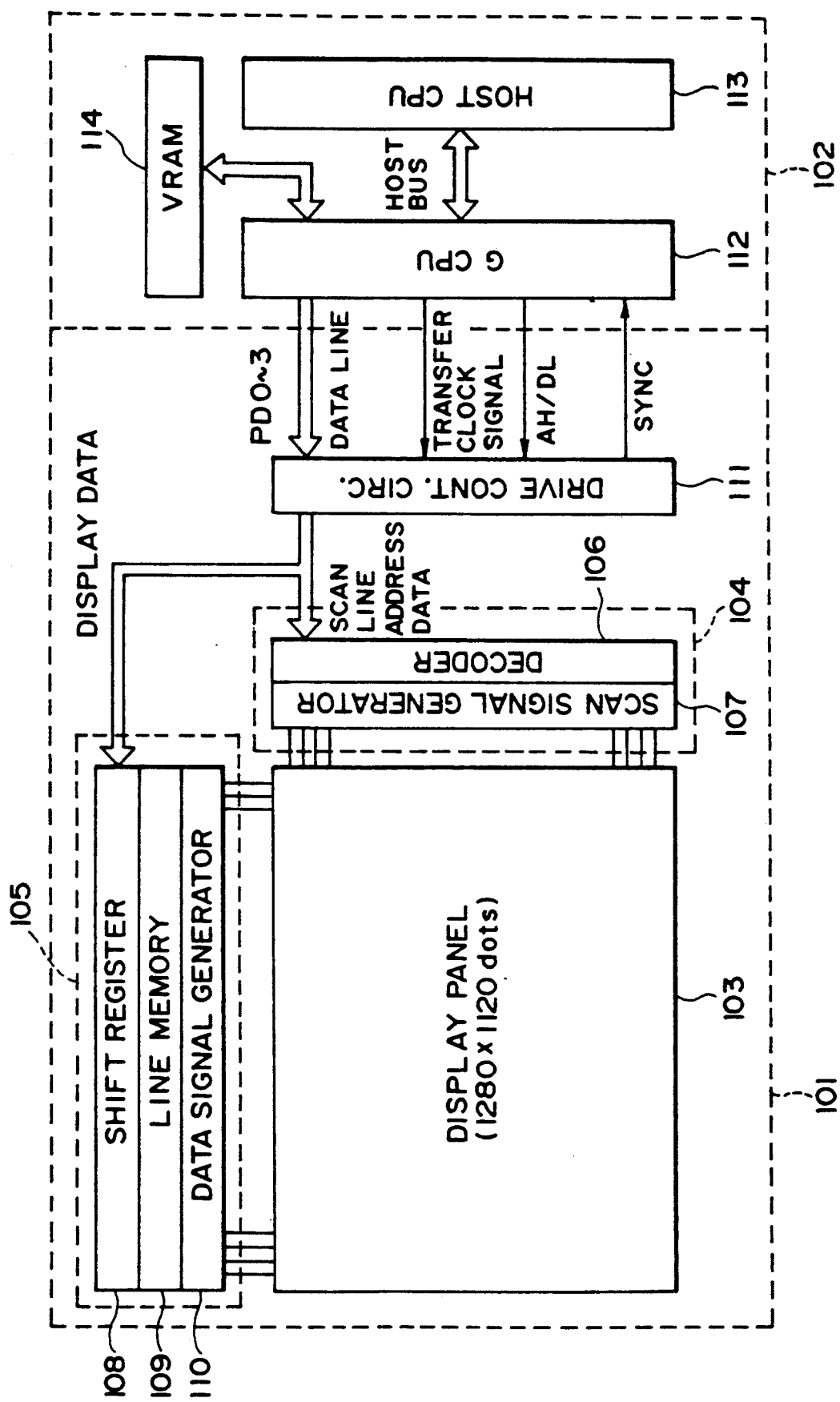
FIG. 9 is a block diagram showing a display apparatus comprising a liquid crystal device utilizing ferroelectricity of a liquid crystal composition and a graphic controller.
Figure 10:
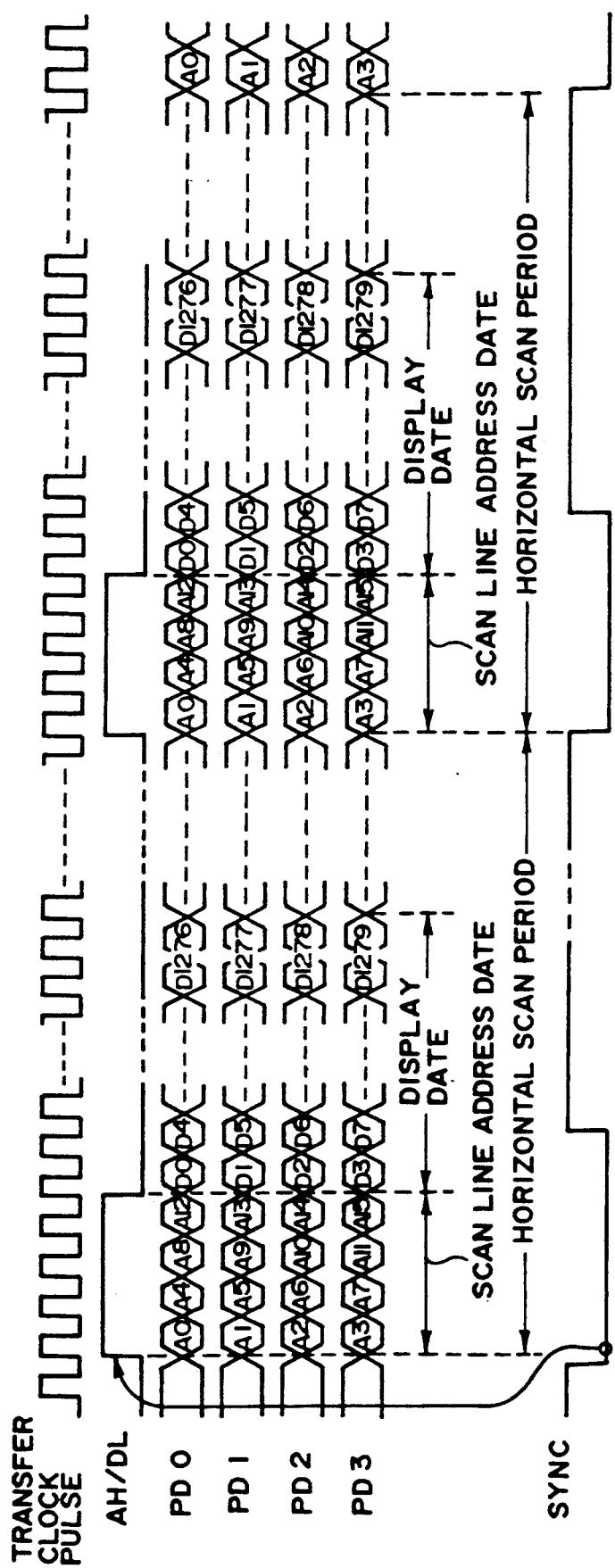
FIG. 10 is a time chart of image data communication showing time correlation between signal transfer and driving with respect to a liquid crystal display apparatus utilizing ferroelectricity and a graphic controller.

Based on an arrangement described below and data format comprising image data accompanied with scanning line address data and by adopting communication synchronization using a SYNC signal as shown in FIGS. 9 and 10, there is provided a liquid crystal display apparatus of the present invention which uses the liquid crystal device according to the present invention as a display panel portion.

Referring to FIG. 9, the ferroelectric liquid crystal display apparatus 101 includes a graphic controller 102, a display panel 103, a scanning line drive circuit 104, a data line drive circuit 105, a decoder 106, a scanning signal generator 107, a shift resistor 108, a line memory 109, a data signal generator 110, a drive control circuit 111, a graphic central processing unit (GCPU) 112, a host central processing unit (host CPU) 113, and an image data storage memory (VRAM) 114.

Image data are generated in the graphic controller 102 in an apparatus body and transferred to a display panel 103 by signal transfer means shown in FIGS. 9 and 10. The graphic controller 102 principally comprises a CPU (central processing unit, herein referred to as "GCPU") 112 and a VRAM (video-RAM, image data storage memory) 114 and is in charge of management and communication of image data between a host CPU 113 and the liquid crystal display apparatus (FLCD) 101. The control of the display apparatus is principally realized in the graphic controller 102. A light source is disposed at the back of the display panel 103.

Hereinbelow, the present invention will be explained more specifically with reference to examples. It is however to be understood that the present invention is not restricted to these examples.

EXAMPLE 1

A liquid crystal composition A was prepared by mixing the following compounds in respectively indicated proportions.

| Structural formula | wt. parts |
|---|---|
| $C_{10}H_{21}O\text{–}\langle\text{ph}\rangle\text{–COO–}\langle\text{ph}\rangle\text{–}OC_8H_{17}$ | 9 |
| $C_8H_{17}\text{–}\langle\text{ph}\rangle\text{–COO–}\langle\text{ph}\rangle\text{–}OC_{10}H_{21}$ | 8 |
| $C_{10}H_{21}O\text{–}\langle\text{ph}\rangle\text{–COO–}\langle\text{ph}\rangle\text{–}OC_6H_{13}$ | 10 |
| $C_{10}H_{21}\text{–}\langle\text{ph}\rangle\text{–COO–}\langle\text{ph}\rangle\text{–}OC_8H_{17}$ | 8 |
| $C_{10}H_{21}\text{–}\langle\text{ph}\rangle\text{–}\langle\text{ph}\rangle\text{–}O\text{-}(CH_2)_3\text{-}\overset{*}{C}H(CH_3)OC_3H_7$ | 3 |
| $C_{12}H_{25}O\text{–}\langle\text{ph}\rangle\text{–COS–}\langle\text{ph}\rangle\text{–}CH_2\overset{*}{C}H(CH_3)C_2H_5$ | 3 |
| $C_8H_{17}O\text{–}\langle\text{ph}\rangle\text{–COS–}\langle\text{ph}\rangle\text{–}OCH_2\overset{*}{C}H(CH_3)C_2H_5$ | 3 |
| $C_{10}H_{21}O\text{–}\langle\text{ph}\rangle\text{–COS–}\langle\text{ph}\rangle\text{–}OCH_2\overset{*}{C}H(CH_3)C_2H_5$ | 3 |
| $C_3H_7O\overset{*}{C}H(CH_3)(CH_2)_3O\text{–}\langle\text{ph}\rangle\text{–COO–}\langle\text{ph}\rangle\text{–}\langle\text{ph}\rangle\text{–}COOC_6H_{13}$ | 15 |
| $C_4H_9OCH_2\overset{*}{C}H(CH_3)O\text{–}\langle\text{ph}\rangle\text{–COO–}\langle\text{ph}\rangle\text{–}\langle\text{ph}\rangle\text{–}COOC_8H_{17}$ | 15 |
| $C_2H_5O\overset{*}{C}H(CH_3)(CH_2)O\text{–}\langle\text{ph}\rangle\text{–COO–}\langle\text{ph}\rangle\text{–}\langle\text{pyrimidine}\rangle\text{–}C_{12}H_{25}$ | 8 |
| $C_{12}H_{25}O\text{–}\langle\text{ph}\rangle\text{–COO–}\langle\text{ph}\rangle\text{–}COOCH_2\overset{*}{C}H(CH_3)OC_5H_{11}$ | 9 |
| $C_{12}H_{25}O\text{–}\langle\text{ph}\rangle\text{–COO–}\langle\text{ph}\rangle\text{–}COO\overset{*}{C}H(CF_3)CH_2COOC_2H_5$ | 6 |

A liquid crystal composition 1-A was prepared by mixing the following Example Compounds with the

| Ex. Comp. No. | Structural formula | wt. parts |
|---|---|---|
| 1-46 | 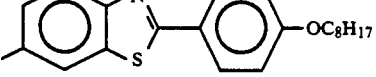 | 5 |
| 1-79 |  | 5 |
| 2-26 | 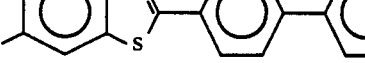 | 7 |
| 2-55 | 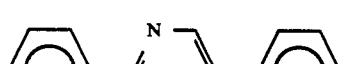 | 5 |
| 2-78 | 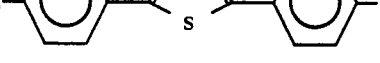 | 5 |
| Composition A | | 73 |

The above-prepared liquid crystal composition 1-A was used to prepare a liquid crystal device in combination with a blank cell prepared in the following manner.

Two 0.7 mm-thick glass plates were provided and respectively coated with an ITO film to form an electrode for voltage application, which was further coated with an insulating layer of vapor-deposited SiO$_2$. On the insulating layer, a 0.2%-solution of silane coupling agent (KBM-602, available from Shinetsu Kagaku K. K.) in isopropyl alcohol was applied by spinner coating at a speed of 2000 rpm for 15 second and subjected to hot curing treatment at 120° C. for 20 min.

Further, each glass plate provided with an ITO film and treated in the above described manner was coated with a 1.0 %-solution of polyimide resin precursor (SP-510, available from Toray K. K.) in dimethylacetoamide by a spinner coater rotating at 3000 rpm for 15 seconds. Thereafter, the coating film was subjected to heat curing at 300° C. for 60 min. to obtain about 120 Å-thick film. The coating film was rubbed with acetate fiber-planted cloth. The thus treated two glass plates were washed with isopropyl alcohol. After silica beads with an average particle size of 1.5 microns were dispersed on one of the glass plates, the two glass plates were applied to each other with a bonding sealing agent (Lixon Bond, available from Chisso K. K.) so that their rubbed directions were parallel to each other and heated at 100° C. for 60 min. to form a blank cell. The cell gap was found to be about 1.5 microns as measured by a Berek compensator.

Then, the above-prepared liquid crystal composition 1-A was heated into an isotropic liquid, and injected into the above prepared cell under vacuum and, after sealing, was gradually cooled at a rate of 20° C./hour to 25° C. to prepare a ferroelectric liquid crystal device.

Figure 5:
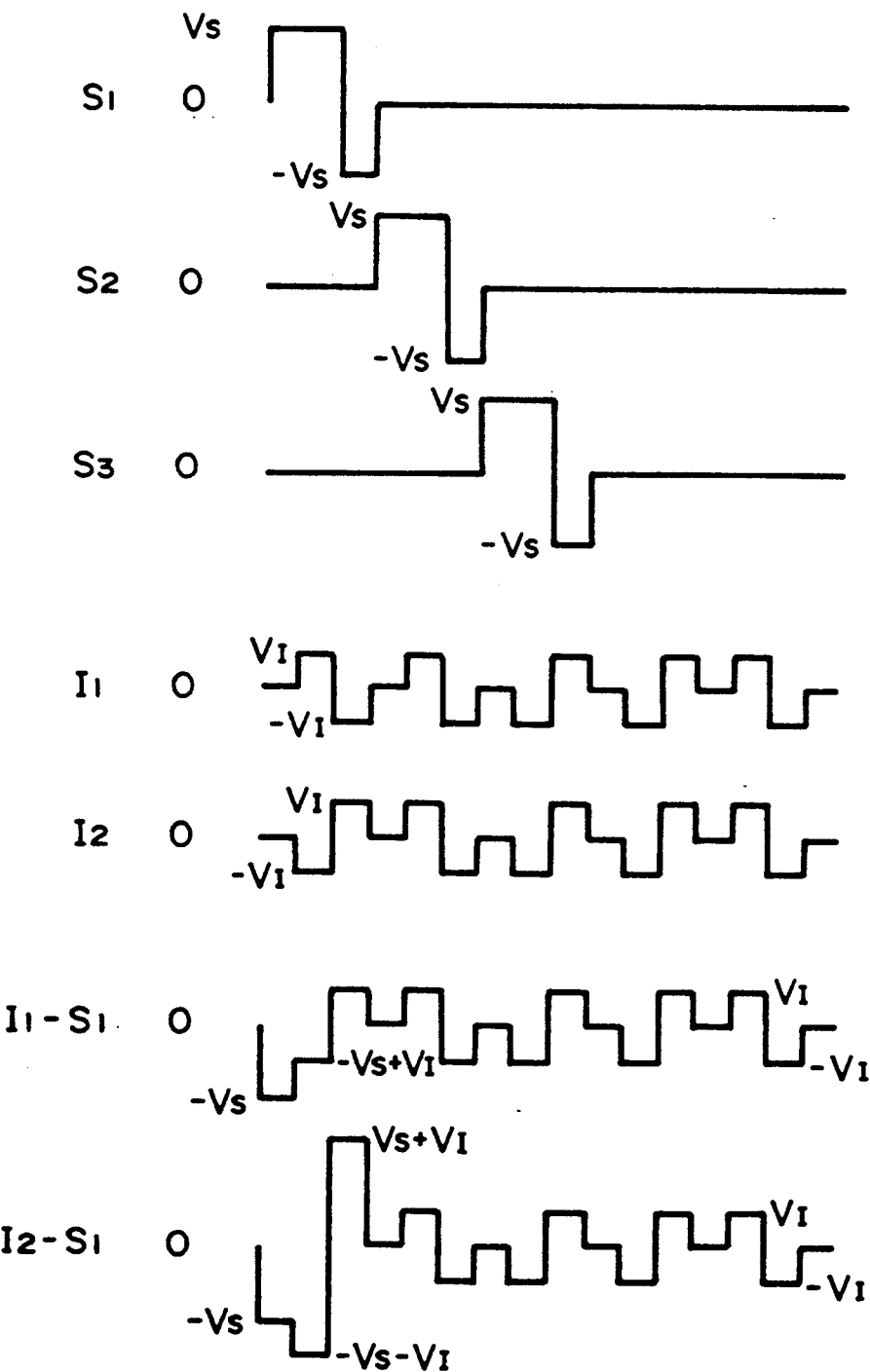
FIG. 5 is time-serial waveforms comprising a succession of such unit waveforms.

The ferroelectric liquid crystal device was subjected to measurement of a driving voltage margin $\Delta V$ (=$V_3 - V_1$) by using the driving waveforms (bias rati- o=⅓) described with reference to FIGS. 4 and 5 and setting $\Delta t$ so as to provide $V_1$ of about 15 volts. The results are shown below.

| | 10° C. | 25° C. | 40° C. |
|---|---|---|---|
| Voltage margin $\Delta V$ (set $\Delta t$) | 14.2 V (630 μsec) | 14.1 V (185 μsec) | 13.7 V (76 μsec) |

Further, when the temperature was changed while the voltage ($V_S+V_I$) was set at a central value within the voltage margin at 25° C. (i.e., a central value of a voltage range capable of driving), the temperature difference capable of driving (hereinafter called "(driving) temperature margin") was ±4.0° C.

Further, a contrast of 9.0 was attained at 25° C. during the driving.

COMPARATIVE EXAMPLE 1

A liquid crystal composition 1-AI was prepared by omitting Example compounds Nos. 2-26, 2-55 and 2-78 from the liquid crystal composition 1-A, i.e., by adding only Example compound No. 1-46 and 1-79 to the liquid crystal composition and a liquid crystal composition 1-AII was prepared by omitting Example compounds Nos. 1-46 and 1-79 from the composition 1-A, i.e., by adding only Example compounds Nos. 2-26, 2-55 and 2-78 to the composition.

Ferroelectric liquid crystal devices A, 1-AI and 1-AII were prepared by using the compositions A, 1-AI and 1-AII, respectively, instead of the composition 1-A, and subjected to measurement of driving voltage margin $\Delta V$, otherwise in the same manner as in Example 1. The results are shown below.

| | Voltage margin ΔV (set Δt) | | |
|---|---|---|---|
| | 10° C. | 25° C. | 40° C. |
| A | 9.0 V | 8.5 V | 8.0 V |
| | (838 μsec) | (236 μsec) | (83 μsec) |
| 1-AI | 10.1 V | 10.5 V | 10.0 V |
| | (770 μsec) | (217 μsec) | (80 μsec) |
| 1-AII | 10.5 V | 10.0 V | 9.5 V |
| | (727 μsec) | (190 μsec) | (72 μsec) |

Further, the driving temperature margin with respect to 25° C. was ±1.8° C. for A, ±3.3° C. for 1-AI and ±3.0° C. for 1-AII.

As apparent from the above Example 1 and Comparative Example 1, the ferroelectric liquid crystal device containing the liquid crystal composition 1-A according to the present invention provide wider driving voltage and temperature margins and showed a better performance of retaining good images in resistance to changes in environmental temperature and cell gap.

EXAMPLE 2

Fifteen-types of ferroelectric liquid crystal devices were prepared in the same manner as in Example 1 by equally using the composition 1-A prepared in Example 1 except that 15 types of alignment films were prepared by rubbing three types of polyimide films having different thicknesses (i.e., 60 Å, 120 Å and 180 Å) with acetate fiber-planted cloth at 5 degrees of different rubbing strengths (alignment-regulating forces) by changing the moving speed of the acetate fiber-planted cloth under a constant pressing width of the cloth.

The ferroelectric liquid crystal devices prepared above were subjected to microscopic observation of alignment states in the devices. The results of the observation are shown below.

| Thickness of | Rubbing strength*1 | | | | |
|---|---|---|---|---|---|
| coating film | 1 | 2 | 3 | 4 | 5 |
| 60 Å | ○ | ○ | ○ | ⊚ | ⊚ |
| 120 Å | ○ | ○ | ⊚*2 | ⊚ | ⊚ |
| 180 Å | ○ | ⊚ | ⊚ | ⊚ | ⊚ |

*1: A larger degree of rubbing strength is given by a smaller moving speed of the rubbing cloth (i.e., a longer rubbing time). The respective degrees of rubbing strength corresponded to the following moving speeds of the rubbing cloth:
1: 70 mm/sec,
2: 60 mm/sec,
3: 50 mm/sec,
4: 40 mm/sec,
5: 30 mm/sec/
*2 The device used in Example 1.
The standards of evaluation of the alignment states were as follows:
⊚: No alignment defects were observed, and a monodomain with a good and uniform alignment characteristic was observed.
○: Alignment defects in the form of streaks were slightly observed in a part of an area around silica beads.

COMPARATIVE EXAMPLE 2

Ferroelectric liquid crystal devices A, 1-AI and 1-AII were prepared by using the compositions A, 1-AI and 1-AII prepared in Comparative Example 1, respectively, instead of the composition 1-A prepared in Example 2, otherwise in the same manner as in Example 2. The devices were subjected to observation of alignment states in the device. The results are shown below.

| Thickness of | Rubbing strength | | | | |
|---|---|---|---|---|---|
| coating film | 1 | 2 | 3 | 4 | 5 |
| <Device A> | | | | | |
| 60 Å | ✱ | ✱ | ✱ | ✱ | x |
| 120 Å | ✱ | ✱ | x*1 | x | x |
| 180 Å | ✱ | x | x | x | Δ |
| <Device 1-AI> | | | | | |
| 60 Å | x | x | x | Δ | Δ |
| 120 Å | x | Δ | Δ*1 | ○ | ○ |
| 180 Å | Δ | ○ | ○ | ○ | ○ |
| <Device 1-AII> | | | | | |
| 60 Å | ✱ | x | x | Δ | Δ |
| 120 Å | x | Δ | Δ*1 | Δ | Δ |
| 180 Å | x | Δ | Δ | Δ | ○ |

*1: The device used in Comparative Example 1.
○: Alignment defects in the form of streaks were slightly observed in a part of an area around silica beads.
Δ: Alignment states looked like a uniform monodomain, but alignment defects in the form of streaks were observed over an entire area around silica beads and zig-zag defects were observed in a part of a display area.
x: Zig-zag defects were considerably observed.
✱: Zig-zag defects were observed over a substantially entire display area and ununiform alignment states result.

As apparent from the above Example 2 and Comparative Example 2, the ferroelectric liquid crystal device containing the liquid crystal composition 1-A according to the present invention provided a monodomain with a good and uniform alignment characteristic when used in the device.

Further, as is understood from the above-mentioned Example 1 and Comparative Example 1 and from the above Example 2 and Comparative Example 2, some obstacles to commercialization of a practical ferroelectric liquid crystal device have been removed by using the liquid crystal composition 1-A according to the present invention.

EXAMPLE 3

A liquid crystal composition 3-A was prepared by mixing the following example compounds in the indicated proportions with the liquid crystal composition A prepared in Example 1.

| Ex. Comp. No. | Structural formula | wt. parts |
|---|---|---|
| 3-26 | $C_3H_7$—⟨H⟩—COO—⟨⟩—$OCH_2\overset{*}{C}HC_8H_{17}$ (with F on chiral C) | 6 |
| 3-80 | $C_{10}H_{21}$—⟨N=N⟩—⟨⟩—$OCOO\overset{*}{C}HC_6H_{13}$ (with F on chiral C) | 6 |

-continued

| Ex. Comp. No. | Structural formula | wt. parts |
| --- | --- | --- |
| 1-46 | | 5 |
| 1-79 | | 5 |
| 2-26 | | 7 |
| 2-55 | | 5 |
| 2-78 | | 5 |
| | Composition A | 73 |

A ferroelectric liquid crystal device was prepared in the same manner as in Example 1 except that the above liquid crystal composition 3-A was used, and the device was subjected to measurement of driving voltage margin ΔV. The results of the measurement are shown below.

| | 10° C. | 25° C. | 40° C. |
| --- | --- | --- | --- |
| Voltage margin ΔV (set Δt) | 13.7 V (545 μsec) | 14.2 V (171 μsec) | 14.0 V (73 μsec) |

Further, the driving temperature margin with respect to 25° C. was ±3.9° C. A contrast of 11.0 was attained during the drive at the temperature.

COMPARATIVE EXAMPLE 3

A liquid crystal composition 3-AI was prepared by omitting Example compounds Nos. 2-26, 2-55 and 2-78 from the liquid crystal composition 3-A, i.e., by adding only Example compounds Nos. 1-46, 1-79 3-26 and 3-80 to the liquid Crystal composition A, and a liquid crystal composition 3-AII was prepared by omitting Example compounds Nos. 1-46 and 1-79 from the composition 3-A. i.e.. by adding only Example compounds Nos. 2-26, 2-55, 2-78. 3-26 and 3-80 to the composition A.

Ferroelectric liquid crystal devices A, 3-AI and 3-AII were prepared by using the compositions A, 3-AI and 3-AII, respectively, instead of the composition 3-A, and subjected to measurement of driving voltage margin ΔV. otherwise in the same manner as in Example 3. The results are shown below.

| | Voltage margin ΔV (set Δt) | | |
| --- | --- | --- | --- |
| | 10° C. | 25° C. | 40° C. |
| A | 9.0 V (838 μsec) | 8.5 V (236 μsec) | 8.0 V (83 μsec) |
| 3-AI | 10.0 V (610 μsec) | 10.5 V (200 μsec) | 10.2 V (75 μsec) |
| 3-AII | 10.2 V (600 μsec) | 10.2 V (165 μsec) | 9.8 V (64 μsec) |

Further, the driving temperature margin with respect to 25° C. was ±1.6° C. for A, ±3.1° C. for 3-AI and ±2 9° C. for 3-AII.

As apparent from the above Example 3 and Comparative Example 3, the ferroelectric liquid crystal device containing the liquid crystal composition 3-B according to the present invention provided wider driving voltage and temperature margins and showed a better performance of retaining good images in resistance to changes in environmental temperature and cell gap.

EXAMPLE 4

Ferroelectric liquid crystal devices were prepared in the same manner as in Example 2 except for using the composition 3-A prepared in Example 3.

The ferroelectric liquid crystal devices prepared above were subjected to microscopic observation of alignment states in the devices. The results of the observation are shown below.

| Thickness of coating film | Rubbing strength | | | | |
| --- | --- | --- | --- | --- | --- |
| | 1 | 2 | 3 | 4 | 5 |
| 60 Å | o | o | o | ⊚ | ⊚ |
| 120 Å | o | o | ⊚*1 | ⊚ | ⊚ |
| 180 Å | o | ⊚ | ⊚ | ⊚ | ⊚ |

*1: The device used in Example 3.
⊚: No alignment defects were observed, and a monodomain with a good and uniform alignment characteristic was observed.
o: Alignment defects in the form of streaks were slightly observed in a part of an area around silica beads.

COMPARATIVE EXAMPLE 4

Ferroelectric liquid crystal devices A, 3-AI and 1-AII were prepared by using the compositions A, 3-AI and 3-AII prepared in Comparative Example 3, respectively, instead of the composition 3-A prepared in Example 4, otherwise in the same manner as in Example 2. The devices were subjected to observation of alignment states in the device. The results are shown below.

| Thickness of | Rubbing strength | | | | |
|---|---|---|---|---|---|
| coating film | 1 | 2 | 3 | 4 | 5 |
| <Device A> | | | | | |
| 60 Å | ⦿ | ⦿ | ⦿ | ⦿ | x |
| 120 Å | ⦿ | ⦿ | x*1 | x | x |
| 180 Å | x | x | x | x | Δ |
| <Device 3-AI> | | | | | |
| 60 Å | x | x | x | Δ | Δ |
| 120 Å | x | x | Δ*1 | Δ | ○ |
| 180 Å | Δ | Δ | ○ | ○ | ○ |
| <Device 3-AII> | | | | | |
| 60 Å | ⦿ | x | x | x | x |
| 120 Å | x | x | x*1 | x | Δ |
| 180 Å | x | x | Δ | Δ | Δ |

*1: The device used in Comparative Example 3.
In the above, ○, Δ, x and ⦿ are the same as defined in the above-mentioned Comparative Example 2.

As apparent from the above Example 4 and Comparative Example 4, the ferroelectric liquid crystal device containing the liquid crystal composition 3-A according to the present invention provided a monodomain with a good and uniform alignment characteristic when used in the device.

Further, apparent from the above-mentioned Example 3 and Comparative Example 3 and from the above Example 4 and Comparative Example 4, obstacles to commercialization of a practical ferroelectric liquid crystal device have been eliminated by using the liquid crystal composition 3-A according to the present invention.

EXAMPLE 5

A liquid crystal composition B was prepared by mixing the following compounds in the respectively indicated proportions.

| Structural formula | wt. parts |
|---|---|
| $C_8H_{17}$—[pyridine]—[phenyl]—O$(CH_2)_3$*CHC$_2$H$_5$ (CH$_3$) | 3 |
| $C_{12}H_{25}$O—[phenyl]—[pyridine]—COO$(CH_2)_3$*CHC$_2$H$_5$ (CH$_3$) | 4 |
| $C_{10}H_{21}$O—[pyridine]—[phenyl]—O$(CH_2)_3$*CHC$_2$H$_5$ (CH$_3$) | 4 |
| $C_{11}H_{23}$O—[pyridine]—[phenyl]—OCH$_2$*CHC$_2$H$_5$ (CH$_3$) | 10 |
| $C_{10}H_{21}$—[pyridine]—[phenyl]—OCOCH$_2$*CHC$_4$H$_9$ (CH$_3$) | 3 |
| $C_{10}H_{21}$O—[pyridine]—COO—[phenyl]—OC$_8$H$_{17}$ | 8 |
| $C_8H_{17}$—[phenyl]—COO—[phenyl]—OC$_{10}$H$_{21}$ | 8 |
| $C_{10}H_{21}$O—[phenyl]—COO—[phenyl]—OC$_6$H$_{13}$ | 12 |
| $C_{12}H_{25}$O—[phenyl]—COO—[phenyl]—COO$(CH_2)_3$*CHOC$_5$H$_{11}$ (CH$_3$) | 10 |

-continued
| Structural formula | wt. parts |
|---|---|
|  | 8 |
|  | 2 |
|  | 6 |
|  | 6 |
| 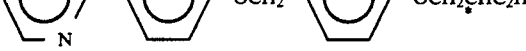 | 9 |
|  | 5 |
| 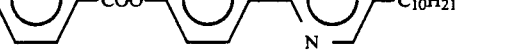 | 3 |
A liquid crystal composition 5-B was prepared by mixing the following Example Compounds with the above prepared composition B in the respectively indicated proportions.
| Ex. Comp. No. | Structural formula | wt. parts |
|---|---|---|
| 1-17 | 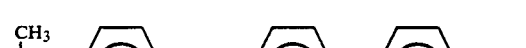 | 3 |
| 1-59 | 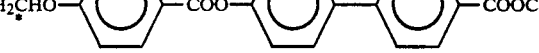 | 5 |
| 1-96 |  | 3 |
| 1-133 |  | 3 |

-continued

| Ex. Comp. No. | Structural formula | wt. parts |
|---|---|---|
| 2-28 | $C_{12}H_{25}$—〇—C(=N,S)—CH=CH—〇—$C_{12}H_{25}$ | 5 |
| 2-39 | $C_5H_{11}$—〇—C(=N,S)—CH=CH—〇—$OCC_{10}H_{21}$ (‖ O) | 5 |
| 2-134 | $C_{10}H_{21}$—C(=N,S)—CH=CH—〇—OC(=O)—(H)—$C_4H_9$ | 2 |
| 2-137 | $C_9H_{19}$—C(=N,S)—CH=CH—〇—(N,N)—$C_{10}H_{21}$ | 5 |
| Composition B | | 69 |

A ferroelectric liquid crystal device 5-B was prepared in the same manner as in Example 1 except that the liquid crystal composition 5-B was used instead of the composition 1-B. The device was subjected to measurement of driving voltage margin. The results of the measurement are shown below.

|  | 10° C. | 25° C. | 40° C. |
|---|---|---|---|
| Voltage margin ΔV (set Δt) | 14.0 V (471 μsec) | 14.0 V (160 μsec) | 13.5 V (57 μsec) |

Further, the driving temperature margin with respect to 25° C. was ±4.0° C. A contrast of 9.0 was attained during the drive at the temperature.

COMPARATIVE EXAMPLE 5

A liquid crystal composition 5-BI was prepared by omitting Example compounds Nos. 2-28, 2-39, 2-134 and 2-137 from the liquid crystal composition 5-B prepared in Example 5, i.e., by adding only Example compounds Nos. 1-17, 1-59, 1-96 and 1-133 to the liquid crystal composition B, and a liquid crystal composition 5-BII was prepared by omitting Example compounds Nos. 1-17, 1-59, 1-96 and 1-133 from the composition 5-B, i.e., by adding only Example compounds Nos. 2-28, 2-39, 2-134 and 2-137 to the composition B.

Ferroelectric liquid crystal devices B, 5-BI and 5-BII were prepared by using the compositions B, 5-BI and 5-BII, respectively, instead of the composition 5-B, and subjected to measurement of driving voltage margin ΔV, otherwise in the same manner as in Example 5. The results are shown below.

|  | Voltage margin ΔV (set Δt) | | |
|---|---|---|---|
|  | 10° C. | 25° C. | 40° C. |
| B | 8.3 V (590 μsec) | 8.5 V (172 μsec) | 6.5 V (61 μsec) |
| 5-BI | 9.8 V (495 μsec) | 10.0 V (161 μsec) | 9.5 V (53 μsec) |
| 5-BII | 10.5 V (540 μsec) | 11.0 V (165 μsec) | 10.5 V (63 μsec) |

Further, the driving temperature margin with respect to 25° C. was ±1.9° C. for B, ±2.3° C. for 5-BI and ±2.8° C. for 5-BII.

As apparent from the above Example 5 and Comparative Example 5, the ferroelectric liquid crystal device containing the liquid crystal composition 5-B according to the present invention provided wider driving voltage and temperature margins and showed a better performance of retaining good images in resistance to changes in environmental temperature and cell gap.

EXAMPLE 6

Ferroelectric liquid crystal devices were prepared in the same manner as in Example 5 except for using the composition 5-B prepared in Example 5.

The ferroelectric liquid crystal devices prepared above were subjected to microscopic observation of alignment states in the devices. The results of the observation are shown below.

| Thickness of coating film | Rubbing strength | | | | |
|---|---|---|---|---|---|
|  | 1 | 2 | 3 | 4 | 5 |
| 60 Å | ○ | ○ | ⊙ | ⊙ | ⊙ |
| 120 Å | ○ | ⊙ | ⊙*1 | ⊙ | ⊙ |
| 180 Å | ⊙ | ⊙ | ⊙ | ⊙ | ⊙ |

⊙: No alignment defects were observed, and a monodomain with a good and uniform alignment characteristic was observed.
○: Alignment defects in the form of streaks were slightly observed in a part of an area around silica beads.

COMPARATIVE EXAMPLE 6

Ferroelectric liquid crystal devices B, 5-BI and 5-BII were prepared by using the compositions B, 5-BI and 5-BII prepared in Comparative Example 5, respectively, instead of the composition 5-B prepared in Example 6, otherwise in the same manner as in Example 6. The devices were subjected to observation of alignment states in the device. The results are shown below.

cated proportions with the liquid crystal composition 5-B prepared in Example 5.

| Ex. Comp. No. | Structural formula | wt. parts |
|---|---|---|
| 3-6 | $C_{10}H_{21}O-\langle\bigcirc\rangle-\underset{\underset{O}{\|}}{CO}-\langle\bigcirc\rangle-OCH_2\overset{F}{\underset{*}{C}}HC_5H_{11}$ | 2 |
| 3-54 | $C_{10}H_{21}-\langle\bigcirc_N^N\rangle-\langle\bigcirc\rangle-OCH_2\overset{F}{\underset{*}{C}}HC_4H_9$ | 3 |
| 3-81 | $C_{12}H_{25}-\langle\bigcirc_N^N\rangle-\langle\bigcirc\rangle-O\underset{\underset{O}{\|}}{CO}\overset{F}{\underset{*}{C}}HC_6H_{13}$ | 5 |
| 1-17 | | 3 |
| 1-59 | | 5 |
| 1-96 | | 3 |
| 1-133 | | 3 |
| 2-28 | | 5 |
| 2-39 | | 5 |
| 2-134 | | 2 |
| 2-137 | | 5 |
| Composition B | | 59 |

| Thickness of coating film | Rubbing strength | | | | |
|---|---|---|---|---|---|
| | 1 | 2 | 3 | 4 | 5 |
| <Device B> | | | | | |
| 60 Å | # | # | # | x | x |
| 120 Å | # | # | x*1 | x | x |
| 180 Å | # | x | x | x | x |
| <Device 5-BI> | | | | | |
| 60 Å | x | x | Δ | Δ | Δ |
| 120 Å | x | x | Δ*1 | Δ | o |
| 180 Å | Δ | o | o | o | o |
| <Device 5-BII> | | | | | |
| 60 Å | x | Δ | Δ | o | o |
| 120 Å | Δ | Δ | Δ*1 | o | o |
| 180 Å | Δ | o | o | o | o |

*1: The device used in Comparative Example 5.
o: Alignment defects in the form of streaks were slightly observed in a part of an area around silica beads.
Δ: Alignment states looked like a uniform monodomain, but alignment defects in the form of streaks were observed over an entire area around silica beads and zig-zag defects were observed in a part of a display area.
x: Zig-zag defects were considerably observed.
: Zig-zag defects were observed over a substantially entire display area and ununiform alignment states result.

As apparent from the above Example 6 and Comparative Example 6, the ferroelectric liquid crystal device containing the liquid crystal composition 5-B according to the present invention provided a monodomain with a good and uniform alignment characteristic when used in the device.

Further, apparent from the above-mentioned Example 5 and Comparative Example 5 and from the above Example 6 and Comparative Example 6, some obstacles to commercialization of a practical ferroelectric liquid crystal device have been removed by using the liquid crystal composition 5-B according to the present invention.

EXAMPLE 7

A liquid crystal composition 7-B was prepared by mixing the following example compounds in the indicated proportions with the liquid crystal composition 5-B prepared in Example 5.

A ferroelectric liquid crystal device was prepared in the same manner as in Example 1 except that the above liquid crystal composition 7-B was used, and the device was subjected to measurement of driving voltage margin. The results of the measurement are shown below.

| | 10° C. | 25° C. | 40° C. |
|---|---|---|---|
| Voltage margin ΔV (set Δt) | 12.5 V (378 μsec) | 13.0 V (118 μsec) | 12.5 V (46 μsec) |

Further, the driving temperature margin with respect to 25° C. was ±4.0° C. A contrast of 9.0 was attained during the drive at the temperature.

COMPARATIVE EXAMPLE 7

A liquid crystal composition 7-BI was prepared by omitting Example compounds Nos. 2-28, 2-39, 2-134 and 2-137 from the liquid crystal composition 7-B prepared in Example 7, i.e., by adding only Example compounds Nos. 1-17, 1-59, 1-96, 1-133, 3-6, 3-54 and 3-81 to the liquid crystal composition B, and a liquid crystal composition 7-BII was prepared by omitting Example compounds Nos. 1-17, 1-59, 1-96 and 1-133 from the composition 7-B, i.e., by adding only Example compounds Nos. 2-28, 2-39, 2-134, 2-137, 3-6, 3-54 and 3-81 to the composition B.

Ferroelectric liquid crystal devices B, 7-BI and 7-BII were prepared by using the compositions B, 7-BI and 7-BII, respectively, instead of the composition 7-B, and subjected to measurement of driving voltage margin ΔV, otherwise in the same manner as in Example 7. The results are shown below.

| | Voltage margin ΔV (set Δt) | | |
|---|---|---|---|
| | 10° C. | 25° C. | 40° C. |
| B | 8.3 V (590 μsec) | 8.5 V (172 μsec) | 6.5 V (61 μsec) |

-continued

| | Voltage margin ΔV (set Δt) | | |
|---|---|---|---|
| | 10° C. | 25° C. | 40° C. |
| 7-BI | 10.8 V | 10.7 V | 10.2 V |
| | (450 μsec) | (152 μsec) | (50 μsec) |
| 7-BII | 10.2 V | 10.3 V | 9.8 V |
| | (481 μsec) | (150 μsec) | (57 μsec) |

Further, the driving temperature margin with respect to 25° C. was ±1.8° C. for B, ±2.5° C. for 7-BI and ±3.1° C. for 7-BII.

As apparent from the above Example 7 and Comparative Example 7, the ferroelectric liquid crystal device containing the liquid crystal composition 7-B according to the present invention provided wider driving voltage and temperature margins and showed a better performance of retaining good images in resistance to changes in environmental temperature and cell gap.

EXAMPLE 8

Ferroelectric liquid crystal devices were prepared in the same manner as in Example 2 except for using the composition 7-B prepared in Example 7.

The ferroelectric liquid crystal devices prepared above were subjected to observation of alignment states in the devices. The results of the observation are shown below.

| Thickness of | Rubbing strength | | | | |
|---|---|---|---|---|---|
| coating film | 1 | 2 | 3 | 4 | 5 |
| 60 Å | ○ | ○ | ○ | ○ | ⊚ |
| 120 Å | ○ | ○ | ⊚*1 | ⊚ | ⊚ |
| 180 Å | ⊚ | ⊚ | ⊚ | ⊚ | ⊚ |

*1: The device used in Example 7.
⊚: No alignment defects were observed, and a monodomain with a good and uniform alignment characteristic was observed.
○: Alignment defects in the form of streaks were slightly observed in a part of an area around silica beads.

COMPARATIVE EXAMPLE 8

Ferroelectric liquid crystal devices B, 7-BI and 7-BII were prepared by using the compositions B, 7-BI and 7-BII prepared in Comparative Example 7, respectively, instead of the composition 7-B prepared in Example 8, otherwise in the same manner as in Example 8. The devices were subjected to observation of alignment states in the device. The results are shown below.

| Thickness of | Rubbing strength | | | | |
|---|---|---|---|---|---|
| coating film | 1 | 2 | 3 | 4 | 5 |
| <Device B> | | | | | |
| 60 Å | # | # | # | x | x |
| 120 Å | # | # | x*1 | x | x |
| 180 Å | x | x | x | x | x |
| <Device 7-BI> | | | | | |
| 60 Å | x | x | x | Δ | Δ |
| 120 Å | x | x | Δ*1 | Δ | Δ |
| 180 Å | x | Δ | Δ | Δ | Δ |
| <Device 7-BII> | | | | | |
| 60 Å | x | Δ | Δ | Δ | ○ |
| 120 Å | Δ | Δ | ○*1 | ○ | ○ |
| 180 Å | Δ | ○ | ○ | ○ | ○ |

*1: The device used in Comparative Example 7.
○: Alignment defects in the form of streaks were slightly observed in a part of an area around silica beads.
Δ: Alignment states looked like a uniform monodomain, but alignment defects in the form of streaks were observed over an entire area around silica beads and zig-zag defects were observed in a part of a display area.
x: Zig-zag defects were considerably observed.
: Zig-zag defects were observed over a substantially entire display area and ununiform alignment states result.

As apparent from the above Example 8 and Comparative Example 8, the ferroelectric liquid crystal device containing the liquid crystal composition 7-B according to the present invention provided a monodomain with a good and uniform alignment characteristic when used in the device.

Further, apparent from the above-mentioned Example 7 and Comparative Example 7 and from the above Example 8 and Comparative Example 8, some obstacles to commercialization of a practical ferroelectric liquid crystal device have been removed by using the liquid crystal composition 7-B according to the present invention.

EXAMPLE 9

A blank cell was prepared in the same manner as in Example 1 by using a 2 % aqueous solution of polyvinyl alcohol resin (PVA-117, available from Kuraray K.K.) instead of the 1.5 %-solution of polyimide resin precursor in dimethylacetoamide on each electrode plate. A ferroelectric liquid crystal device was prepared by filling the blank cell with the liquid crystal composition 1-A prepared in Example 1. The liquid crystal device was subjected to measurement of driving voltage and temperature margins in the same manner as in Example 1. The results are shown below.

| Voltage margin (set Δt) | | | |
|---|---|---|---|
| 10° C. | 25° C. | 40° C. | Temp. margin (at 25° C.) |
| 14.1 V | 14.1 V | 13.6 V | ±4.0° C. |
| (628 μsec) | (186 μsec) | (76 μsec) | |

EXAMPLE 10

A blank cell was prepared in the same manner as in Example 1 except for omitting the SiO$_2$ layer to form an alignment control layer composed of the polyimide resin layer alone on each electrode plate. A ferroelectric liquid crystal devices were prepared by filling such a blank cell with liquid crystal composition 1-A prepared in Example 1. The liquid crystal device was subjected to measurement of driving voltage and temperature margings in the same manner as in Example 1. The results are shown below.

| Voltage margin (set Δt) | | | |
|---|---|---|---|
| 10° C. | 25° C. | 40° C. | Temp. margin (at 25° C.) |
| 14.5 V | 14.3 V | 13.7 V | ±4.2° C. |
| (621 μsec) | (182 μsec) | (73 μsec) | |

As is apparent from the above Examples 9 and 10, also in the case of a different device structure, the device containing the ferroelectric liquid crystal composition 1-A according to the present invention provided wider driving voltage and temperature margins and showed a better performance of retaining good images in resistance to changes in environmental temperature and cell gap.

EXAMPLES 11-20

Liquid crystal compositions 11-A to 15-A and 16-B to 20-B were prepared by replacing the example compounds and the liquid crystal compositions used in Example 1 and 5 with example compounds and liquid crystal compositions shown in the following Table 1. Ferroelectric liquid crystal devices were prepared by respectively using these compositions instead of the composition 1-A, and subjected to measurement of driving voltage and temperature margins and observation of switching states in the same manner as in Example 1. In the devices, a monodomain with a good and uniform alignment characteristic was observed. The results of the measurement are shown in the following Table 1.

wider driving voltage margin and a wider temperature margin affording satisfactory drive of entire pixels even when some degree of temperature fluctuation is present over a display area comprising the pixels of a liquid crystal device.

Still further, according to the present invention, there is provided a display apparatus and display method utilizing the liquid crystal device described above as a display unit, which provide good display characteristics in combination with a light source, a drive circuit, etc.

What is claimed is:

1. A liquid crystal composition, comprising:
at least one mesomorphic compound represented by the following formula (I):

$$R^1-X^1-A^1-B-A^2-X^2-R^2 \qquad (I),$$

wherein $R^1$ and $R^2$ independently denote a linear or branched alkyl group having 1-18 carbon atoms capable of including one or non-neighboring two

TABLE 1

| Ex. No. (Comp. No.) | Example compound No. or liquid crystal composition No. (weight parts) | | | | | | | | Voltage margin (V) Set Δt (μsec) | | | | Temp. margin at 25° C. (°C.) |
|---|---|---|---|---|---|---|---|---|---|---|---|---|---|
| | | | | | | | | | | 10° C. | 25° C. | 40° C. | |
| 11 | 1-35, | 1-46, | 2-3, | 2-30, | 2-157, | | | | A | 13.7 | 13.7 | 12.9 | ±4.0° C. |
| (11-A) | 6 | 7 | 5 | 2 | 8 | | | | 72 | 642 | 207 | 83 | |
| 12 | 1-47, | 1-55, | 1-111, | 2-14, | 2-72, | | | | A | 13.3 | 13.3 | 12.2 | ±3.9° C. |
| (12-A) | 8 | 8 | 1 | 7 | 3 | | | | 73 | 652 | 210 | 85 | |
| 13 | 1-13, | 1-51, | 1-76, | 1-135, | 2-25, | 2-125, | | | A | 14.0 | 14.0 | 13.3 | ±4.0° C. |
| (13-A) | 5 | 5 | 3 | 7 | 6 | 2 | | | 72 | 638 | 206 | 82 | |
| 14 | 1-26, | 1-62, | 2-9, | 2-39, | 2-83, | | | | A | 14.0 | 14.1 | 13.1 | ±4.1° C. |
| (14-A) | 6 | 7 | 5 | 6 | 6 | | | | 70 | 625 | 200 | 80 | |
| 15 | 1-8, | 1-58, | 1-102, | 2-20, | 2-138, | | | | A | 13.9 | 14.0 | 13.3 | ±4.1° C. |
| (15-A) | 8 | 8 | 1 | 7 | 5 | | | | 71 | 609 | 197 | 78 | |
| 16 | 1-6, | 1-74, | 1-85, | 2-52, | 2-63, | 2-193, | | | B | 14.1 | 14.1 | 13.3 | ±4.2° C. |
| (16-B) | 7 | 5 | 6 | 5 | 5 | 3 | | | 69 | 467 | 157 | 55 | |
| 17 | 1-37, | 1-77, | 1-101, | 2-16, | 2-171, | 2-180, | | | B | 14.1 | 14.2 | 13.2 | ±4.2° C. |
| (17-B) | 6 | 5 | 5 | 5 | 3 | 5 | | | 71 | 481 | 165 | 59 | |
| 18 | 1-22, | 1-91, | 1-97, | 2-82, | 2-158, | 2-160, | | | B | 13.9 | 14.0 | 12.9 | ±4.0° C. |
| (18-B) | 7 | 5 | 3 | 7 | 3 | 5 | | | 70 | 473 | 159 | 56 | |
| 19 | 1-36, | 1-38, | 1-122, | 2-75, | 2.86, | 2-168, | 3-24, | 3-30, | B | 13.9 | 14.1 | 12.9 | ±4.0° C. |
| (19-B) | 6 | 3 | 5 | 6 | 5 | 5 | 8 | 2 | | 345 | 110 | 43 | |
| 20 | 1-57, | 1-76, | 1-128, | 2-35, | 2-110, | 2-176, | 3-63, | 3-72 | B | 13.8 | 14.0 | 13.7 | ±4.0° C. |
| (20-B) | 5 | 3 | 3 | 6 | 6 | 5 | 7 | 3 | | 337 | 112 | 45 | |
| 21 | 1-11, | 1-62, | 1-73, | 1-106, | 2-63, | 2-80, | 2-169, | 3-63, | B | 12.1 | 13.1 | 10.8 | ±3.9° C. |
| (21-B) | 3 | 7 | 6 | 2 | 6 | 8 | 4 | 11 | 53 | 355 | 116 | 46 | |

As apparent from the above Examples 11-20, the ferroelectric liquid crystal devices containing the liquid crystal compositions 11-A to 15-A and 16-B to 20-B respectively, according to the present invention provided wider driving voltage and temperature margins and showed a good alignment characteristic and better performance of retaining good images in resistance to changes in environmental temperature and cell gap.

Further, the liquid crystal device containing the liquid crystal composition according to the present invention provided a decreased temperature dependence of response speed (smaller ratio of set Δt (10° C./40° C.)).

Thus, early commercialization of a liquid crystal device utilizing ferroelectricity of a liquid crystal can be expected by using the liquid crystal composition according to the present invention.

As described hereinabove, according to the present invention, there is provided a liquid crystal composition which is easily aligned by simple rubbing treatment and provides a monodomain with a good and uniform alignment characteristic and with no defects.

Further, the liquid crystal device using such a liquid crystal composition according to the present invention shows a good switching characteristic and provides a or more methylene groups which can be replaced with at least one species of —O—, —CO—, —COO—, —OCO—, —OCOO— or —CH(X)— with the proviso that —O— cannot directly be connected to —O— and X denotes halogen; $X^1$ and $X^2$ independently denotes a single bond, —O—, —COO—, —OCO— or —CO—; B denotes

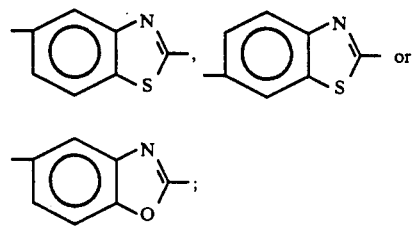

$A^1$ denotes a single bond,

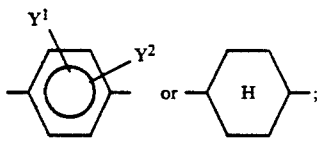

$A^2$ denotes a single bond, —$A^3$— or —$A^3$—$A^4$— wherein $A^3$ and $A^4$ independently denote any one of $A^1$,

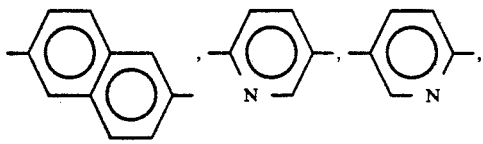

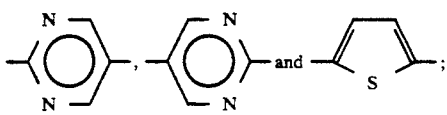

and $Y^1$ and $Y^2$ independently denote any one of hydrogen, F, Cl, Br, —$CH_3$, —CN and —$CF_3$; and at least one mesomorphic compound represented by the following formula (II):

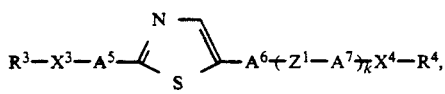

$$R^3-X^3-A^5 \underset{S}{\overset{N}{\diagdown}} A^6 + Z^1 - A^7 \overline{\gamma_k} X^4 - R^4,$$  (II)

wherein $R^3$ and $R^4$ independently denote a linear or branched alkyl group having 1-18 carbon atoms capable of including one or non-neighboring two or more methylene groups which can be replaced with at least one species of —O—, —CO—, —COO—, —OCO—, —OCOO— or —CH(X)— with the proviso that —O— cannot directly be connected to —O— and X denotes halogen; $X^3$ and $X^4$ independently denotes a single bond, —O—, —COO—, —OCO— or —CO—; $Z^1$ denotes a single bond, —COO— or —OCO—; $A^5$, $A^6$ and $A^7$ independently denote a single bond,

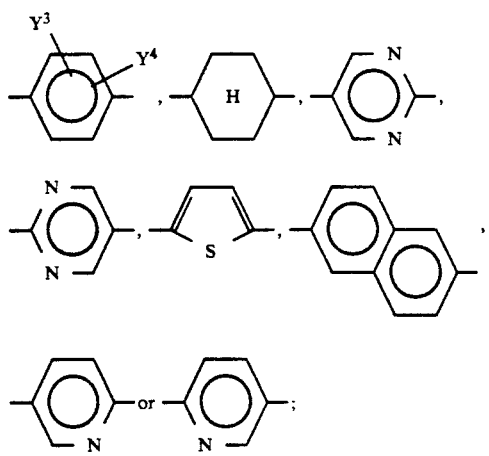

$Y^3$ and $Y^4$ independently denote hydrogen, halogen, —$CH_3$ or —$CF_3$; and k is 0 or 1 with the proviso that $X^3$ is a single bond when $A^5$ is a single bond, and $X^4$ is a single bond when $A^6$ is a single bond and k is 0.

2. A liquid crystal composition according to claim 1, which further comprises a mesomorphic compound represented by the following formula (III):

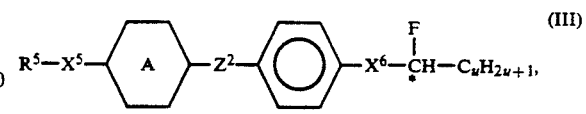

$$R^5-X^5-\underset{}{\boxed{A}}-Z^2-\underset{}{\bigcirc}-X^6-\overset{F}{\underset{*}{C}H}-C_uH_{2u+1},$$  (III)

wherein $R^5$ denotes a linear or branched alkyl group having 1-18 carbon atoms optionally substituted by an alkyl or alkoxy; $X^5$ denotes a single bond, —P—, —COO— or —OCO—; $Z^2$ denotes a single bond, —COO—, —OCO—, —COS— or —SCO—; $X^6$ denotes —$OCH_2$—, —$COOCH_2$—, —OCO— or

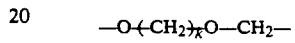

—O—($CH_2$)$_k$—O—$CH_2$— wherein k is an integer of 1–4;

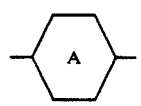

denotes

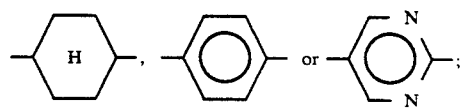

and u is an integer of 1-12.

3. A liquid crystal composition according to claim 1, wherein the mesomorphic compound of the formula (I) is represented by any one of the following formulas (Ia)–(Ig):

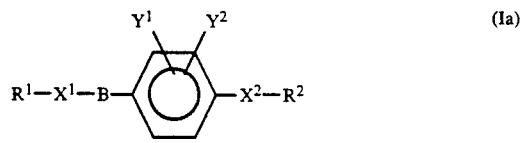

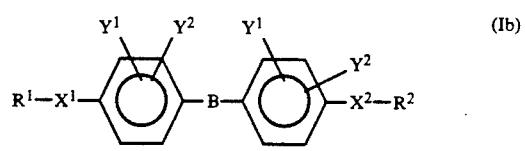

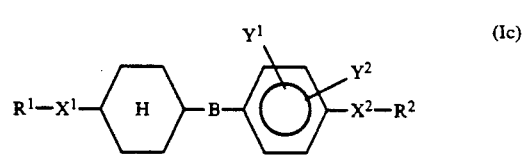

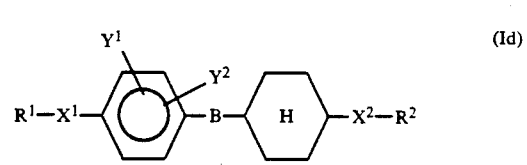

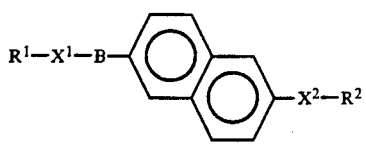
(Ie)

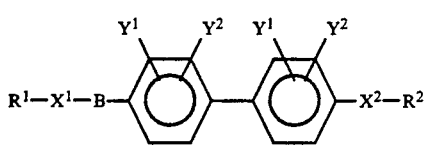
(If)

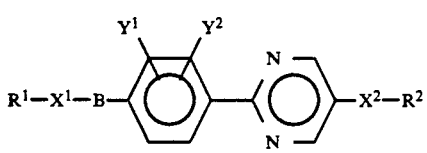
(Ig)

wherein R¹ and R² independently denote a linear or branched alkyl group having 1–18 carbon atoms capable of including one or non-neighboring two or more methylene groups which can be replaced with at least one species of —O—, —CO—, —COO—, —OCO—, —OCOO— or —CH(X)— with the proviso that —O— cannot directly be connected to —O— and X denotes halogen; X¹ and X² independently denotes a single bond, —O—, —COO—, —OCO— or —CO—; B denotes

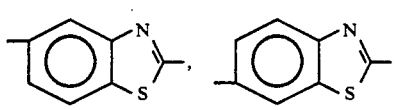

or

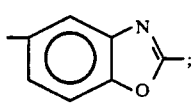

and Y¹ and Y² independently denote any one of hydrogen, F, Cl, Br, —CH₃, —CN and —CF₃.

4. A liquid crystal composition according to claim 3, wherein B in the formulas (Ia)-(Ig) denotes

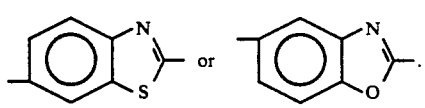

5. A liquid crystal composition according to claim 3, wherein X¹ and X² in the formulas (Ia)-(Ig) independently denote a single bond, —O—, —COO— or —OCO—.

6. A liquid crystal composition according to claim 3, wherein Y¹ and Y² in the formulas (Ia)-(Ig) independently denote Cl or F.

7. A liquid crystal composition according to claim 1, wherein R¹ and R² in the formula (I) independently denote any one of the following groups (I-i) to (I-iv):

(I-i) an n-alkyl group having 1–16 carbon atoms;
(I-ii)

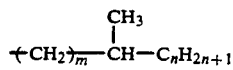

wherein m is an integer of 0–6 and n is an integer of 1–8;

(I-iii)

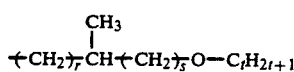

wherein r is an integer of 0–6, s is 0 or 1, and t is an integer of 1–12; and (I-iv)

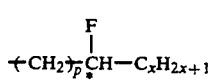

wherein p is 0 or 1 and x is an integer of 4–14.

8. A liquid crystal composition according to claim 1, wherein the mesomorphic compound of the formula (II) is represented by any one of the following formulas (IIa)-(IIq):

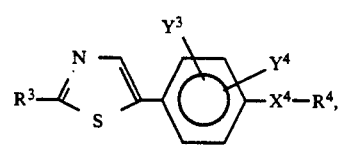
(IIa)

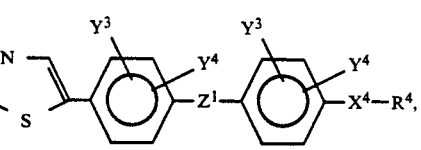
(IIb)

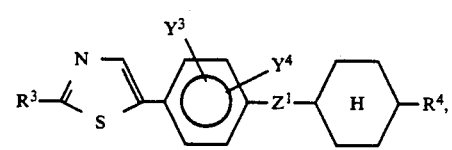
(IIc)

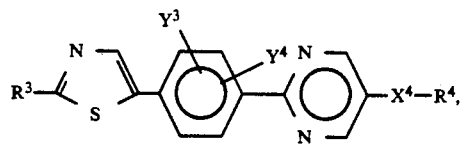
(IId)

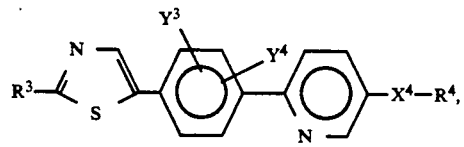
(IIe)

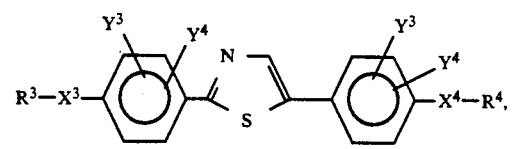
(IIf)

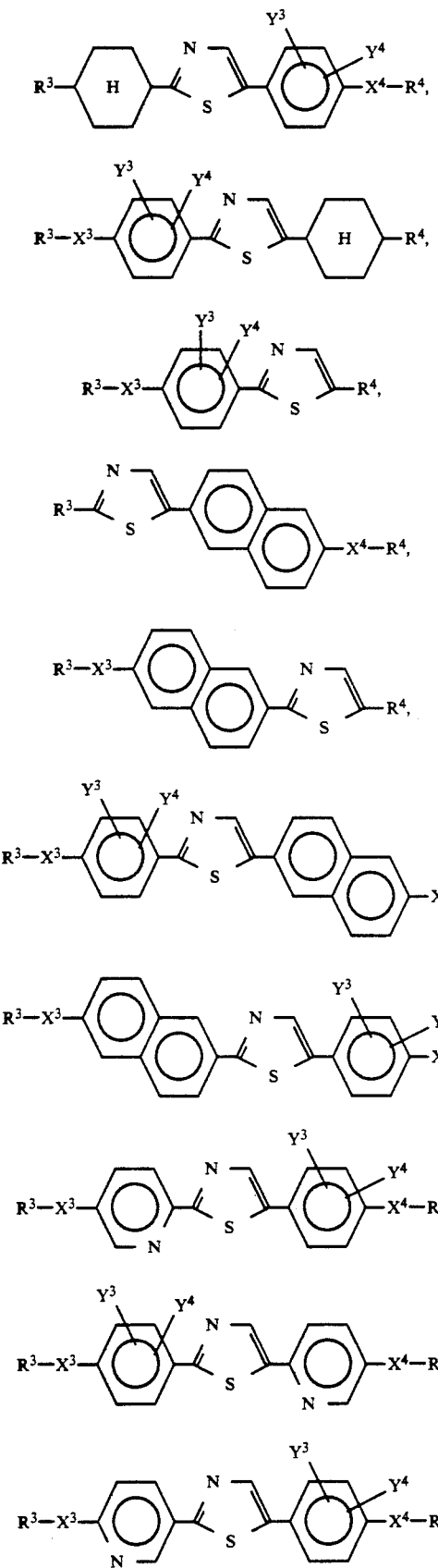

and

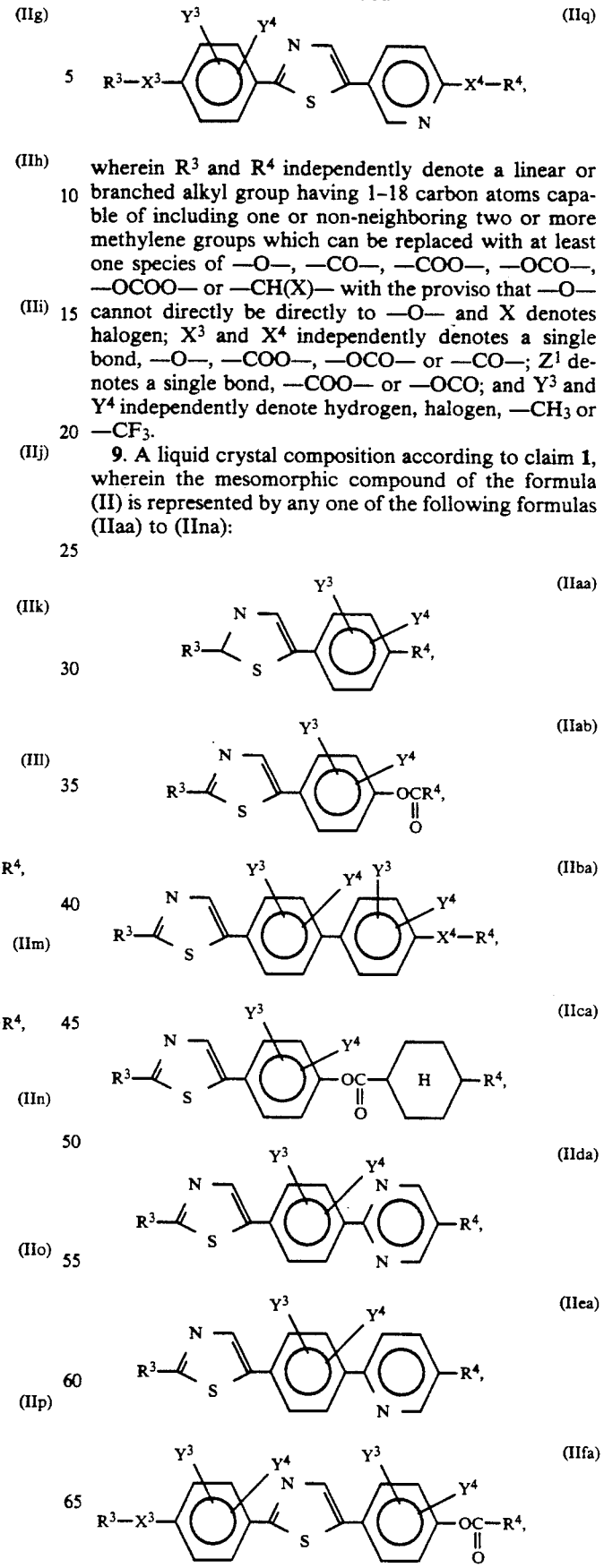

wherein R³ and R⁴ independently denote a linear or branched alkyl group having 1-18 carbon atoms capable of including one or non-neighboring two or more methylene groups which can be replaced with at least one species of —O—, —CO—, —COO—, —OCO—, —OCOO— or —CH(X)— with the proviso that —O— cannot directly be directly to —O— and X denotes halogen; X³ and X⁴ independently denotes a single bond, —O—, —COO—, —OCO— or —CO—; $Z^1$ denotes a single bond, —COO— or —OCO; and Y³ and Y⁴ independently denote hydrogen, halogen, —CH₃ or —CF₃.

9. A liquid crystal composition according to claim 1, wherein the mesomorphic compound of the formula (II) is represented by any one of the following formulas (IIaa) to (IIna):

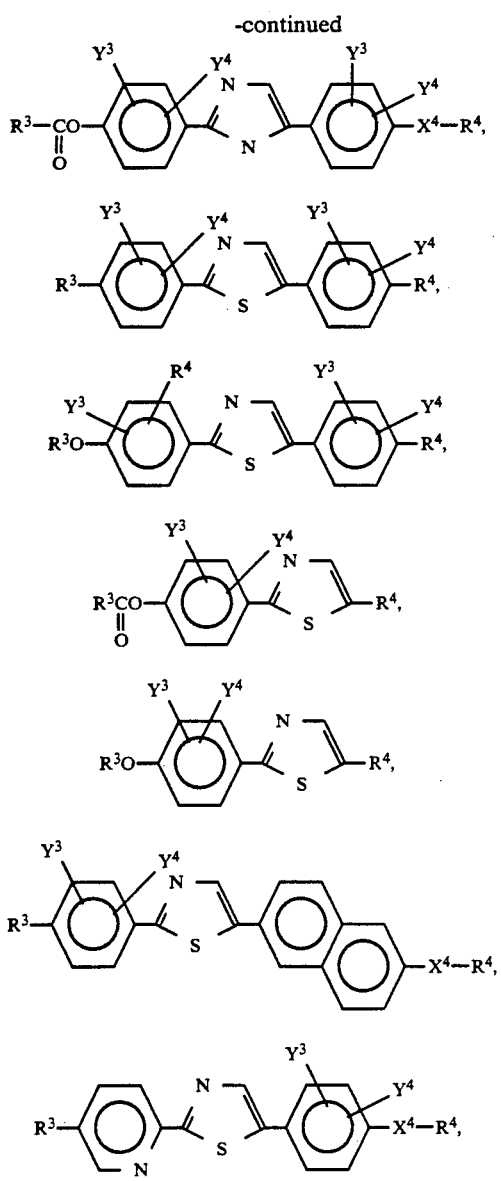

wherein $R^3$ and $R^4$ independently denote a linear or branched alkyl group having 1-18 carbon atoms capable of including one or non-neighboring two or more methylene groups which can be replaced with at least one species of —O—, —CO—, —COO—, —OCO—, —OCOO— or —CH(X)— with the proviso that —O— cannot directly be connected to —O— and X denotes halogen; $X^3$ and $X^4$ independently denotes a single bond, —O—, —COO—, —OCO— or —CO—; and $Y^3$ and $Y^4$ independently denote hydrogen, halogen, —CH$_3$ or —CF$_3$.

10. A liquid crystal composition according to claim 1, wherein $R^3$ and $R^4$ in the formula (II) respectively denote any one of the following groups (II-i) to (II-iv):

(II-i) an n-alkyl group having 2-16 carbon atoms;

(II-ii)

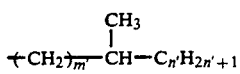

wherein m' is an integer of 0-6 and n' is an integer of 2-8;

(II-iii)

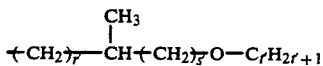

wherein r' is an integer of 0-6, s' is 0 or 1, and t' is an integer of 1-12; and (II-iv)

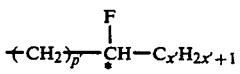

wherein p' is 0 or 1 and x' is an integer of 1-14.

11. A liquid crystal composition according to claim 2, wherein the mesomorphic compound of the formula (III) is represented by any one of the following formulas (IIIa)-(IIIf):

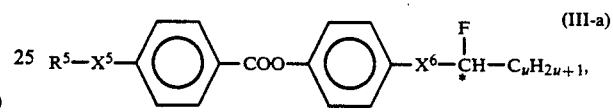

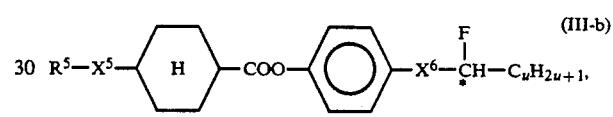

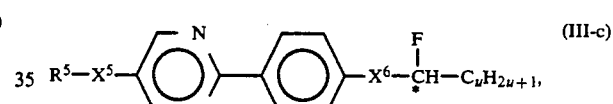

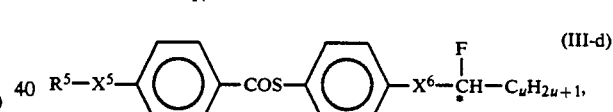

and

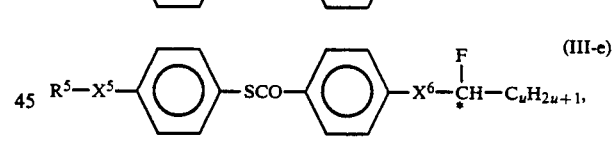

wherein $R^5$ denotes a linear or branched alkyl group having 1-18 carbon atoms optionally substituted by an alkoxy; $X^5$ denotes a single bond, —O—, —COO— or —OCO—; $X^6$ denotes —OCH$_2$—, —COOCH$_2$—, —OCO— or —O(CH$_2$)$_k$O—CH$_2$— wherein k is an integer of 1-4; and u is an integer of 1-12.

12. A liquid crystal composition according to claim 11, wherein $X^5$ and $X^6$ in the formulas (IIIa) to (IIIf) denote any one of the following combinations (III-i) to (III-v):

(III-i) $X^5$ is a single bond and $X^6$ is —O—CH$_2$—;
(III-ii) $X^5$ is a single bond and $X^6$ is —COO—CH$_2$—;
(III-iii) $X^5$ is a single bond and $X^6$ is —OCO—;
(III-iv) $X^5$ is —O— and $X^6$ is —O—CH$_2$—; and
(III-v) $X^5$ is —O— and $X^6$ is —COOCH$_2$—.

13. A liquid crystal composition according to claim 1, which comprises 1-90 wt. % in total of the mesomorphic compounds of the formulas (I) and (II).

14. A liquid crystal composition according to claim 1, which comprises 2-80 wt. % in total of the mesomorphic compounds of the formulas (I) and (II).

15. A liquid crystal composition according to claim 1, which comprises 4-80 wt. % in total of the mesomorphic compounds of the formulas (I) and (II).

16. A liquid crystal composition according to claim 2, which comprises 1-99 wt. % in total of the mesomorphic compounds of the formulas (I), (II) and (III).

17. A liquid crystal composition according to claim 2, which comprises 4-90 wt. % in total of the mesomorphic compounds of the formulas (I), (II) and (III).

18. A liquid crystal composition according to claim 2, which comprises 6-80 wt. % in total of the mesomorphic compounds of the formulas (I), (II) and (III).

19. A liquid crystal composition according to claim 1 or 2, which has a chiral smectic phase.

20. A liquid crystal device, comprising a pair of electrode plates and a liquid crystal composition according to claim 1 or 2 disposed between the electrode plates.

21. A liquid crystal device according to claim 20, which further comprises an insulating alignment control layer.

22. A liquid crystal device according to claim 21, wherein the insulating alignment control layer has been subjected to rubbing.

23. A liquid crystal device according to claim 20, wherein the liquid crystal composition is disposed in a thickness suppressing formation of a helical structure of liquid crystal molecules between the electrode plates.

24. A display apparatus comprising a liquid crystal device according to claim 20, and voltage application means for driving the liquid crystal device.

25. A display apparatus comprising a liquid crystal device according to claim 24, voltage application means for driving the liquid crystal device, and a drive circuit.

26. A display apparatus comprising a liquid crystal device according to claim 24, voltage application means for driving the liquid crystal device, and a light source.

27. A display method comprising:
providing a liquid crystal composition according to any one of claims 1-18; and
switching the alignment direction of liquid crystal molecules by applying voltage to the liquid crystal composition to effect display.

28. A display method comprising:
providing a liquid crystal composition according to claim 19; and
switching the alignment direction of liquid crystal molecules by applying voltage to the liquid crystal composition to effect display.

29. A display method, comprising:
providing a liquid crystal device according to claim 20; and
switching the alignment direction of liquid crystal molecules by applying voltage to the liquid crystal composition disposed between the electrode plates to effect display.

30. A display method, comprising:
providing a liquid crystal device according to claim 21; and
switching the alignment direction of liquid crystal molecules by applying voltage to the liquid crystal composition disposed between the electrode plates to effect display.

31. A display method, comprising:
providing a liquid crystal device according to claim 22; and
switching the alignment direction of liquid crystal molecules by applying voltage to the liquid crystal composition disposed between the electrode plates to effect display.

32. A display method, comprising:
providing a liquid crystal device according to claim 23; and
switching the alignment direction of liquid crystal molecules by applying voltage to the liquid crystal composition disposed between the electrode plates to effect display.

* * * * *

UNITED STATES PATENT AND TRADEMARK OFFICE
CERTIFICATE OF CORRECTION

PATENT NO. : 5,262,083
DATED : November 16, 1993
INVENTOR(S) : SHOSEI MORI, ET AL.

It is certified that error appears in the above-identified patent and that said Letters Patent is hereby corrected as shown below:

COLUMN 1

Line 30, "Property" should read --property--.

COLUMN 2

Line 7, "(Providing" should read --(providing--.

COLUMN 3

Line 11, "Crystal" should read --crystal--.
Line 31, "(treatment" should read --treatment--.

COLUMN 5

Line 45, "   F
           CH
            *   "   should read   --    F
                                        |
                                        CH
                                        *   --.

COLUMN 7

Line 53, 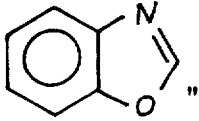 should read 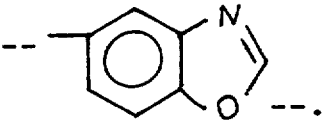 --.

Line 58, "Examples" should read --examples-- and "independent" should read --independently--.

COLUMN 8

Line 15, "s is or 1," should read --s is 0 or 1,--.

UNITED STATES PATENT AND TRADEMARK OFFICE
CERTIFICATE OF CORRECTION

PATENT NO. : 5,262,083
DATED : November 16, 1993
INVENTOR(S) : SHOSEI MORI, ET AL.

It is certified that error appears in the above-identified patent and that said Letters Patent is hereby corrected as shown below:

COLUMN 14

Line 37, "$R^1$, $R^1$," should read --$R^1$, $R^2$,--.

COLUMN 15

Formula (1-14), "$C_7H_{16}$" should read --$C_7H_{15}$--.

COLUMN 17

Formula (1-27), "$C_{12}H_{26}$" should read --$C_{12}H_{25}$--.

COLUMN 23

Formula (1-62), "$C_{12}H_{26}$" should read --$C_{12}H_{25}$--.
Formula (1-63), "$C_{12}H_{26}$" (both occurrences) should read --$C_{12}H_{25}$--.
Formula (1-64), "$C_2H_6$" should read --$C_2H_5$--.
Formula (1-69), "$C_6H_{11}$" should read --$C_5H_{11}$--.

COLUMN 25

Formula (1-72), "$C_6H_9$" should read --$C_4H_9$--.
Formula (1-76), "$C_7H_{16}$" should read --$C_7H_{15}$--.
Formula (1-79), "$C_6H_{11}$" should read --$C_5H_{11}$--.

COLUMN 29

Formula (1-97), "$C_6H_{11}$" should read --$C_5H_{11}$--.
Formula (1-98), "$C_7H_{16}$" should read --$C_7H_{15}$--.
Formula (1-99), "$C_7H_{16}$" should read --$C_7H_{15}$--.
Formula (1-105), "$C_6H_{11}$" should read --$C_5H_{11}$--.

UNITED STATES PATENT AND TRADEMARK OFFICE
CERTIFICATE OF CORRECTION

PATENT NO. : 5,262,083
DATED : November 16, 1993
INVENTOR(S) : SHOSEI MORI, ET AL.

It is certified that error appears in the above-identified patent and that said Letters Patent is hereby corrected as shown below:

COLUMN 31

Formula (1-107), "$C_6H_{11}$" should read --$C_5H_{11}$--.

COLUMN 35

Formula (1-139), "$C_6H_{11}$" should read --$C_5H_{11}$--.

COLUMN 39

Line 48, "Of" should read --of--.

COLUMN 42

Line 23, "or it" should read --, it--.
Line 47, "$R^7$" should read --$R^4$--.

COLUMN 49

Formula (2-51), "$C_6H_{11}$" should read --$C_5H_{11}$--.

COLUMN 53

Formula (2-72), "$C_6H_{17}$" should read --$C_8H_{17}$--.

COLUMN 55

Formula (2-92), "$-(CH_2)_6$" should read -- $-(CH_2)_5$ --.
Formula (2-93), "$C_6H_{11}$" should read --$C_5H_{11}$--.

COLUMN 57

Formula (2-105), "$C_7H_{16}$" should read --$C_7H_{15}$--.

UNITED STATES PATENT AND TRADEMARK OFFICE
CERTIFICATE OF CORRECTION

PATENT NO. : 5,262,083
DATED : November 16, 1993
INVENTOR(S) : SHOSEI MORI, ET AL.

Page 4 of 9

It is certified that error appears in the above-identified patent and that said Letters Patent is hereby corrected as shown below:

COLUMN 59

Formula (2-112), "$OC_7H_{16}$" should read --$OC_7H_{15}$--.

Formula (2-118), "$C_8H_{17}$——" should read --$C_8H_{17}$—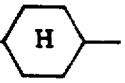---.

COLUMN 61

Formula (2-123), "$C_6H_{13}$—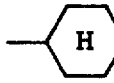—" should read --$C_6H_{13}$—---.

Formula (2-128), "$C_7H_{16}$" should read --$C_7H_{15}$--.

COLUMN 63

Formula (2-138), "—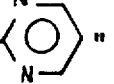" should read -- —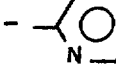 --.

Formula (2-142), "$C_6H_{17}$" should read --$C_8H_{17}$--.

COLUMN 65

Formula (2-154), "$OC_7H_{16}$" should read --$OC_7H_{15}$--.

COLUMN 67

Formula (2-159), "$OC_6H_{15}$" should read --$OC_8H_{17}$--.
Formula (2-160), "$C_7H_{16}$" should read --$C_7H_{15}$--.
Formula (2-161), "$C_7H_{16}$" should read --$C_7H_{15}$-- and "$OC_7H_{16}$" should read --$OC_7H_{15}$--.
Formula (2-162), "$C_7H_{16}$" should read --$C_7H_{15}$--.
Formula (2-163), "$C_7H_{16}$" should read --$C_7H_{15}$--.
Formula (2-167), "$OC_{12}H_{26}$" should read --$OC_{12}H_{25}$--.
Formula (2-170), "$OC_{16}H_{31}$" should read --$OC_{15}H_{31}$--.

UNITED STATES PATENT AND TRADEMARK OFFICE
CERTIFICATE OF CORRECTION

PATENT NO. : 5,262,083
DATED : November 16, 1993
INVENTOR(S) : SHOSEI MORI, ET AL.

It is certified that error appears in the above-identified patent and that said Letters Patent is hereby corrected as shown below:

COLUMN 75

Line 11, "82.9" should read --82.9%).--.
Line 13, "tiazole," should read --thiazole,--.

COLUMN 76

Line 28, "nematici" should read --nematic--.

COLUMN 78

Formula (3-6), "$C_6H_{11}$" should read --$C_5H_{11}$--.

COLUMN 79

Formula (3-8), "$C_7H_{16}$" should read $C_7H_{15}$--.
Formula (3-13), "$C_7H_{16}$" should read $C_7H_{15}$--.
Formula (3-14), "$C_6H_{17}$" should read --$C_8H_{17}$--.
Formula (3-16), "$C_{12}H_{26}$" should read --$C_{12}H_{25}$--.
Formula (3-17), "$C_{12}H_{26}$" should read --$C_{12}H_{25}$--.
Formula (3-20), "$C_6H_{11}$" should read --$C_5H_{11}$--.
Formula (3-21), "$C_6H_{11}$" (both occurrences) should read --$C_5H_{11}$--.

COLUMN 81

Formula (3-27), "$C_6H_{11}$" should read --$C_5H_{11}$--.
Formula (3-33), "$C_{10}H_{21}$--" should read --$C_{10}H_{21}$--O-- --.
Formula (3-34), "$C_{12}H_{26}$" should read --$C_{12}H_{25}$--.

UNITED STATES PATENT AND TRADEMARK OFFICE
CERTIFICATE OF CORRECTION

PATENT NO. : 5,262,083

DATED : November 16, 1993

INVENTOR(S) : SHOSEI MORI, ET AL.

It is certified that error appears in the above-identified patent and that said Letters Patent is hereby corrected as shown below:

COLUMN 83

Formula (3-37), "$C_6H_{11}$" should read --$C_5H_{11}$--.
Formula (3-43), "$C_{12}H_{26}$" should read --$C_{12}H_{25}$--.

COLUMN 85

Formula (3-51), "$C_6H_{17}$" should read --$C_8H_{17}$-- and "$C_2H_6$" should read --$C_2H_5$--.
Formula (3-52), "$C_2H_6$" should read --$C_2H_5$--.
Formula (3-55), "$C_{12}H_{26}$" should read --$C_{12}H_{25}$--.
Formula (3-58), "$C_{12}H_{26}$" should read --$C_{12}H_{25}$--.

COLUMN 87

Formula (3-63), "$C_{12}H_{26}$" should read --$C_{12}H_{25}$--.

COLUMN 89

Formula (3-83), "$-(CH_2)_6$" should read --$-(CH_2)_5$--.

COLUMN 91

Line 47, "fluorooctyloxypheny l-ester." should read --fluorooctyloxyphenyl-ester.--.
Line 55, "1200" should read --1200,--.

COLUMN 94

Line 10, "an" should read --can--.
Line 44, "hydrogen," should read --hydrogen, halogen,--.
Line 57, "an" should read --can--.

UNITED STATES PATENT AND TRADEMARK OFFICE
CERTIFICATE OF CORRECTION

PATENT NO. : 5,262,083
DATED : November 16, 1993
INVENTOR(S) : SHOSEI MORI, ET AL.

It is certified that error appears in the above-identified patent and that said Letters Patent is hereby corrected as shown below:

COLUMN 96

Line 16, " $-\overset{\overset{O}{\|}}{O}CO;$ " should read -- $-\overset{\overset{O}{\|}}{O}CO-;$ --.

COLUMN 98

Line 9, "$-CH_2Ch_2-,$" should read -- $-CH_2CH_2-,$ --.
Line 14, "formula" should read --formulas--.

COLUMN 99

Formula (VIg), "$R_6'$ (VIg)" should read
              -- $R_6'$                    (VIg)--.

COLUMN 101

Line 23, "desirably" should read --desirable--.
Line 27, "formula I)" should read --formula (I)--.
Line 38, "4-90 wt. %," should read --preferably 4-90 wt. %,--.

COLUMN 105

Line 68, "with the" should read --with the above prepared composition in the respectively indicated proportion.--.

COLUMN 107

Line 40, "second" should read --seconds--.
Line 59, close up right margin.
Line 60, close up left margin.

--

UNITED STATES PATENT AND TRADEMARK OFFICE
CERTIFICATE OF CORRECTION

PATENT NO. : 5,262,083
DATED : November 16, 1993
INVENTOR(S) : SHOSEI MORI, ET AL.

It is certified that error appears in the above-identified patent and that said Letters Patent is hereby corrected as shown below:

COLUMN 109

Line 17, "provide" should read --provided--.
    Line 23, "Fifteen-types" should read --Fifteen types--.

COLUMN 111

Line 42, "Crystal" should read --crystal--.

COLUMN 112

Line 15, "±2" should read --±2.--.

COLUMN 118

Line 56, "⊚: No" should read --*1: The device used in Example 5.  ⊚: No--.

COLUMN 122

Line 53, "devices were" should read --device was--.

COLUMN 124

Line 55, "denotes" should read --denote--.

COLUMN 125

Line 42, "denotes" should read --denote--.

COLUMN 126

Line 15, "—P—," should read -- —O—,--.

UNITED STATES PATENT AND TRADEMARK OFFICE
CERTIFICATE OF CORRECTION

PATENT NO. : 5,262,083

DATED : November 16, 1993

INVENTOR(S) : SHOSEI MORI, ET AL.

It is certified that error appears in the above-identified patent and that said Letters Patent is hereby corrected as shown below:

COLUMN 127

Line 28, "denotes" should read --denote--.

COLUMN 130

Line 15, "directly to" should read --be connected to --.
Line 16, "denotes" should read --denote--.

COLUMN 131

Formula (IIfb), "  " should read -- 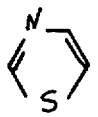 --.

Formula (IIfd), " $/R^4$ " should read -- $/Y^4$ --.

Line 54, "denotes" should read --denote--.

Signed and Sealed this

Eleventh Day of October, 1994

Attest:

BRUCE LEHMAN

Attesting Officer    Commissioner of Patents and Trademarks